US012481301B2

(12) United States Patent
Thirumurthy et al.

(10) Patent No.: US 12,481,301 B2
(45) Date of Patent: Nov. 25, 2025

(54) ENERGY DATA PRESENTATION AND VISUALIZATION DASHBOARD SYSTEM, METHOD AND COMPUTER PROGRAM PRODUCT PROVIDING ENERGY PERFORMANCE, DIAGNOSTIC DATA AND ECONOMIC IMPACT OF ALL MONITORED ENERGY CONSUMING AND PRODUCTION ASSETS

(71) Applicant: Vybe Energy, LLC, Falls Church, VA (US)

(72) Inventors: Nisha Thirumurthy, Falls Church, VA (US); Gabriel Kiblin, Falls Church, VA (US)

(73) Assignee: Vybe Energy, LLC, Falls Church, VA (US)

( * ) Notice: Subject to any disclaimer, the term of this patent is extended or adjusted under 35 U.S.C. 154(b) by 546 days.

(21) Appl. No.: 17/843,721

(22) Filed: Jun. 17, 2022

(65) Prior Publication Data

US 2023/0305587 A1 Sep. 28, 2023

Related U.S. Application Data

(63) Continuation-in-part of application No. 16/735,488, filed on Jan. 6, 2020, now Pat. No. 11,399,065.

(51) Int. Cl.
*G05F 1/66* (2006.01)
*G06Q 10/04* (2023.01)
(Continued)

(52) U.S. Cl.
CPC .............. *G05F 1/66* (2013.01); *G06Q 10/04* (2013.01); *G06Q 50/06* (2013.01); *H02J 3/003* (2020.01);
(Continued)

(58) Field of Classification Search
CPC ....... G05F 1/66; H02J 3/003; H02J 13/00001; H02J 3/004; H02J 2300/24; H02J 2310/12; H02J 2310/60; G06Q 10/04; G06Q 50/06
See application file for complete search history.

(56) References Cited

U.S. PATENT DOCUMENTS 4,059,969 A 11/1977 Awalt, Jr.
4,118,637 A 10/1978 Tackett
(Continued)

FOREIGN PATENT DOCUMENTS

JP 2009033802 A 10/2011
WO WO2011074561 6/2011

OTHER PUBLICATIONS

Howard Martinez Meza et al., Cloud-based and Big data-enabled Brokerage System for Smart Grids, Jun. 1, 2017, IEEE 6th International Congress on Big Data, pp. 502-506 (Year: 2017).*
(Continued)

*Primary Examiner* — Tam T Tran
(74) *Attorney, Agent, or Firm* — Reston Law Group, LLP; Ralph P. Albrecht; Jesse A. Fenty

(57) ABSTRACT

A whole building or campus entity, energy management and energy control optimization, data presentation and visualization dashboard system including a computer processor service provider system, wherein the computer processor service provider system comprises a cloud-based computer processor service provider system comprising: at least one application server comprising the whole building or campus entity, energy management and energy control optimization system executing in the cloud-based computer processor service provider system; and an onsite energy controller coupled to the cloud-based computer processor service provider system by an electronic communications network; wherein said onsite energy controller comprises: at least one electronic computer processor; and at least one electronic computer memory coupled to said at least one electronic computer processor; wherein said at least one electronic computer processor of said onsite energy controller is configured to: reduce energy and demand costs through whole (Continued)

building or campus entity energy management of a building or campus entity load including by being configured to at least one or more of: optimize energy usage; optimize energy generation; maximize demand reduction and utility savings through optimal control of: the energy usage, and the energy generation, or reduce energy costs; and use of at least one energy storage system device; simulate said building or campus entity load by use of at least one or more of: predictive analytics; or receive user inputs of an event schedule that impacts said building or campus entity load; perform optimization at the start of the billing cycle to establish a demand reduction target achievable with the at least one energy storage system device implemented; set a periodic schedule for discharge of the at least one energy storage system device and allocate a portion of energy storage capacity to a reserve to be used in the event of volatility in said building or campus entity load; determine whether there is unused capacity of the at least one energy storage system device at an end of a period, and responsive to the determination, redistribute any of the unused capacity to a remaining period of the periodic schedule; and reset the demand reduction target for each time-of-use period to what was achieved in the previous period for the same billing period; and wherein said at least one electronic computer processor of said onsite energy controller is configured to: display output interactively via an electronic dashboard graphical user interface (GUI) comprising at least one GUI element enabling interactive user receipt of input and provision of output relating to at least one or more of the following: a heat map; a financial energy savings calculation; a color coding of energy production depicting at least one or more of: actual energy production, weather normalized energy production, or predicted energy production; or a color coding of energy usage performance based upon an automatically calculated comparison of expected energy production to actual energy production; a color coded representation of monetization comprising at least one or more of: multi-colored lines on a graphically displayed chart metaphor GUI element; or multiple revenue streams; visual comparison of data between different time periods; or artificial intelligence (AI)-enabled data showing at least one or more of: anticipated production data or anticipated consumption data.

19 Claims, 29 Drawing Sheets

(51) Int. Cl.
G06Q 50/06 (2012.01)
H02J 3/00 (2006.01)
H02J 13/00 (2006.01)

(52) U.S. Cl.
CPC ........ *H02J 3/004* (2020.01); *H02J 13/00001* (2020.01); *H02J 13/00002* (2020.01); *H02J 2300/24* (2020.01); *H02J 2310/12* (2020.01); *H02J 2310/60* (2020.01)

(56) References Cited

U.S. PATENT DOCUMENTS

| | | |
|---|---|---|
| 7,830,038 B2 | 11/2010 | Wang |
| 7,908,036 B2 | 3/2011 | Kirchner et al. |
| 7,957,846 B2 | 6/2011 | Hakim |
| 8,253,271 B2 | 8/2012 | Pan |
| 8,330,296 B2 | 12/2012 | Ottman |
| 9,010,133 B2 | 4/2015 | Ashrafzadeh et al. |
| 9,300,141 B2 | 3/2016 | Marhoefer |
| 9,422,922 B2 | 8/2016 | Sant'Anselmo et al. |
| 9,489,701 B2 * | 11/2016 | Emadi .................... G06Q 50/06 |
| 9,645,596 B1 | 5/2017 | Ja-Chin et al. |
| 9,960,637 B2 | 5/2018 | Sanders et al. |
| 10,060,296 B2 | 8/2018 | Friesth |
| 10,262,327 B1 * | 4/2019 | Hardebeck ............. G06Q 10/10 |
| 10,378,792 B2 | 8/2019 | Guha et al. |
| 10,428,713 B2 | 10/2019 | Taylor et al. |
| 2004/0225649 A1 | 11/2004 | Yeo |
| 2008/0272934 A1 | 11/2008 | Wang |
| 2010/0064001 A1 | 3/2010 | Daily |
| 2010/0133820 A1 | 6/2010 | Tsao |
| 2011/0221203 A1 | 9/2011 | Miller |
| 2012/0130556 A1 | 5/2012 | Marhoefer |
| 2012/0303397 A1 | 11/2012 | Prosser |
| 2014/0129040 A1 * | 5/2014 | Emadi .................... G06Q 50/06 700/291 |
| 2014/0229026 A1 * | 8/2014 | Cabrini .................. G06Q 50/06 700/291 |
| 2016/0334824 A1 | 11/2016 | Forbes, Jr. |
| 2019/0302157 A1 * | 10/2019 | Vitullo ................... G01K 17/20 |
| 2020/0106269 A1 * | 4/2020 | Hannon .................. H02J 3/144 |

OTHER PUBLICATIONS

Naran Pindoriya et al., Integrated Energy Management Framework for Environmentally Sustainable Energy Access, Nov. 1, 2018, IEEE UPCON, pp. 1-8 (Year: 2018).*
Muhammad Fahim et al., An Anomaly Detection Model for Enhancing Energy Management in Smart Buldings, Oct. 1, 2018, IEEE International Conference on Communication / Control / and Computing Technologies, pp. 1-5 (Year: 2018).*
J. Kohlbrecher al., Visualizing Energy Information on Mobile Devices, Jul. 1, 2011, IEEE International Conference on Intelligent Data Acquisition and Advanced Computing Systems: Technologies and Applications, pp. 817-822 (Year: 2011).*
International Search Report and Written Opinion of PCT/US 23/25494 mailed Sep. 26, 2023.
Boxwell, Michael, "Solar Electricity Handbook," Chapters 1-4, accessible at http://www.solarelectricityhandbook.com, visited Jan. 6, 2020.

* cited by examiner

EXEMPLARY CONTROLLER HARDWARE ARCHITECTURE

EXEMPLARY NETWORK HARDWARE ARCHITECTURE

This graph below shows the actual production (green), weather normalized production (in blue) and the predicted during design (in black) – in any granularity and over any historical timeline.

Site level statistics – shown at a glance include lifetime solar production, last month solar production, current month production, lifetime utility savings, lifetime SREC or other incentive savings, lifetime metric tons of CO2 avoided.

ENERGY DATA PRESENTATION AND VISUALIZATION DASHBOARD SYSTEM, METHOD AND COMPUTER PROGRAM PRODUCT PROVIDING ENERGY PERFORMANCE, DIAGNOSTIC DATA AND ECONOMIC IMPACT OF ALL MONITORED ENERGY CONSUMING AND PRODUCTION ASSETS

CROSS-REFERENCE TO RELATED PATENT APPLICATIONS

The present disclosure is a US Non-Provisional application for Letters Patent, and is also a continuation-in-part of, and claims the benefit of and priority under 35 USC Section 120 of U.S. patent application Ser. No. 16/735,488, entitled "APPARATUS, SYSTEM, METHOD, AND COMPUTER PROGRAM PRODUCT FOR SCALING AND MANAGING ELECTRIC POWER SYSTEMS," filed Jan. 6, 2020, of common assignee to the present invention, the contents of all of which is incorporated herein by reference in its entirety.

TECHNICAL FIELD OF THE DISCLOSURE

The present disclosure relates generally to energy. More particularly, the present disclosure relates to energy management and monitoring systems.

BACKGROUND OF THE DISCLOSURE

Related References

Various energy management and monitoring systems exist, however conventional energy management and monitoring systems have various shortcomings. What is needed is an improved energy management and monitoring system, which overcomes shortcomings of conventional systems.

Certain regional energy cooperatives may have agreements with wholesale utilities limiting alternative or renewable energy generation production to a given percentage of power. One way to bypass restrictions on the limits is expansion of locally owned residential and commercial solar electric systems. The term behind the meter (BTM) in the photovoltaic (PV) industry refers to renewable energy generating facilities that produces power intended for on-site use in homes, offices, and other commercial entity facilities. The PV system is on the owner's property, not on the side of the utility, or electric grid.

As BTM energy generation (such as, e.g., but not limited to, Solar) has become more ubiquitous due to attractive Federal and State incentives, grid load curve, in some states like California, are experiencing what is referred to as a "duck" curve see FIG. 1. FIG. 1 depicts an exemplary duck curve plotting exemplary power generation on an exemplary date depicting exemplary net energy load 110 measured in exemplary Megawatts on vertical (ordinal) axis 104 with respect to hours of a given exemplary day on the horizontal (abscissa) axis 102. FIG. 1 illustrates an exemplary steep ramping need 108 and an exemplary overgeneration risk 106 in the trough of the curve. FIG. 1 shows exemplary historical, actual, and exemplary projected load curves on an exemplary date, March 31, as the number of BTM solar projects increases with respect to years. The exemplary load curve depicts how reliance on the electricity grid between the hours of the exemplary hours 112 of 7 AM to 4 PM from 2012 to 2020 decreases substantially as most of the power illustrated in Megawatts 104, becomes provided by BTM solar projects, according to an exemplary embodiment. Likewise, reliance on the grid increases substantially between the exemplary hours 114 of between 4 PM and 7 PM as the solar projects stop producing from waning sunlight in the evening of the exemplary given northern hemisphere region. According to an exemplary challenge, unmet by conventional solutions, the exemplary utility is unable to ramp up energy generation to meet and take over the 13,000 MW of demand over the three hour period with a conventional mix of generation assets.

Utilities have sought to address this issue by increasing the utility's charged rate or so-called tariff, during the illustrated three-hour period 114 to incentivize consumers to use less energy and to reduce the stress on the electrical grid. These responses by utilities in turn are creating financial opportunities for deployment of BTM energy storage systems. For example, the graph of FIG. 1 depicts a typical example of time-of-use (TOU) rates that a small to mid-size commercial entity might experience over an exemplary 24-hour period. TOU rates for a given date are segmented, and the utility charges different rates from an energy and demand perspective. Consider, for example, but not limited to, that a utility charges exemplary tariffs of US$5 per kilowatt hour (kwh) for offpeak, $20/kwh for peak rate usage, $10/kwh for mid-peak, a max monthly rate of $5/kwh, and a maximum non-coincidental annual rate of $5/kwh. An example business or home would seek to reduce demand (D) during peak hours using demand reduction (DR) techniques. Previously, the peak period of demand was from 12 pm-6 pm. Today, the peak time period has shifted in certain geographic regions to the period of combined periods 112 and 114, of between the hours of 4 PM and 9 PM, when peak demand charges are high, and that peak period is an ideal time to use a battery to reduce demand, for example. However, sizing an exemplary BTM renewable and battery/energy storage systems optimally based on the load curve is important to ensure that there is enough power generation capacity to reduce the load, as well as, to ensure that there is enough energy storage, e.g., battery capacity, available during the exemplary approximately 5-hour peak time period. Load curves can vary by which of the 365 days of the year, since certain energy consumption demands and energy sources may vary by time of the year.

Conventional systems require electric power transmission and distribution system operators and utilities to build infrastructure to support peak demand, the costs of which are passed on to the customer, for example, via tariffs including demand response programs, market-based pricing, and other time-based pricing. While incentives may be offered to reduce demand during peak times, customers are often not in a position to reduce power usage through conventional load reduction and load shifting measures and as such, have instead attempted to employ the use of, for example, on-site energy storage systems (e.g., batteries) or other energy assets. However, the customer then bears the cost of having the on-site energy storage system installed, maintained, and operated and, furthermore, bears the risk that the cost savings do not justify the expenditures. Moreover, the utilities generally have no control over deployment and operation of the on-site energy storage systems deployed in the field and cannot rely on these resources like other traditional generators as firm capacity products, for purposes such as resource adequacy.

Small to medium-sized commercial and industrial customers do not conventionally have resources or capability to manage daily operations of their energy generation and storage systems on a real-time basis. What is needed is a manner of seamlessly managing BTM systems to both maximize savings as well as optimally use the energy generation and storage systems.

Many conventional control systems have a "set it" and "forget it" approach to deploying BTM storage. This approach means that the exemplary conventional controller solutions fail to take into consideration real time building load and impact of other technologies that impact shape and volatility of the load curve and tools that could assist in keeping load stable.

What is needed then are systems and methods to overcome shortcomings of conventional solutions to provide customers with greater control over their source of energy and use of assets that could reduce energy bills of the customers.

SUMMARY OF THE DISCLOSURE

According to one example embodiment, a computer-implemented whole building or campus entity, energy management and energy control optimization, data presentation and visualization dashboard system, apparatus, method, and/or computer program product may include, e.g., but not limited to, providing a computer processor service provider system wherein the computer processor service provider system comprises a cloud-based computer processor service provider system, the method may include: displaying, by the at least one electronic computer processor, output interactively via an electronic dashboard graphical user interface (GUI) comprising at least one GUI element enabling interactive user receipt of inputting interactive selections, and providing, by the at least one electronic computer processor, of output relating to said interactive selections comprising at least one or more of the following: a heat map; a financial energy savings calculation; a color coding of energy production depicting at least one or more of: actual energy production, weather normalized energy production, or predicted energy production; or a color coding of energy usage performance based upon an automatically calculated comparison of expected energy production to actual energy production; a color-coded representation of monetization comprising at least one or more of: multi-colored lines on a graphically displayed chart metaphor GUI element; or multiple revenue streams; a visual comparison of data between different time periods; or an artificial intelligence (AI)-enabled data showing at least one or more of: anticipated production data, or anticipated consumption data.

In one example embodiment, the method may further include reducing, by at least one electronic computer processor of the cloud-based computer processor service provider system, energy and demand costs through whole building or campus entity energy management of a building or campus entity load by at least one or more of: optimizing energy usage; optimizing energy generation; maximizing demand reduction and utility savings through optimal control of: the energy usage, and the energy generation, or reducing energy costs; and using at least one energy storage system device; simulating, by the at least one electronic computer processor, said building or campus entity load comprising at least one or more of: using, by the at least one electronic computer processor, predictive analytics; or receiving, by the at least one electronic computer processor, user inputs of an event schedule that impacts said building or campus entity load; performing, by the at least one electronic computer processor, optimization at the start of the billing cycle comprising establishing, by the at least one computer processor, a demand reduction target achievable with the at least one energy storage system device implemented; setting, by the at least one electronic computer processor, a periodic schedule for discharge of the at least one energy storage system device discharge and allocate a portion of energy storage capacity to a reserve to be used in the event of volatility in said building or campus entity load; determining, by the at least one electronic computer processor, whether there is unused capacity of the at least one energy storage system device at an end of a period, and responsive to the determining, redistributing, by the at least one computer processor, any of the unused capacity to a remaining period of the periodic schedule; or resetting, by the at least one electronic computer processor, the demand reduction target for each time-of-use period to what was achieved in the previous period for the same billing period.

According to an example embodiment, certain embodiments do not need an onsite controller. According to an example embodiment, the dashboard, according to an example embodiment, could work with just a cloud-based controller, remote controller, and/or standalone controller, and/or onsite controller, access may occur via, e.g., but not limited to, through an application programming interface (API) access and/or read of other example on-site equipment installed by others, and/or through minimal equipment installed by Applicant such as, e.g., but not limited to, an electronic meter, and electronic smart meter, and/or an electronic data logger. The system according to claim 1, wherein said system comprises at least one or more of: a flat screen panel; a digital television; a flat television; a touchscreen; a touch-enabled display; a touch-based display; a touch sensitive interface; a user interface displaying device; a kiosk; a mobile device; a smartphone; a tablet; or a phablet.

A system, method and computer program product for providing a whole building or campus entity, energy management and energy control optimization, data presentation and visualization dashboard system may include, according an example embodiment, a computer processor service provider system wherein the computer processor service provider system may include a cloud-based computer processor service provider system which may include, e.g., but not limited to: at least one application server comprising the whole building or campus entity, energy management and energy control optimization system executing in the cloud-based computer processor service provider system; and an onsite energy controller coupled to the cloud-based computer processor service provider system by an electronic communications network; wherein the onsite energy controller may include: at least one electronic computer processor; and at least one electronic computer memory coupled to the at least one electronic computer processor; wherein the at least one electronic computer processor of the onsite energy controller is configured to: reduce energy and demand costs through whole building or campus entity energy management of a building or campus entity load including by being configured to at least one or more of: optimize energy usage; optimize energy generation; maximize demand reduction and utility savings through optimal control of: the energy usage, and the energy generation, or reduce energy costs; and use of at least one energy storage system device; simulate the building or campus entity load by use of at least one or more of: predictive analytics; or receive user inputs of an event schedule that impacts the building or campus entity load; perform optimization at the start of the billing cycle to establish a demand reduction target achievable with the at least one energy storage system device implemented; set a periodic schedule for discharge of the at least one energy storage system device and allocate a portion of energy storage capacity to a reserve to be used in the event of volatility in the building or campus entity load; determine whether there is unused capacity of the at least one energy storage system device at an end of a period, and responsive to the determination, redistribute any of the unused capacity to a remaining period of the periodic schedule; and reset the demand reduction target for each time-of-use period to what was achieved in the previous period for the same billing period; and wherein the at least one electronic computer processor of the onsite energy controller is configured to: display output interactively via an electronic dashboard graphical user interface (GUI) comprising at least one GUI element enabling interactive user receipt of input and provision of output relating to at least one or more of the following: a heat map; a financial energy savings calculation; a color coding of energy production depicting at least one or more of: actual energy production, weather normalized energy production, or predicted energy production; or a color coding of energy usage performance based upon an automatically calculated comparison of expected energy production to actual energy production; a color coded representation of monetization comprising at least one or more of: multi-colored lines on a graphically displayed chart metaphor GUI element; or multiple revenue streams; visual comparison of data between different time periods; or artificial intelligence (AI)-enabled data showing at least one or more of: anticipated production data, or anticipated consumption data.

According to another example embodiment, the system may include where the different time periods of the visual comparison may include at least one or more of: a year; a month; a week; a day; a multi-day period; a multi-week period; a multi-month period; or a multi-year period.

According to another example embodiment, the system may include where the multi-color representation may include at least one or more of: a black line; a blue line; or a green line.

According to another example embodiment, the system, method or computer program product may a computer-implemented whole building or campus entity, energy management and energy control optimization, data presentation and visualization dashboard method including providing a computer processor service provider system wherein the computer processor service provider system may include a cloud-based computer processor service provider system, the method may include: reducing, by at least one electronic computer processor of the cloud-based computer processor service provider system, energy and demand costs through whole building or campus entity energy management of a building or campus entity load by at least one or more of: optimizing energy usage; optimizing energy generation; maximizing demand reduction and utility savings through optimal control of: the energy usage, and the energy generation, or reducing energy costs; and using at least one energy storage system device; simulating, by the at least one electronic computer processor, an the building or campus entity load comprising at least one or more of: using, by the at least one electronic computer processor, predictive analytics; or receiving, by the at least one electronic computer processor, user inputs of an event schedule that impacts the building or campus entity load; performing, by the at least one electronic computer processor, optimization at the start of the billing cycle comprising establishing, by the at least one computer processor, a demand reduction target achievable with the at least one energy storage system device implemented; setting, by the at least one electronic computer processor, a periodic schedule for discharge of the at least one energy storage system device discharge and allocate a portion of energy storage capacity to a reserve to be used in the event of volatility in the building or campus entity load; determining, by the at least one electronic computer processor, whether there is unused capacity of the at least one energy storage system device at an end of a period, and responsive to the determining, redistributing, by the at least one computer processor, any of the unused capacity to a remaining period of the periodic schedule; resetting, by the at least one electronic computer processor, the demand reduction target for each time-of-use period to what was achieved in the previous period for the same billing period; displaying, by the at least one electronic computer processor, output interactively via an electronic dashboard graphical user interface (GUI) comprising at least one GUI element enabling interactive user receipt of inputting interactive selections, and providing, by the at least one electronic computer processor, of output relating to the interactive selections comprising at least one or more of the following: a heat map; a financial energy savings calculation; a color coding of energy production depicting at least one or more of: actual energy production, weather normalized energy production, or predicted energy production; or a color coding of energy usage performance based upon an automatically calculated comparison of expected energy production to actual energy production; a color coded representation of monetization comprising at least one or more of: multi-colored lines on a graphically displayed chart metaphor GUI element; or multiple revenue streams; a visual comparison of data between different time periods; or an artificial intelligence (AI)-enabled data showing at least one or more of: anticipated production data, or anticipated consumption data.

According to yet another example embodiment, the system, method or computer program product may include a whole building or campus entity, energy management and energy control optimization nontransitory computer accessible media, embodying program instructions, which when executed on at least one electronic computer processor of a cloud-based computer processor service provider system, perform a method as described above.

According to an example embodiment, the system, method or computer program product may include, where the predictive analytics is used to obtain a prediction of at least one or more of: a) the building or campus entity load, b) the energy generation comprising solar production, or c) electric vehicle (EV) charging; and may further include: where the at least one electronic computer processor of the onsite energy controller is configured to: determine how to reduce the building or campus entity load, by at least one or more of: wherein the at least one electronic computer processor of the onsite energy controller is configured to at least one of: use the at least one energy storage system device; use load shedding, or reducing other building loads comprising at least one or more of: reducing lighting building loads, reducing at least one or more of heating or cooling, or reducing hot water. Today, some EV vehicles include not only terrestrial EV, but also air based EVs, which may take over vertically, in the case of electric vertical take off and landing vehicles (eVTOL) aircraft such as, e.g., but not limited to, electric VTOL vehicles from JOBY AIRCRAFT, ARCHER AIRCRAFT, BETA AIRCRAFT, and the like, as well as various terrestrial automobile electric vehicles (EVs) from companies such as, TESLA (S, X, 3, Cybertruck, Roadster, etc.), NIO, BYD, LUCID AIR, RIVIAN (R1S, R1T) and conventional automobile manufacturers' vehicles, including, e.g., but not limited to, NISSAN (LEAF, ARIYA), MINI COOPER EV, MAZDA MX-30, GMC (e.g., CHEVY BOLT, CHEVY VOLT, HUMMER EV PICKUP, CADILLAC LYRIQ, etc.), VOLKSWAGEN (ID.3, ID.4, e-GOLF), AUDI (E-TRON GT, Q4 E-TRON), VOLVO (XC40, C40), PORSCHE (TAYCAN CROSS TURISMO), BMW (i4, iX3, i3, iX), FORD (F-150 LIGHTNING, MACH E), KIA (e-NIRO, EV6), HYUNDAI (IONIQ 5, KONA ELECTRIC), RANGE ROVER EVOQUE, POLESTAR 2, JAGUAR i-PACE, FISKER OCEAN, SUBARU SOLTERRA, TOYOTA (BZ4X), GENESIS ELECTRIFIED G80, BYTON M-BYTE, MERCEDES (EQS), etc.

According to an example embodiment, the system may include, where the electronic dashboard graphical user interface (GUI) is configured to display at least one or more of: a scheduled deployment strategy based upon at least one or more of the energy usage, the energy generation sources; and actual energy optimization output.

According to an example embodiment, the system may include, where the electronic dashboard graphical user interface (GUI) is configured to integrate with at least one or more of: an accounting system; or a customer relationship management system (CRM).

According to an example embodiment, the system may include, where the CRM system may include at least one or more of: a SALESFORCE CRM; a sales management system, another electronically accessible CRM system.

According to an example embodiment, the system may include, where the integration of the electronic dashboard GUI with the at least one or more of the accounting system, or the CRM obtains an end-to-end energy optimization solution for at least one or more of an energy developer or contractor.

According to an example embodiment, the system may include, where, when a new client is entered into the CRM, and when at least one project of the at least one or more of the energy developer.

According to an example embodiment, the system may include, where the electronic dashboard may include at least one or more of: seamlessly integrates with a customer relationship management (CRM) system to monitor production; or seamlessly integrates with an accounting system to monitor returns or savings.

Although described in terms of an apparatus or system embodiment, other alternative exemplary embodiments can be directed to a system, method, computer program product, mobile application, a web-based application program, a cloud-based software application as a service, a distributed workstation and/or PC-based application software program, a console application, a virtual reality application, an augmented reality application, mobile application, and/or other well known computer system format; including, in an exemplary embodiment, energy story system device sizing and management, according to an exemplary embodiment.

According to one exemplary embodiment, an apparatus, system, method, computer program product and/or application, can be provided according to an exemplary embodiment of the invention, wherein an exemplary embodiment can include, e.g., but not limited to, a method including reducing energy and demand costs through management of an entity load by using an energy storage system device simulating the entity load including using predictive analytics; or receiving user inputs of an event schedule that impacts entity load; performing optimization at the start of the billing cycle including establishing a demand reduction target achievable with the energy storage system device implemented; setting a periodic schedule for the energy storage system device discharge and allocate a portion of energy storage capacity to a reserve to be used in the event of volatility in entity load; determining whether there is unused capacity of the energy storage system device at an end of a period, and responsive to the determining, redistributing any of the unused capacity to a remaining period of the schedule; and resetting the demand reduction target for each time-of-use period to What was achieved the previous period for the same billing period.

According to another exemplary embodiment, a nontransitory computer readable medium embodying instructions thereon, can when executed by at least one computer processor can provide a method including, e.g., but not limited to, reducing energy and demand costs through management of an entity load by using an energy storage system device; simulating the entity load including using predictive analytics; or receiving user inputs of an event schedule that impacts entity load; performing optimization at the start of the billing cycle including establishing a demand reduction target achievable with the energy storage system device implemented; setting a periodic schedule for the energy storage system device discharge and allocate a portion of energy storage capacity to a reserve to be used in the event of volatility in entity load; determining whether there is unused capacity of the energy storage system device at an end of a period, and responsive to the determining, redistributing any of the unused capacity to a remaining period of the schedule; and resetting the demand reduction target for each time-of-use period to what was achieved the previous period for the same billing period, according to an exemplary embodiment.

According to an exemplary embodiment, a system can include: a computer processor service provider system; and an onsite controller coupled to the computer processor service provider system by a communications network; wherein the onsite controller can include: at least one computer processor; and at least one computer memory coupled to the at least one processor; wherein the at least one processor of the onsite controller is configured to: reduce energy and demand costs through management of an entity load by use of at least one energy storage system device; simulate an entity load by use of at least one or more of: predictive analytics; or receive user inputs of an event schedule that impacts entity load; perform optimization at the start of the billing cycle to establish a demand reduction target achievable with the energy storage system device implemented; set a periodic schedule for the energy storage system device discharge and allocate a portion of energy storage capacity to a reserve to be used in the event of volatility in entity load; determine whether there is unused capacity of the energy storage system device at an end of a period, and responsive to the determination, redistribute any of the unused capacity to a remaining period of the schedule; and reset the demand reduction target for each time-of-use period to what was achieved the previous period for the same billing period.

According to one exemplary embodiment, the system may include where the energy storage system device can include at least one or more of: at least one battery; at least one lithium ion battery; at least one lead acid battery; at least one heat exchanger system; or at least one compressed air energy storage device.

According to one exemplary embodiment, the system may include where the entity can include at least one or more of: a building; a campus; a business; a residential home; a commercial business; a governmental building; a private building; a public building; a group of associated buildings; an investor owned utility or a municipal utility a university; or a school.

According to one exemplary embodiment, the system may include where the at least one processor of the onsite controller is configured to simulate an entity load can include wherein the at least one processor is configured to at least one or more of: receive dynamic electric vehicle (EV) load based on at least one or more of: at least one type of an EV; or a frequency of charging of an EV at a specific location; or simulate the entity load from impact of EV charging.

According to one exemplary embodiment, the system may include where the received EV load, or the simulation of the entity load from impact of the EV charging can include wherein the at least one processor is configured to: receive EV load or simulate impact of the EV charging can include: at least one TESLA electric vehicle; at least one automotive electric vehicle; at least one sport utility vehicle electric vehicle; at least one electric truck vehicle; at least one motor cycle electric vehicle; at least one tractor trailer electric vehicle; any kind of municipal fleet vehicle; at least one postal vehicle; at least one bus; or at least one garbage truck.

According to one exemplary embodiment, the system may include where the received EV load or the simulation of the entity load from impact of the EV charging can include wherein the at least one processor is configured to: simulate impact of the EV charging can include: at least one battery type; at least one charger type; at least one DC charger; at least one fast DC charger; at least one AC charger; at least one predetermined frequency of charging; at least one predetermined number of simultaneous electric vehicles charging; at least one historical data of electric vehicle charging; at least one machine learning prediction of an expected number of EV charging in a given time period; at least one seasonality effect on EV charging; or at least one expected number of EV vehicles on the road as a proportion of market share to calculate entity load.

According to one exemplary embodiment, the system may include where the management can include real-time management.

According to one exemplary embodiment, the system may include where the at least one processor is configured to reduce the energy and the demand costs through management of the entity load further can include: at least one load shedding process.

According to one exemplary embodiment, the system may include where the computer processor service provider system can include a cloud-based computer processor service provider system.

According to one exemplary embodiment, the system may include where the cloud-based computer processor service provider system can include at least one or more of: an AMAZON WEB SERVICES (AWS) cloud-based system; a GOOGLE cloud-based system; a MICROSOFT cloud-based system; an IBM cloud-based system; or another cloud-based system.

According to one exemplary embodiment, the system may include where the predictive analytics can include at least one or more of: machine learning (ML)-based analysis system, or an artificial intelligence (AI)-based analysis system, based on at least one or more of: weather data can include at least one or more of: temperature data can include at least one or more of: heating degree days, cooling degree days, or humidity, cloud cover data, or other weather element data; historical data can include at least one or more of: week of the year data, previous energy efficiency improvements, or ongoing energy efficiency improvements; current occupancy rates; or impact of electric vehicle (EV) charging can include at least one or more of: at least one battery type; at least one charger type; at least one DC charger; at least one fast DC charger; at least one AC charger; at least one predetermined frequency of charging; at least one predetermined number of simultaneous electric vehicles charging; at least one historical data of electric vehicle charging; at least one machine learning prediction of an expected number of EV charging in a given time period; at least one seasonality effect on EV charging; or at least one expected number of EV vehicles on the road as a proportion of market share to calculate entity load.

According to one exemplary embodiment, the system may include where the entity load can include at least one or more of: a daily entity load; an entity load for a period of time; an entity load for a fraction of a day; an entity load for an increment of time; an entity load for an up to a 15 minute increment of time; an entity load for a 15 minute increment of time; an entity load for a 1 day period; an entity load for a 2 day period; an entity load for a 3 day period; an entity load for a 4 day period; an entity load for a 3-4 day period; an entity load for a 5 day period; an entity load for a 6 day period; an entity load for a 7 day period; an entity load for a one week period; an entity load for a multiple week period; an entity load for a month long period; an entity load for a multiple month period; an entity load for a season long period; an entity load for a multiple season long period; an entity load for a year long period; or an entity load for a multiple year long period.

According to one exemplary embodiment, the system may include where the event schedule can include at least one or more of: a daily event schedule; a daily periodic schedule; a daily minute-by-minute schedule; an event schedule for a period of time; an event schedule for a fraction of a day; an event schedule for an increment of time; an event schedule for an up to a 15 minute increment of time; an event schedule for a 15 minute increment of time; an event schedule for a 1 day period; an event schedule for a 2 day period; an event schedule for a 3 day period; an event schedule for a 4 day period; an event schedule for a 3-4 day period; an event schedule for a 5 day period; an event schedule for a 6 day period; an event schedule for a 7 day period; an event schedule for a one week period; an event schedule for a multiple week period; an event schedule for a month long period; an event schedule for a multiple month period; an event schedule for a season long period; an event schedule for a multiple season long period; an event schedule for a year long period; or an event schedule for a multiple year long period.

According to one exemplary embodiment, the system may include where the demand reduction target can include at least one or more of: a daily demand reduction target; a demand reduction target for a period of time; or a demand reduction target for a fraction of a day; a demand reduction target for an increment of time; a demand reduction target for an up to a 15 minute increment of time; a demand reduction target for a 15 minute increment of time; a demand reduction target for a 1 day period; a demand reduction target for a 2 day period; a demand reduction target for a 3 day period; a demand reduction target for a 4 day period; a demand reduction target for a 3-4 day period; a demand reduction target for a 5 day period; a demand reduction target for a 6 day period; a demand reduction target for a 7 day period; a demand reduction target for a one week period; a demand reduction target for a multiple week period; a demand reduction target for a month long period; a demand reduction target for a multiple month period; a demand reduction target for a season long period; a demand reduction target for a multiple season long period; a demand reduction target for a year long period; or a demand reduction target for a multiple year long period.

According to one exemplary embodiment, the system may include where the time-of-use period can include at least one or more of: peak; off peak; super off peak; charging off peak; discharging peak; or another time-of-use period.

According to one exemplary embodiment, the system may include where the at least one computer processor is configured to: determine one or more of: whether actual entity load is greater than a predicted load; or whether on-site renewable energy production does not sufficiently meet the predicted load and the energy storage system device usage is higher than what was set aside including reserve, and responsive to the determination, start automatic load shedding based on priorities set by owner of the entity.

According to one exemplary embodiment, the system may include where the automatic load shedding can include at least one of: shed lighting load in certain parts of the entity; shed other electricity demand load of the entity; shed non-essential electricity demand load of the entity; maintaining essential electricity demand load for essential services of the entity; shed air conditioning load; shed heating load; shed heating ventilation air conditioning (HVAC) load; cut off power to an EV charging station; cut off air conditioning load; cut off heating; cut off fan; or perform another predetermined load shedding function.

According to one exemplary embodiment, the system may further include where the at least one computer processor is configured to: participate in at least one utility service can include at least one or more of: demand response; frequency management; or another ancillary service.

According to an exemplary embodiment, the system can further include using at least one alternative energy generation source can include at least one or more of: an alternative energy generation source; a solar energy generation source; a turbine-based energy generation source; a wind turbine energy generation source; a renewable energy generation source; a direct current (DC) based energy generation source; an alternating current (AC) based energy generation source; a hybrid energy generation source; a diesel generator energy generation source; a hydrogen fuel cell energy generation source; a nuclear energy generation source; a heat based energy generation source; a combined heat and power (CHP) energy generation source; a generator energy generation source; a solar panel energy generation source; an electronic vehicle solar energy generation source; a water based turbine energy generation source; a turbocharged energy generation source; or a supercharged energy generation source.

According to yet another exemplary embodiment, a method may include reducing, by at least one computer processor, energy and demand costs through management of an entity load by using at least one energy storage system device; simulating, by the at least one computer processor, an entity load can include at least one or more of: using, by the at least one computer processor, predictive analytics; or receiving, by the at least one computer processor, user inputs of an event schedule that impacts entity load; performing, by the at least one computer processor, optimization at the start of the billing cycle can include establishing, by the at least one computer processor, a demand reduction target achievable with the energy storage system device implemented; setting, by the at least one computer processor, a periodic schedule for the energy storage system device discharge and allocate a portion of energy storage capacity to a reserve to be used in the event of volatility in entity load; determining, by the at least one computer processor, whether there is unused capacity of the energy storage system device at an end of a period, and responsive to the determining, redistributing, by the at least one computer processor, any of the unused capacity to a remaining period of the schedule; and resetting, by the at least one computer processor, the demand reduction target for each time-of-use period to what was achieved the previous period for the same billing period.

According to another exemplary embodiment, a nontransitory computer accessible media, embodying program instructions, which when executed on at least one electronic computer processor, may perform a method including reducing, by at least one computer processor, energy and demand costs through management of an entity load by using at least one energy storage system device; simulating, by the at least one computer processor, an entity load can include at least one or more of: using, by the at least one computer processor, predictive analytics; or receiving, by the at least one computer processor, user inputs of an event schedule that impacts entity load; performing, by the at least one computer processor, optimization at the start of the billing cycle can include establishing, by the at least one computer processor, a demand reduction target achievable with the energy storage system device implemented; setting, by the at least one computer processor, a periodic schedule for the energy storage system device discharge and allocate a portion of energy storage capacity to a reserve to be used in the event of volatility in entity load; determining, by the at least one computer processor, whether there is unused capacity of the energy storage system device at an end of a period, and responsive to the determining, redistributing, by the at least one computer processor, any of the unused capacity to a remaining period of the schedule; and resetting, by the at least one computer processor, the demand reduction target for each time-of-use period to what was achieved the previous period for the same billing period.

BRIEF DESCRIPTION OF VARIOUS EXEMPLARY EMBODIMENTS OF THE PRESENT INVENTION

The foregoing and other features and advantages of the invention will be apparent from the following, more particular description of various example embodiments of the invention, including any preferred embodiments, as illustrated in the accompanying drawings wherein like reference numbers generally indicate identical, functionally similar, and/or structurally similar elements. The left most digits in the corresponding reference number indicate the drawing in which an element first appears.

Various exemplary features and advantages of the disclosure will be apparent from the following, more particular description of exemplary embodiments of the present disclosure, as illustrated in the accompanying drawings wherein like reference numbers generally indicate identical, functionally similar, and/or structurally similar elements. The left most digits in the corresponding reference number generally indicate the drawing in which an element first appears.

FIG. 1 depicts an exemplary embodiment of an exemplary load curve diagram illustrating an exemplary embodiment of an exemplary duck-shaped load curve illustrating exemplary overgeneration risk and steep ramping, according to an exemplary embodiment;

FIG. 2 depicts an exemplary embodiment of a load diagram illustrating an exemplary embodiment of an exemplary entity (e.g., but not limited to, building, home, office, commercial entity, and/or hotel, etc.) energy consumption load curve illustrating exemplary energy consumption, and illustrating exemplary opportunity to shift demand using, e.g., but not limited to, an exemplary energy storage device (e.g., but not limited to, battery, etc.) to charge off peak, to use stored energy by discharging during peak pricing to reduce overall energy costs, according to an exemplary embodiment;

FIG. 3 depicts an exemplary embodiment of a diagram illustrating an exemplary embodiment of a utilities time of use (TOU) tariff rates in an exemplary US$/kwh over the time period of an exemplary day illustrating exemplary increased price per charged/tariffed per kwh by the time of day, examples of tariffs include, e.g., but are not limited to, utility rates, peak rates, midpeak rates, maximum monthly rates, maximum annual rates, feed-in tariffs, tax credits, renewable energy certificates, allowances, etc., according to an exemplary embodiment;

FIG. 4 depicts an exemplary embodiment of a diagram illustrating an exemplary embodiment of solar energy production, i.e., exemplary energy generation over the course of an exemplary day, as may vary with exemplary weather conditions, etc., illustrating kwh energy generation and noting timing relative to utility peak pricing periods, charting exemplary energy (in kwh) generated over the time periods of an exemplary day, examples include, e.g., but not limited to, PV, solar panels, a wind turbine, a diesel generator, a hydrogen fuel cell, geothermal heat exchanger, grid-attached and non-grid attached energy source, fuel cell, turbine, solar, alternative, renewable energy production system, generator, etc., according to an exemplary embodiment;

FIG. 5 depicts an exemplary embodiment of a diagram illustrating an exemplary embodiment of an exemplary charging and discharging cycle of an exemplary energy storage device such as, e.g., but not limited to, an energy storage battery, etc. as may be used for shifting energy over a time period of an exemplary day, according to an exemplary embodiment;

FIG. 6 depicts an exemplary embodiment of an exemplary energy generation and energy storage optimization system including an exemplary but nonlimiting cloud-based server, network and database system for storing exemplary external and exemplary internal energy data including, e.g., but not limited to, exemplary solar global horizontal irradiation projection database, exemplary tariff database, exemplary historical load plus solar production and demand reduction database, exemplary user interface application enabling entry of exemplary schedule of events per day database, exemplary site level control system including exemplary one or more computers and/or networking elements, and/or energy entity interfaces including, e.g., but not limited to, exemplary building load, electric vehicle (EV) load, solar energy generation production, wind, turbine, and/or other renewable energy generation production, utility grid access, CHP, diesel, and/or other generator generation production, and/or battery and/or other energy storage device, etc., according to an exemplary embodiment;

FIG. 7 depicts an exemplary embodiment of an exemplary energy load device such as, e.g., but not limited to, a light bulb, an exemplary energy generation device such as, e.g., but not limited to, a solar panel, an energy generation system, and/or other energy source, etc., and an exemplary energy storage device such as, e.g., but not limited to, a battery, etc., coupled to an exemplary controller device according to an exemplary embodiment;

Figure 13:
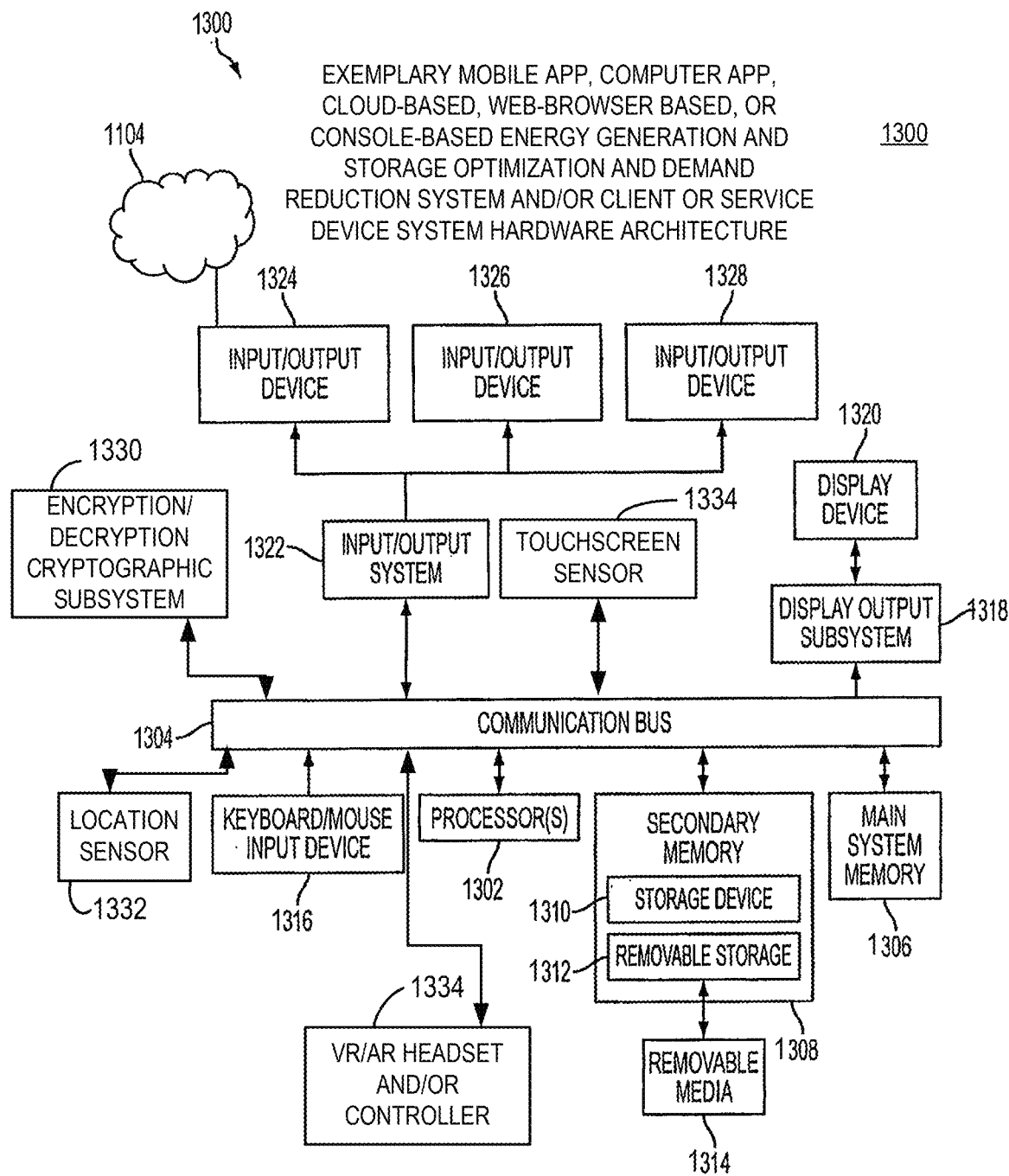
Figure 14:
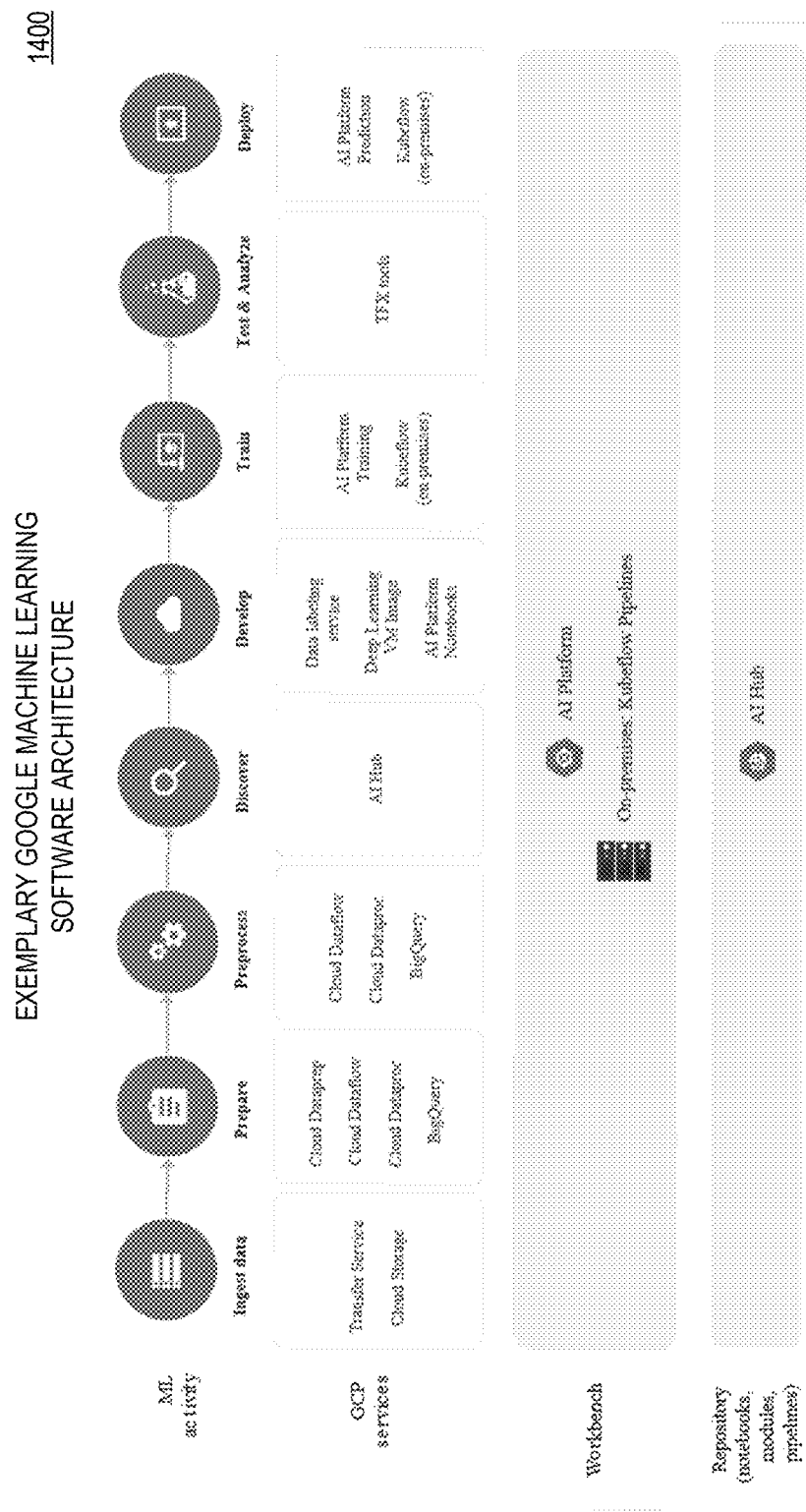
Figure 15:
Figure 16:
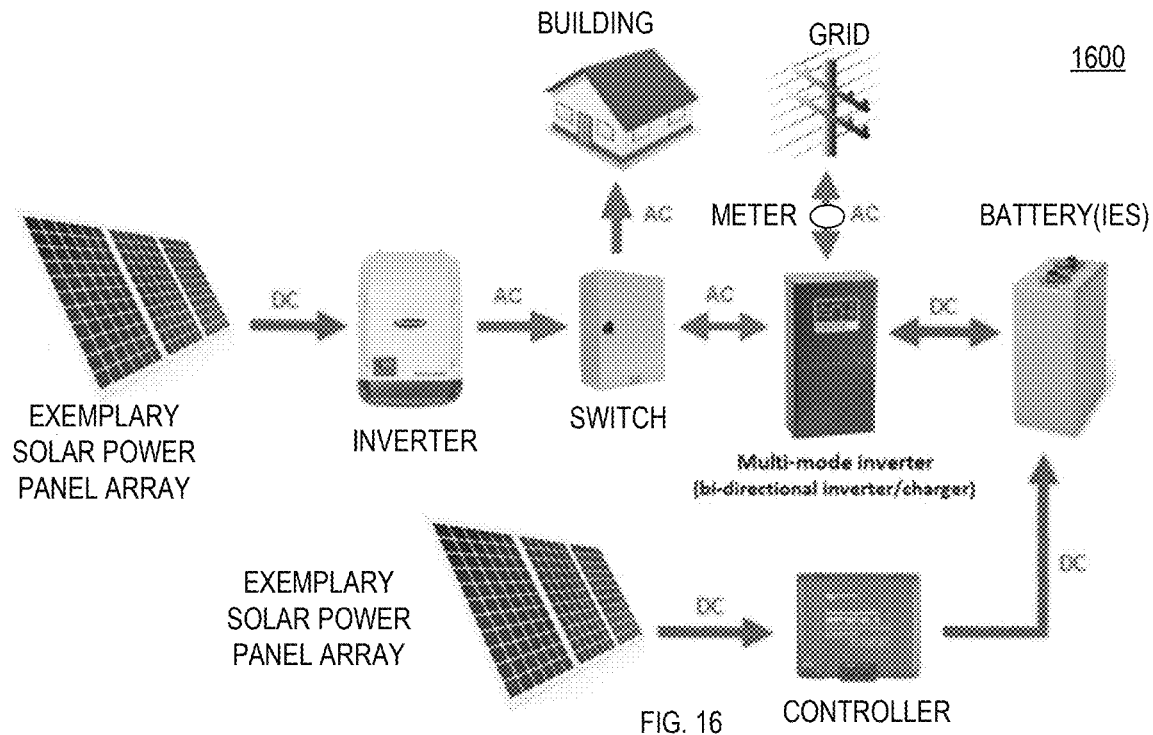
Figure 17:
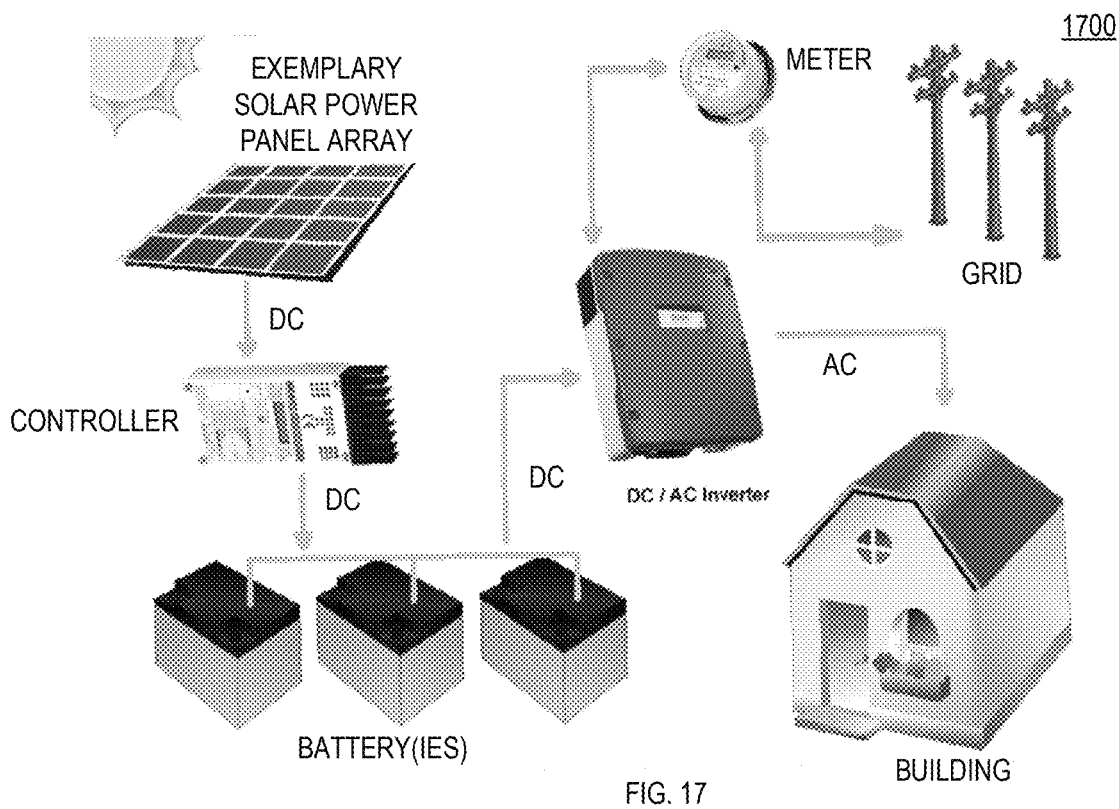
Figure 18:
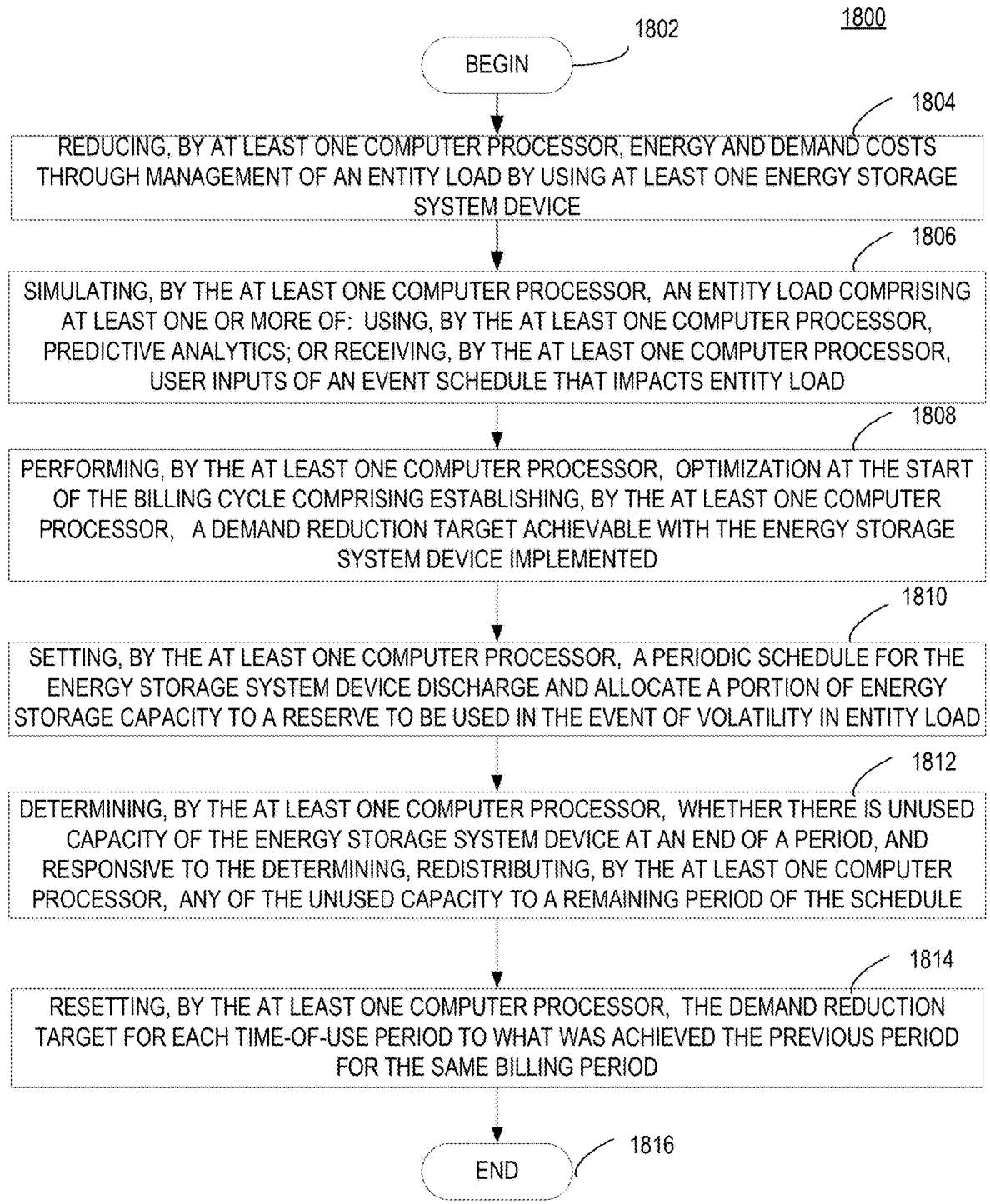
Figure 19:
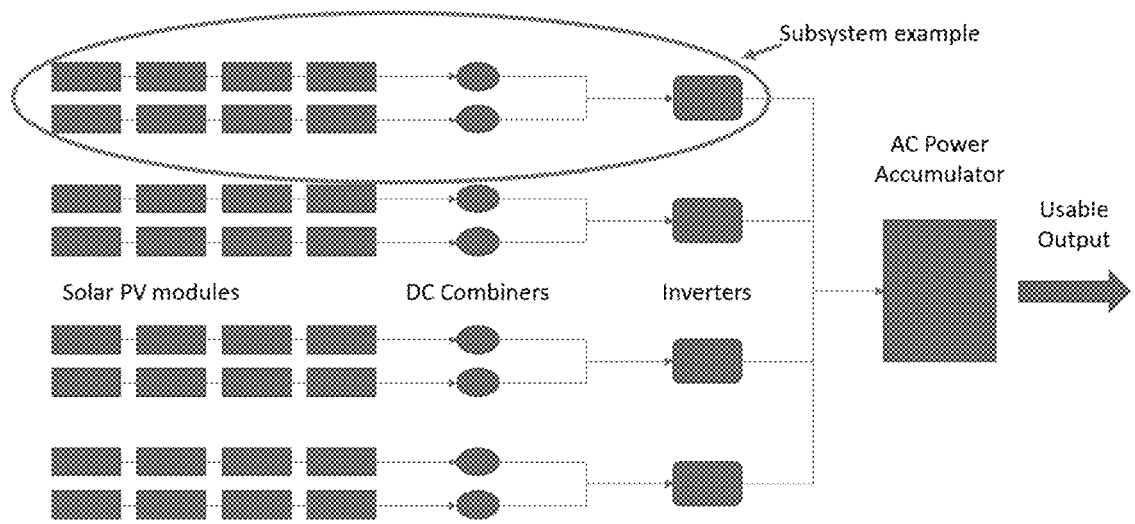
Figure 20:
Figure 21:
Figure 22:
Figure 23:
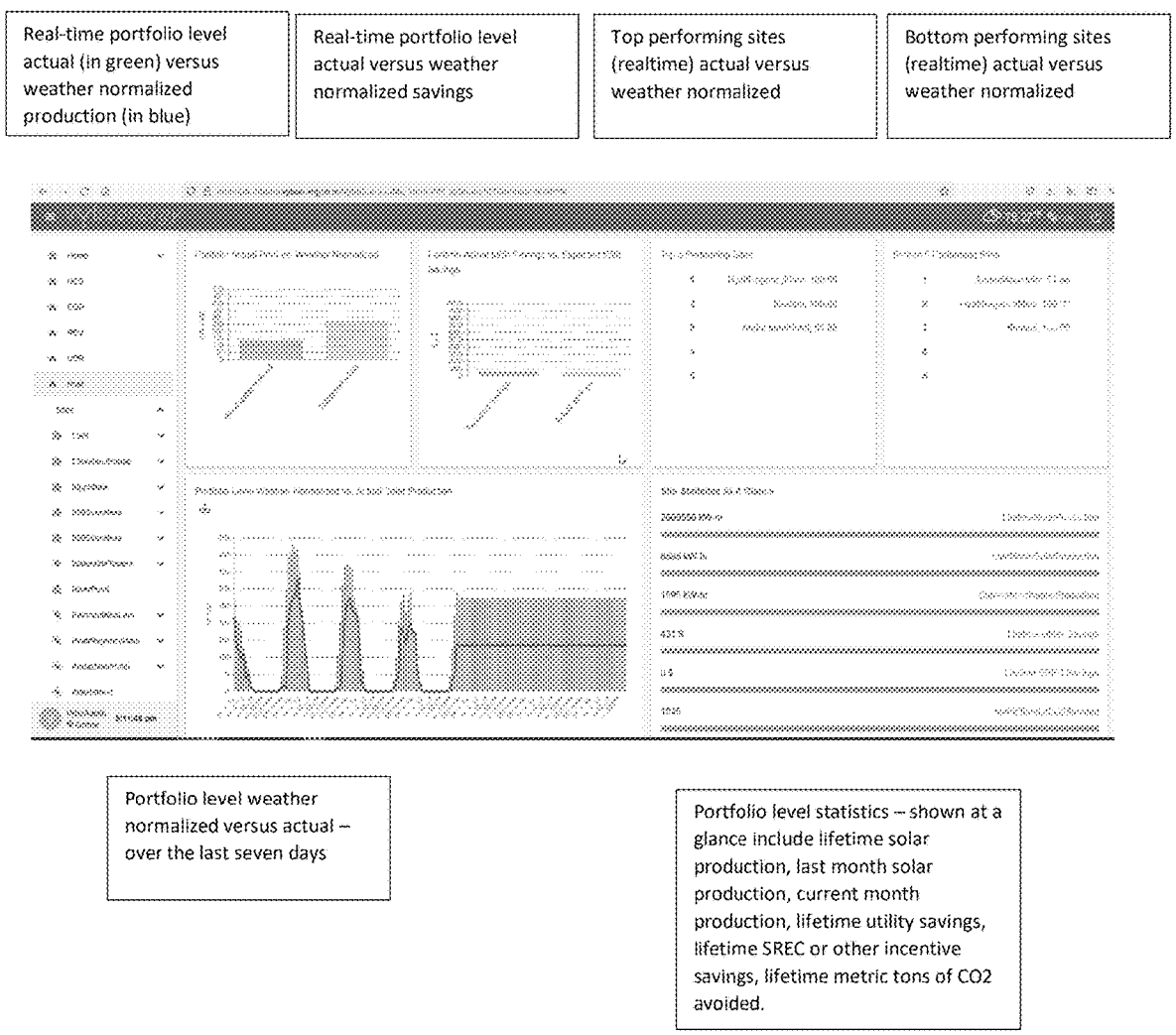
Figure 25:
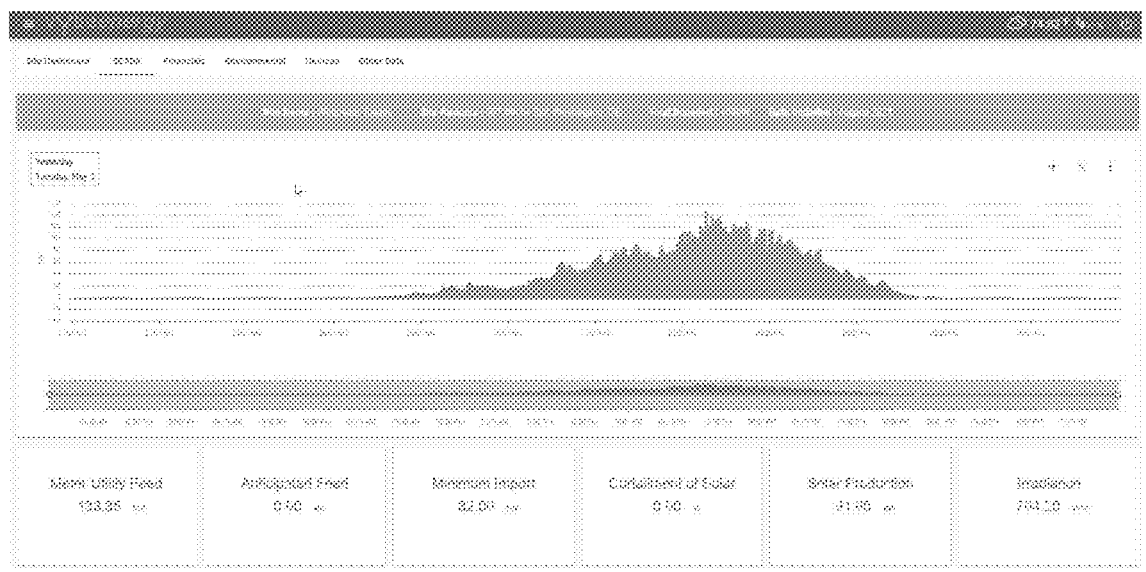
Figure 26:
Figure 27:
Figure 28:
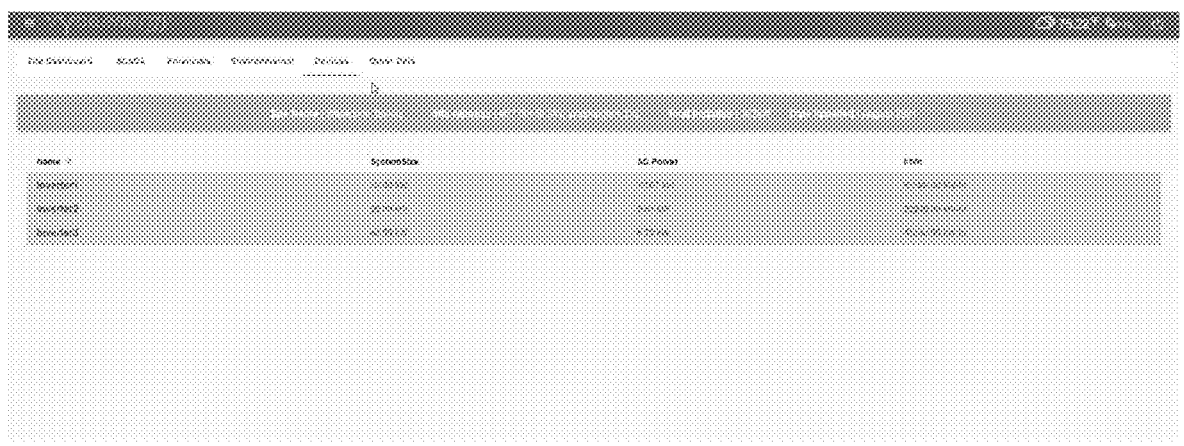
Figure 29:
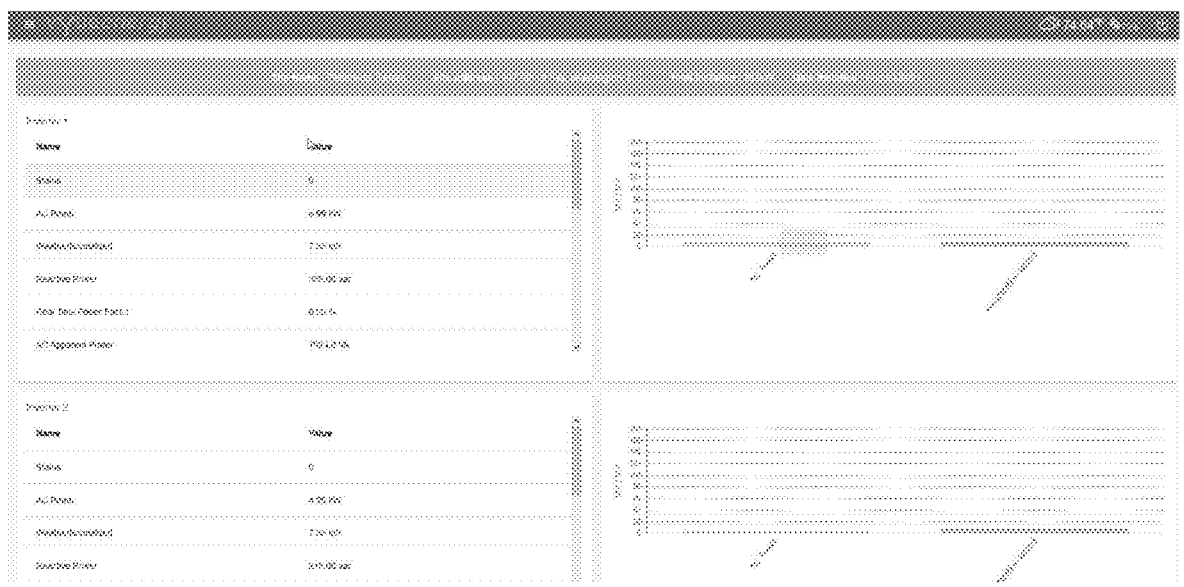
Figure 30:
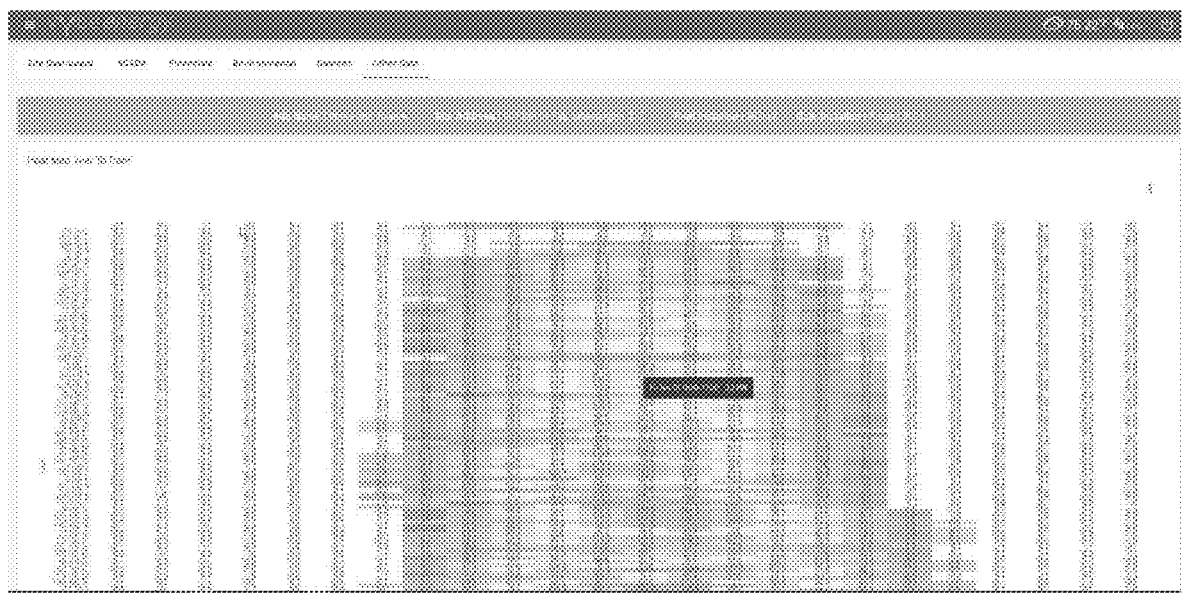

FIG. 13 depicts an exemplary embodiment of a schematic diagram illustrating an exemplary computing and communications system for providing an exemplary mobile app, computer application, and/or console based, computer-implemented energy optimization energy storage device sizing and management system, computing and/or communications device, and/or client, and/or server, and/or service provider device system hardware architecture, according to one exemplary embodiment;

FIG. 14 depicts an exemplary embodiment of an exemplary artificial intelligence (AI) platform, available from GOOGLE, a division of ALPHABET CORPORATION, of Palo Alto, CA USA, which is an exemplary, but nonlimiting machine learning (ML) platform enabling development of ML projects from ideation to production and deployment, enabling data engineering, flexibility, and an integrated tool chain for building and running ML predictive analytics applications, supporting a KUBEFLOW open-source platform, allows building portable ML pipelines, which can run on-premises or on cloud without significant code change, and including TENSORFLOW, TPUs, and TFX tools as enabling deployment of production AI applications, according to an exemplary embodiment;

FIG. 15 depicts an exemplary embodiment of an exemplary GOOGLE cloud AI technology stack as can be used to implement any of various exemplary embodiments;

FIG. 16 depicts an exemplary embodiment of a block diagram illustrating an entity with an exemplary alternating current (AC) switch coupled to a solar panel via an exemplary DC to AC inverter, AC building load devices, and a batter via an exemplary multi-mode inverter, which in an exemplary embodiment can include a bi-directional inverter/charger for charging a DC battery, the multimode inverter can be coupled to a meter to access the utility grid via AC, and the battery as shown can be further coupled to a controller device coupling the battery by DC current to an exemplary solar power panel array, the exemplary multi-mode inverter or switch can include intelligence and/or program logic of a controller, according to one exemplary embodiment;

FIG. 17 depicts an exemplary embodiment of a block diagram illustrating an entity with an exemplary direct current (DC) alternating current (AC) inverter coupled by DC to a plurality of batteries and coupled to by DC to a controller for a DC exemplary solar power panel array such as, e.g., but not limited to a photovoltaic (PV), the DC/AC inverter can be coupled to building AC loads by AC, and can be coupled to a meter to access AC utility grid energy resources, the inverter can include intelligence and/or program logic of a controller, according to one exemplary embodiment;

FIG. 18 depicts an exemplary flow diagram 1800 illustrating an exemplary process flow for an exemplary method, according to one exemplary embodiment;

FIG. 19 depicts an illustration of a description of a generic installation layout for a solar PV installation, according to an example embodiment, comprised of multiple subsystems;

FIG. 20 depicts an illustration of an example screenshot of a graphical user interface (GUI) interface of an example landing page, according to an example embodiment;

FIG. 21 depicts an illustration of an example screenshot of a graphical user interface (GUI) interface of an example map interface, providing a graphical information system (GIS) interface depicting one ore more color-coded pins, according to one embodiment, along with an example color coded legend along a left hand column, according to an example;

FIG. 22 depicts an illustration of an example screenshot of a GUI interface of an example Alarms page, according to an example embodiment;

FIG. 23 depicts an illustration of an example screenshot of a graphical user interface (GUI) interface of an example, illustrating when the user clicks on "Dashboard" on the menu bar, according to an example embodiment;

FIG. 24 depicts an illustration of an example screenshot of a graphical user interface (GUI) interface of an example illustrating how the user can click on an example specific site the user wants to explore and the dashboard will take the user to the example specific site, according to one embodiment;

FIG. 25 depicts an illustration of an example screenshot of a graphical user interface (GUI) interface of an example of a next page on the menu illustrating custom graphing where the user can look at any type of data including, e.g., but not limited to, actual production, weather normalized production, predicted, as well as inverter level data, etc., and this data can be accessed at any level of granularity or time period, according to an example embodiment;

FIG. 26 depicts an illustration of an example screenshot of a graphical user interface (GUI) interface of an example financials page, which can be viewed to show both the kW and kWh savings as well as show the overall economic impact of the project to include not only utility bill savings but also revenues from incentives, according to one example embodiment;

FIG. 27 depicts an illustration of an example screenshot of a graphical user interface (GUI) interface of an example environmental page showing an example of the total lifetime $CO_2$ savings as well as equivalencies, according to one example embodiment;

FIG. 28 depicts an illustration of an example screenshot of a graphical user interface (GUI) interface of an example Devices page shows, according to one example embodiment, the example current status of all of the devices being monitored and can include, e.g., but not limited to, as many devices, etc., as needed to include, e.g., but not limited to, not only solar, but other renewables, batteries/storage, building automation system points, EV charging, etc.;

FIG. 29 depicts an illustration of an example screenshot of a graphical user interface (GUI) interface of an example illustration of an example result of receiving a user selection of a click, or other indication of a request of on any device (such as, e.g., but not limited to, Inverters, etc.) and may take the user to another page that has more points and data as well a graph that shows actual versus weather normalized production which can be very helpful in diagnosing problems, according to one embodiment;

FIG. 30 depicts an illustration of an example screenshot of a graphical user interface (GUI) interface of an example, reached from the main site page, the example Other Data page can also display an example heat map over any time period on any data point.

Figure 31:
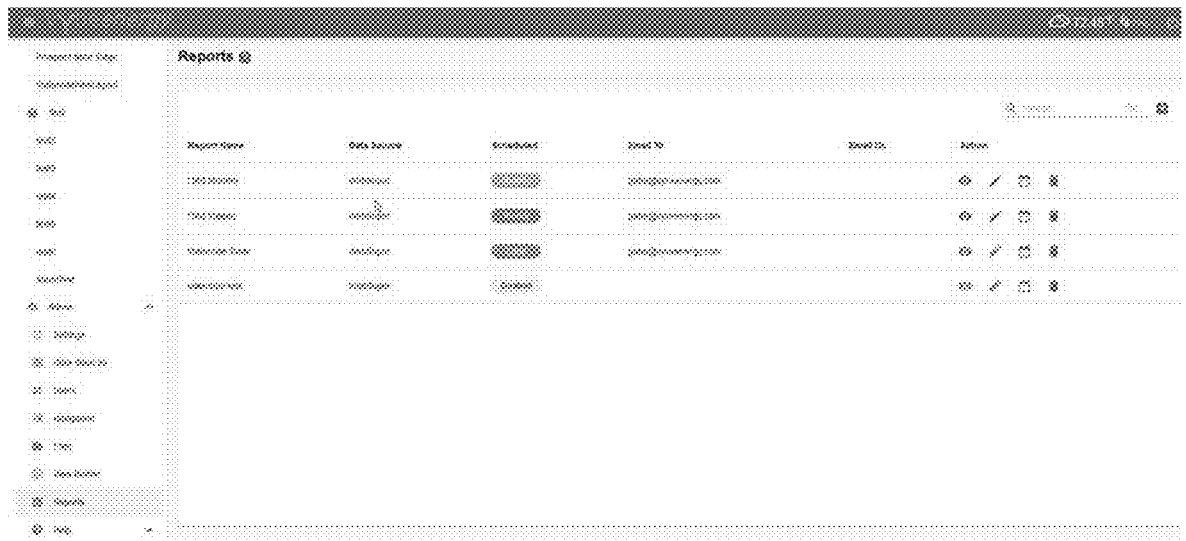
Figure 32:
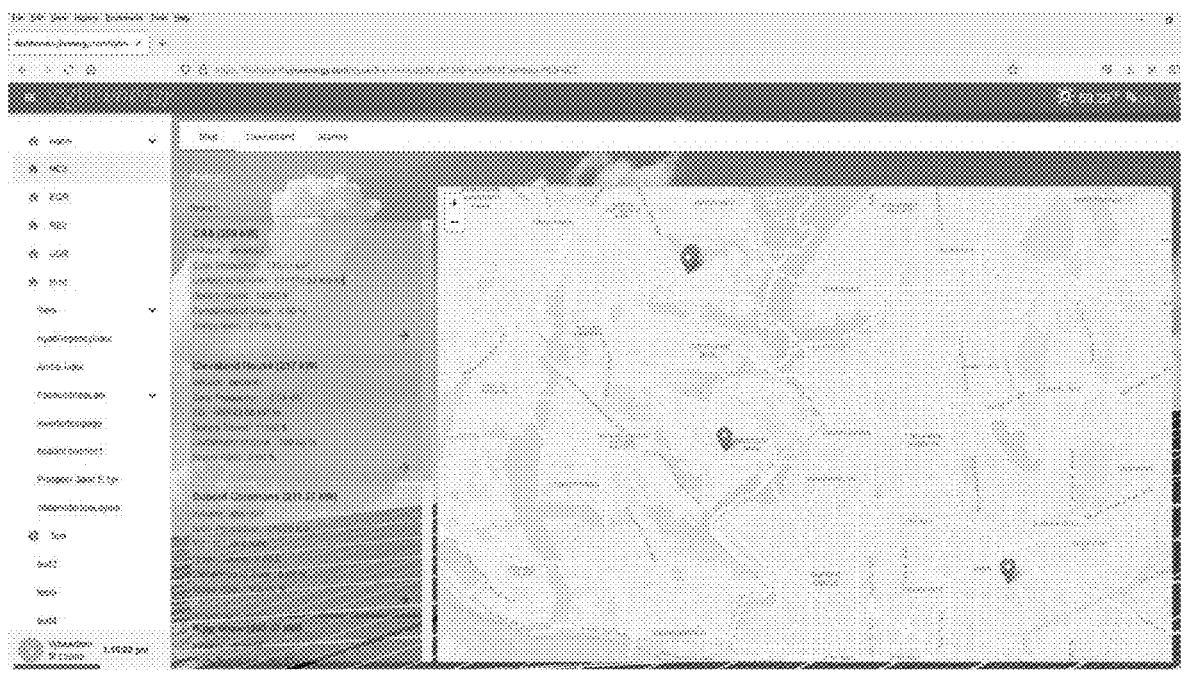
Figure 33:
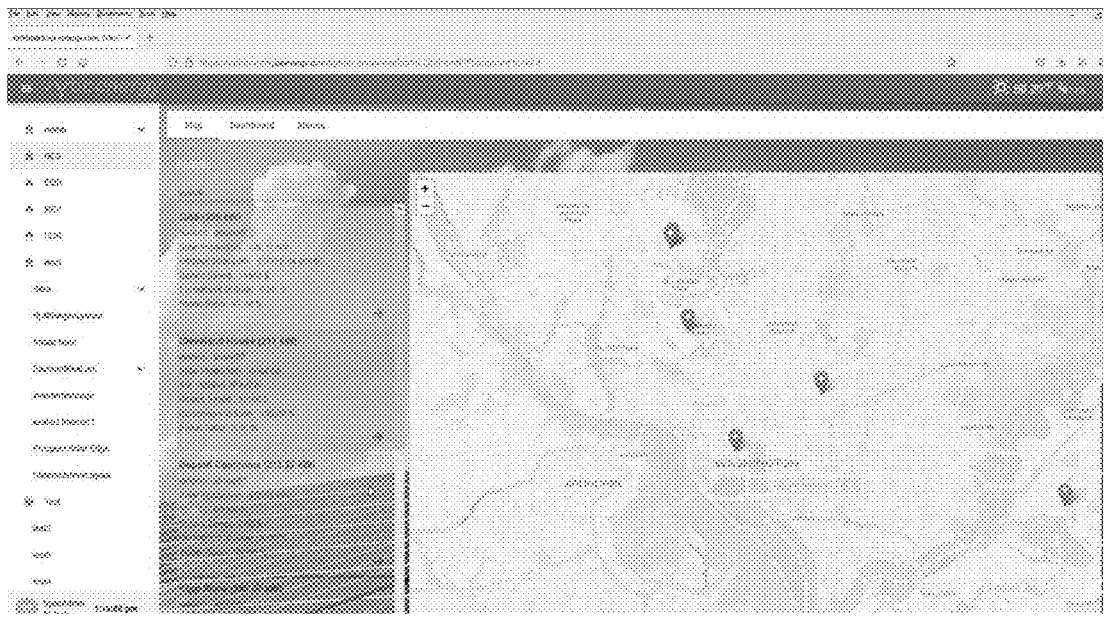
Figure 34:
Figure 35:
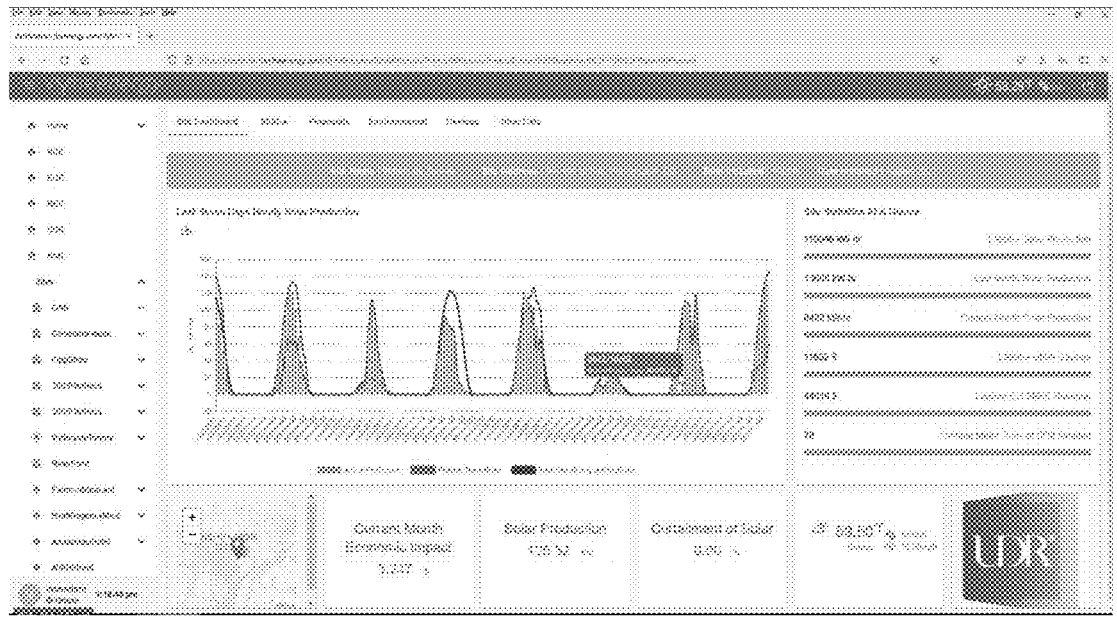
Figure 36:
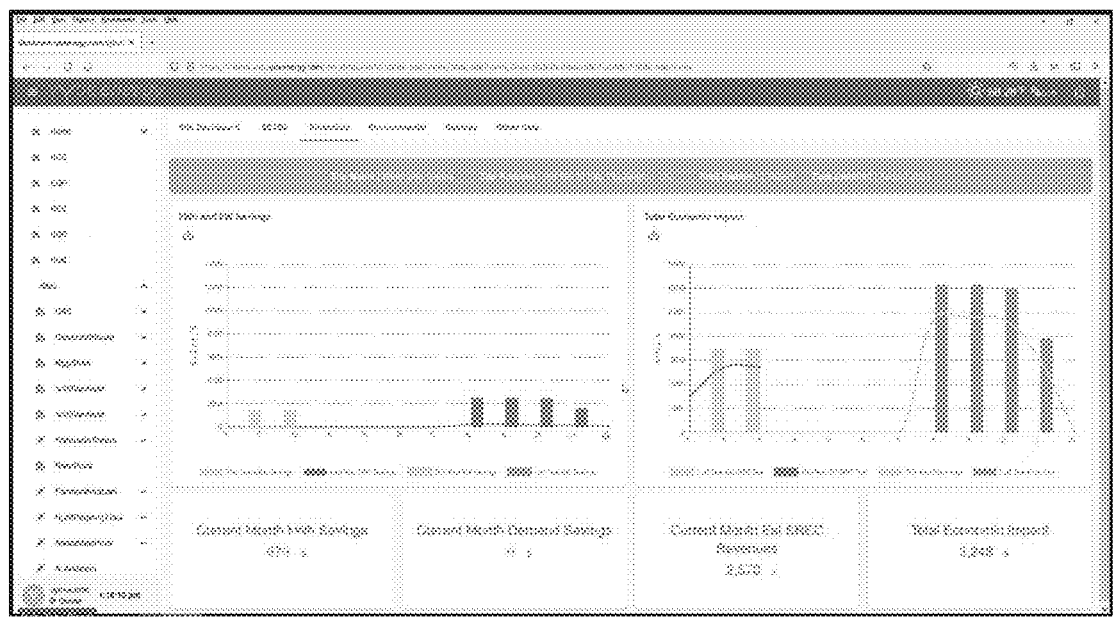
Figure 37:
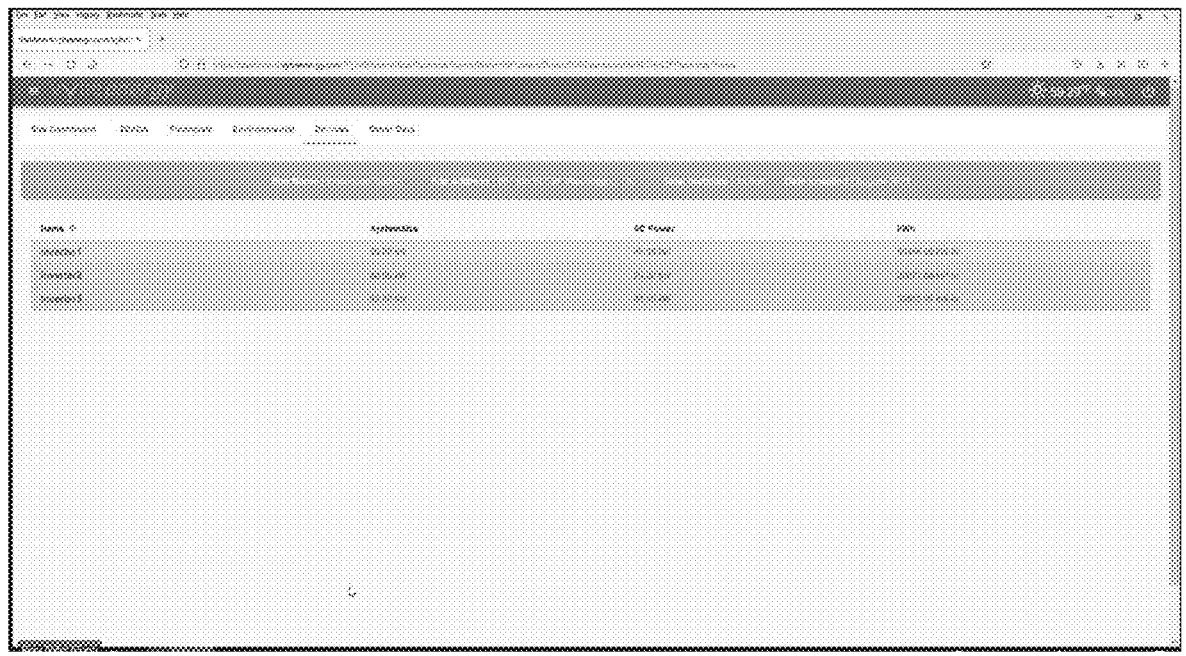
Figure 38:
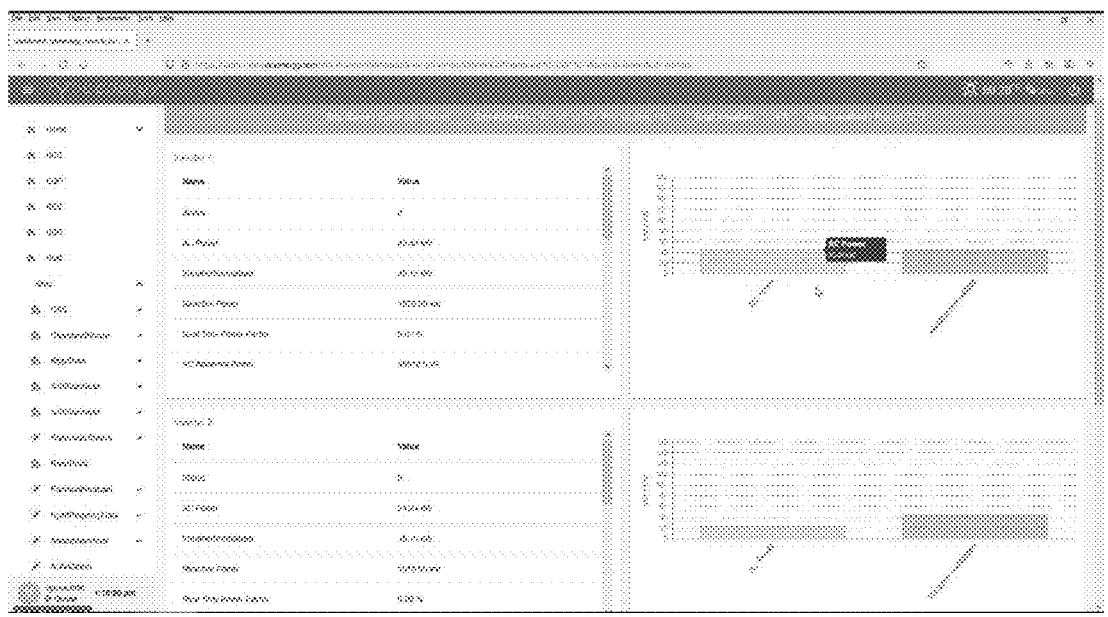
Figure 39:
Figure 40:
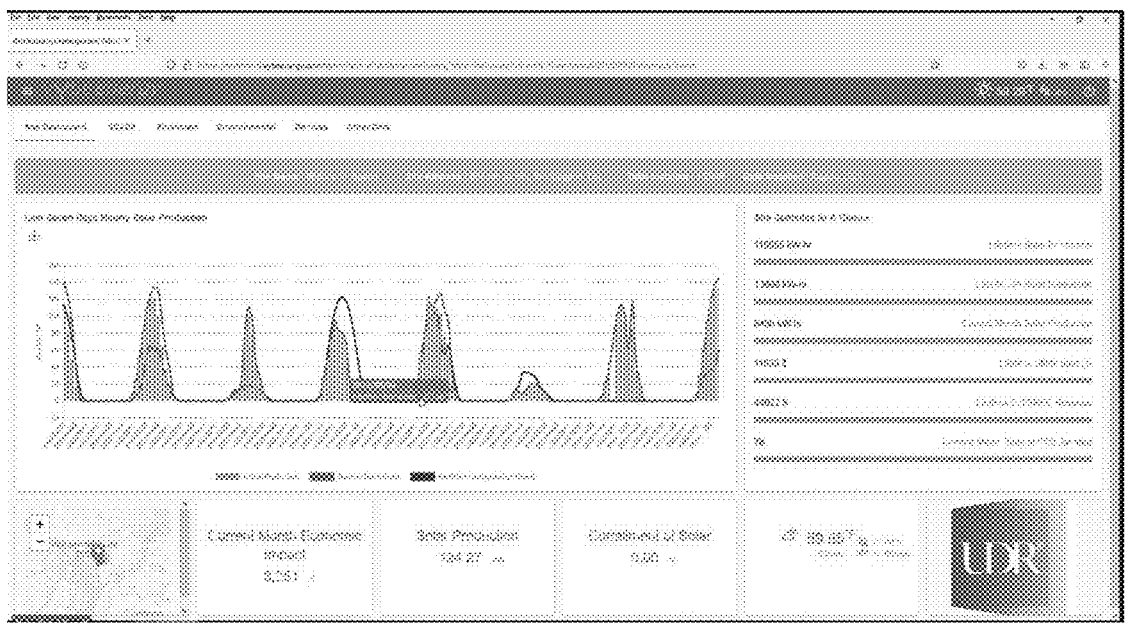
Figure 41:
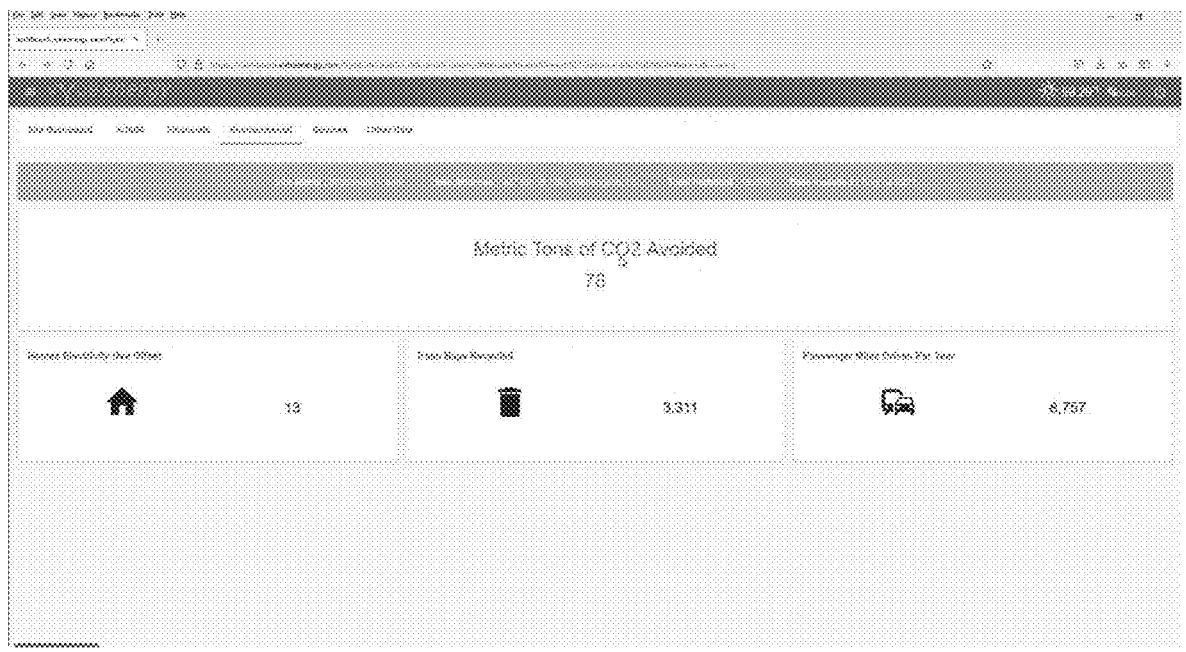
Figure 42:
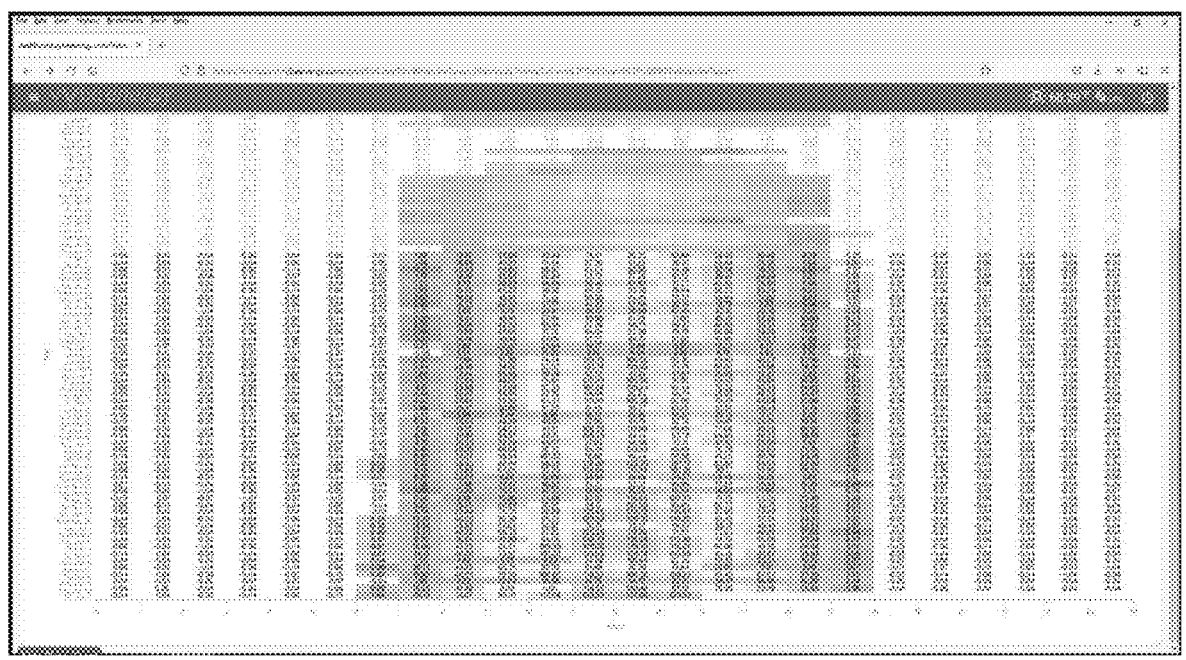
Figure 43:
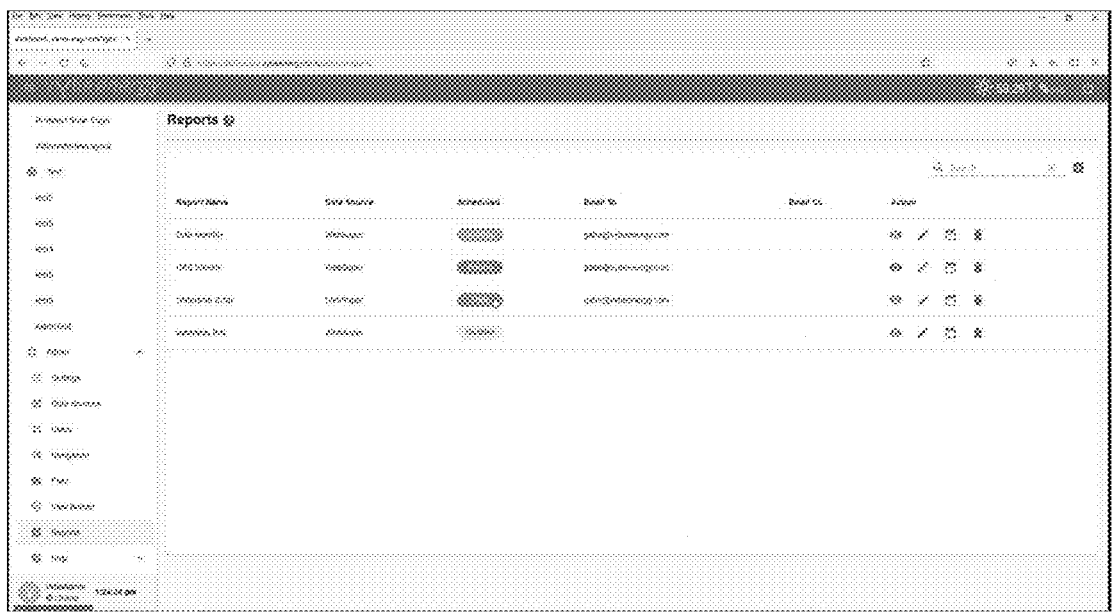
Figure 44:
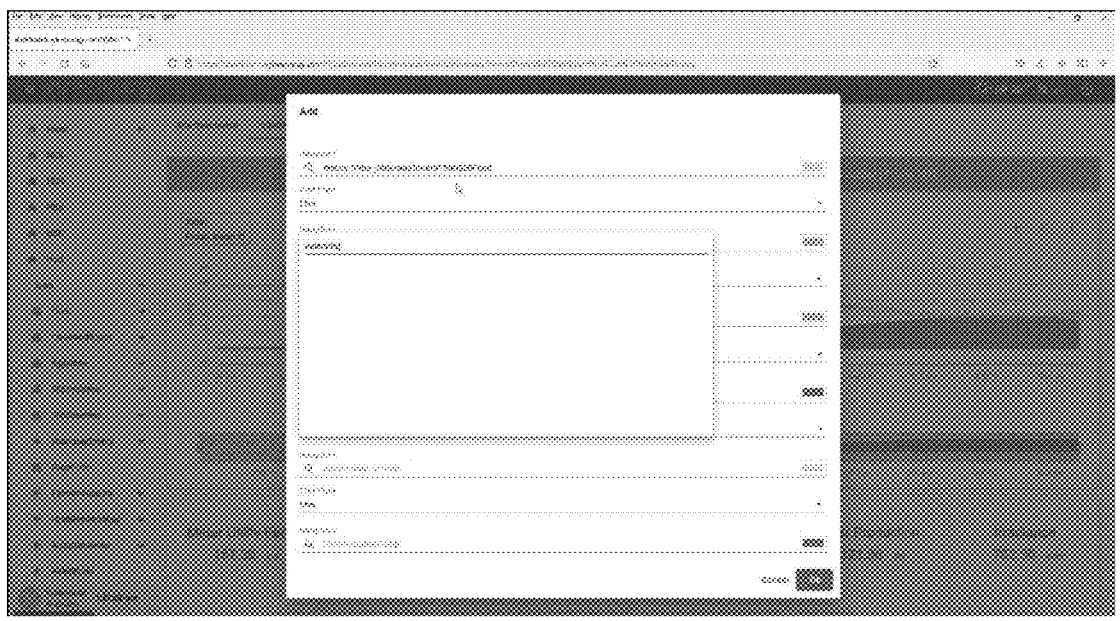
Figure 45:
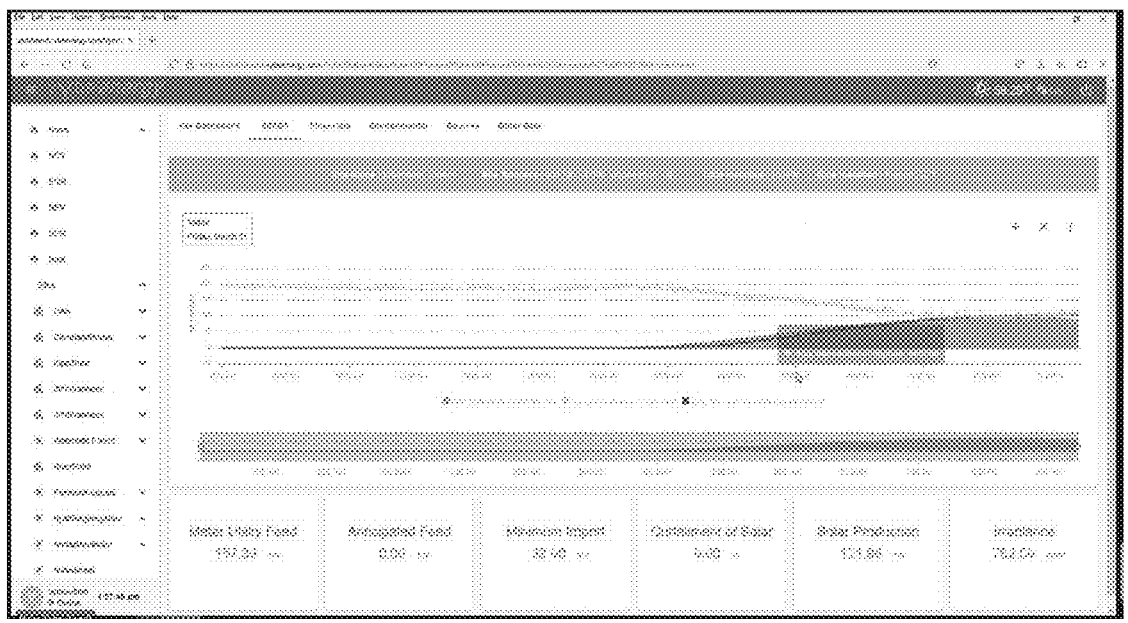
Figure 46:
Figure 47:

FIG. 31 depicts an illustration of an example screenshot of a graphical user interface (GUI) interface of an example reports, which can be requested, and/or customized and/or provided, set up to automatically send data on a period or on-demand basis, according to one example embodiment;

FIG. 32 depicts an illustration of an example screenshot of a graphical user interface (GUI) interface of an example color coding of mapped pins, and site location legend information and pins, with color indicating status of actual performance vs. expected—example dashboard screens, according to one example embodiment;

FIG. 33 depicts an illustration of an example screenshot of a graphical user interface (GUI) interface of an example color coding of zoomed out mapped pins, and site location legend information and pins, with color indicating status of actual performance vs. expected—example dashboard screens, according to one example embodiment;

FIG. 34 depicts an illustration of an example screenshot of a graphical user interface (GUI) interface of an example single site view, color coding regarding status indicator of performance ratio rating/grade, according to one example embodiment;

FIG. 35 depicts an illustration of an example screenshot of a graphical user interface (GUI) interface of an example Week view, according to one example embodiment;

FIG. 36 depicts an illustration of an example screenshot of a graphical user interface (GUI) interface of an example Financial page, according to one example embodiment;

FIG. 37 depicts an illustration of an example screenshot of a graphical user interface (GUI) interface of an example devices at a given site, sub-performance of exemplary components (e.g., inverter(s), panels, etc.), according to one example embodiment;

FIG. 38 may depict an illustration of an example screenshot of a graphical user interface (GUI) interface of an example may review, displayed, and check performance measures and actual vs. expected performance, according to embodiments;

FIG. 39 depicts an illustration of an example screenshot of a graphical user interface (GUI) interface of an example view multiple detailed component status comparisons page, according to one example embodiment;

FIG. 40 depicts an illustration of an example screenshot of a graphical user interface (GUI) interface of an example weekly dashboard for a given site, indicating, e.g., but not limited to, daily performance measures, production, monthly impact measures, curtailment of solar, weather indications, savings, breakdown of savings, geographic map of site location, etc., according to one example embodiment;

FIG. 41 depicts an illustration of an example screenshot of a graphical user interface (GUI) interface of an example environmental impact display, according to one example embodiment;

FIG. 42 depicts an illustration of an example screenshot of a graphical user interface (GUI) interface of an example heat map, according to one embodiment;

FIG. 43 depicts an illustration of an example screenshot of a graphical user interface (GUI) interface of an example reports generation page may be provided, where users may request a report, such reports, according to example embodiments may be fully customizable, whether by, e.g., but not limited to, a timeframe, etc., according to one example embodiment;

FIG. 44 depicts an illustration of an example screenshot of a graphical user interface (GUI) interface of an example of how a user can add additional data points/lines over time, based on other exemplary building automation system (BAS) inputs, such as, e.g., but not limited to, solar, battery, ev charging, meters, hvac controls, lighting, inverters, sensors, other building generation, other building loads/usage/sensor measurement, etc., according to an example embodiment;

FIG. 45 depicts an illustration of an example screenshot 4500 of a graphical user interface (GUI) interface of an example supervisory control and data acquisition (SCADA) illustrating curtailment of energy usage and savings, according to one example embodiment;

FIG. 46 depicts an illustration of an example screenshot 4600 of a graphical user interface (GUI) interface of an example site based financial analysis summary, according to one example embodiment; and FIG. 47 depicts an illustration of an example screenshot 4700 of a graphical user interface (GUI) interface of an example Financial Savings dashboard, showing types of savings, breakdown (money saved, kwh, renewable energy credits, etc.), according to one example embodiment.

DETAILED DESCRIPTION OF VARIOUS EXEMPLARY EMBODIMENTS OF THE PRESENT INVENTION

A preferred exemplary embodiment of the disclosure is discussed in detail below. While specific exemplary embodiments are discussed, it should be understood that this is done for illustration purposes only. A person skilled in the relevant art will recognize that other components and configurations may be used without parting from the spirit and scope of the disclosure.

Figure 1:
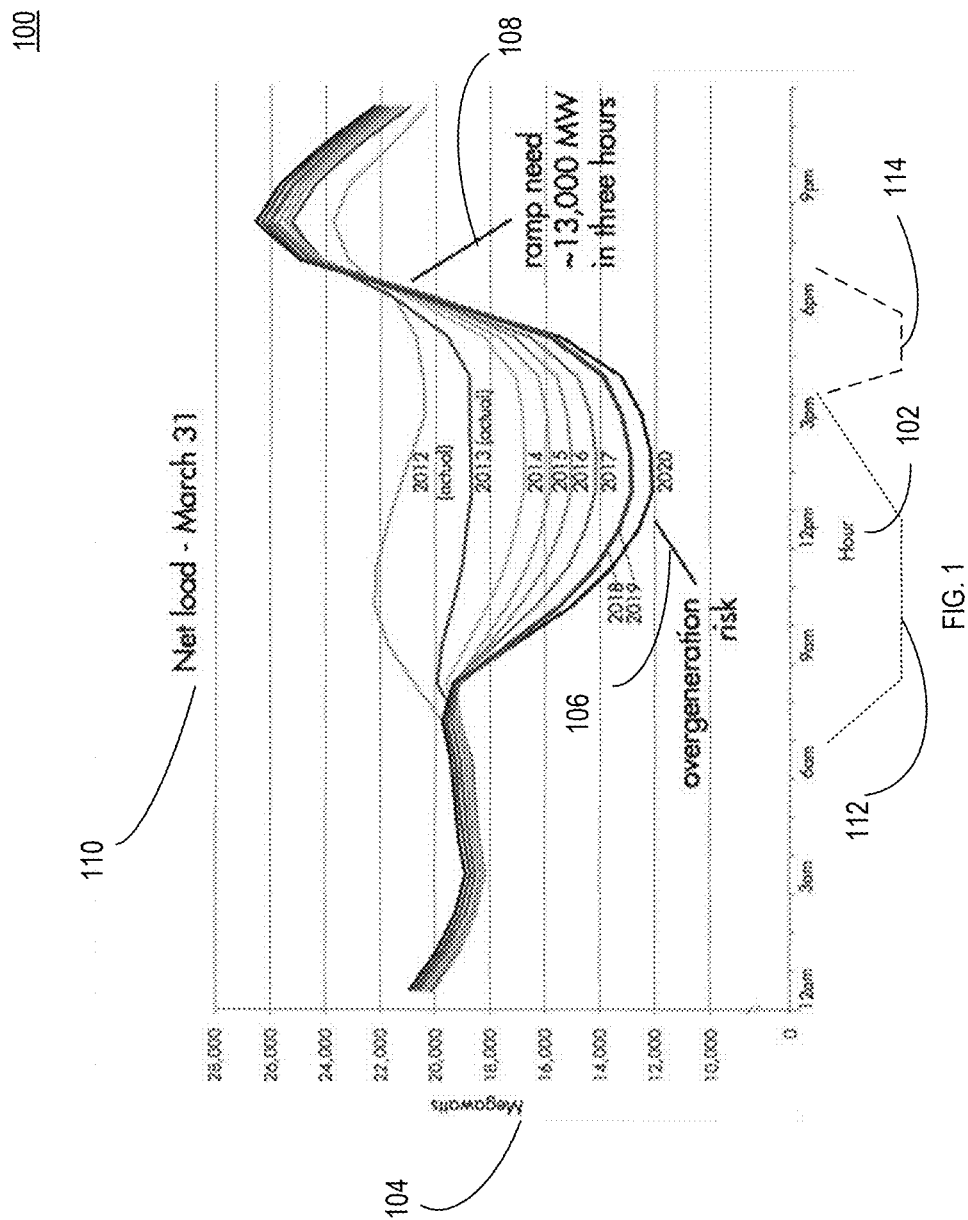

FIG. 1 depicts an exemplary diagram of an exemplary duck-shaped energy demand load curve for an exemplary day March 31, as well as illustrating a range of historical, actual and predicted demand curves, illustrating exemplary overgeneration risk and ramp demand, according to an exemplary embodiment.

In this regard, areas for improving known and existing systems have been identified. Through applied effort, ingenuity, and innovation, solutions to improve such systems, methods and computer program products, have been realized and are described in connection with embodiments of the present invention set forth in the numbered claims below.

While there are several organizations currently developing controllers to manage customer utility charges through the implementation of energy storage, being able to actually deliver demonstrable customer cost savings can be complicated. Conventional systems fail to actually produce cost savings, because of such things as, e.g., but not limited to, building load cannot be accurately predicted, etc. Even with the best prediction algorithms building load can become volatile especially with proliferation of electric vehicles (EVs) and EV charging infrastructure, which can significantly increase building demand. To overcome these shortcomings of conventional systems, exemplary embodiments of the invention can allow for, e.g., but not limited to, real-time load shedding or temporarily turning off EV charging to control a building's load. Various exemplary embodiments of the present invention provide improved methods of both achieving load shedding and temporarily turning off charging.

Various exemplary embodiments can relate to systems, methods and/or computer program products including instructions which when executed on a processor, can provide improved exemplary novel versions of: (1) exemplary energy management and/or optimization methods, which may include, e.g., but not limited to, both exemplary energy storage and/or exemplary renewable energy sources; (2) exemplary network models for exemplary storage, exemplary arbitrage and/or exemplary distribution of exemplary electricity, including, e.g., but not limited to, exemplary electricity that is used for ancillary services; (3) exemplary methods for exemplary demand side management and/or exemplary load shifting; and/or (4) exemplary incorporation of exemplary predictive algorithms into (1), (2) and (3).

Various conventional systems, which can be used in combination with the exemplary embodiments can include, e.g., but not limited to, U.S. Pat. No. 9,645,596 in the area of energy portfolio level optimization, U.S. Pat. No. 9,300,141 in the area of virtual power plant system and method incorporating renewal energy, storage and scalable value-based optimization, U.S. Pat. No. 7,957,846 relating to energy arbitrage by load shifting, and U.S. Pat. No. 9,489,701 relating to an adaptive energy management system, the contents of all of which are incorporated herein by reference in their entireties.

With the proliferation of EVs by increasing number, the impact of such EV charging demand threatens to disrupt building load estimated demand, and causing substantial challenges to building managers seeking to manage power demand, and/or battery storage usage.

The present invention synthesizes elements from various conventional systems, including exemplary energy management and/or optimization methods, which may include exemplary energy storage and/or renewable energy sources, exemplary network models for exemplary storage, arbitrage and/or distribution of electricity, including exemplary electricity used for exemplary ancillary services, exemplary methods for demand side management and/or load shifting; and exemplary incorporation of predictive algorithms to the foregoing, and adds in exemplary embodiments, various additional new elements to create an exemplary novel system and method that can improve on exemplary conventional solutions, significantly and substantially. Exemplary improvements of various example embodiments can include, e.g., but are not limited to, the following:

An exemplary multi-stage system and/or method and/or computer program product to be executed on at least one exemplary computer processor, based on an exemplary value hierarchy for optimizing for example, but not limited to, charging, and/or discharging an exemplary battery and/or exemplary other energy storage device(s), taking into account, e.g., but not limited to, exemplary intraday optimization opportunities, exemplary balancing cost savings objectives with maximizing useful life of the exemplary battery and/or other exemplary energy storage device, exemplary aggregation possibilities, exemplary unique single-variable and/or aggregate constraints of exemplary multiple optimization stages, etc., according to an exemplary embodiment.

Exemplary scalability of the exemplary system and/or method, and/or computer program product, and/or for an exemplary network application, in which, e.g., but not limited to, both exemplary common and/or exemplary individual building asset(s) are incorporated and allocation of benefits can occur based on various exemplary different criteria, etc., according to an exemplary embodiment.

Exemplary static and/or exemplary dynamic allocation of exemplary energy storage based on exemplary different values for exemplary different applications, such as, including, e.g., but not limited to, exemplary frequency regulation vs. arbitrage, etc., according to an exemplary embodiment.

Exemplary incorporation of exemplary static loads including, e.g., but not limited to, plug-in hybrid electric vehicle (PHEV) "refueling" with exemplary dynamic load(s) (the building's consumption) into the exemplary optimization calculus, etc., according to an exemplary embodiment.

Exemplary determining and/or exemplary calculating of an exemplary optimal amount of battery and/or solar photovoltaic (PV) capacity to install for an exemplary building and/or other exemplary energy demanding entity, given an exemplary rate structure (e.g., exemplary tariffs and/or exemplary utility pricing), exemplary model availability of photovoltaics (PV) and/or exemplary load profile of the exemplary building and/or energy demanding entity, etc., according to an exemplary embodiment.

EXEMPLARY EMBODIMENT OF THE PRESENT INVENTION

An exemplary embodiment of the present invention can include, e.g., but not limited to:

Exemplary synthesized elements of exemplary energy management and/or optimization methods, which may include, e.g., but not limited to, exemplary energy storage and/or renewable energy sources, exemplary network models for exemplary storage, arbitrage and/or distribution of electricity, including exemplary electricity used for exemplary ancillary services, exemplary methods for demand side management and/or load shifting; and exemplary incorporation of predictive algorithms to the foregoing and can add additional new combinations of exemplary elements to create any of various exemplary novel system, method, and/or computer program product embodiments that can provide substantial, significant, exemplary improvements over conventional systems. These exemplary improvements can include, e.g., but are not limited to:

Exemplary determining an exemplary optimal amount of battery, solar photovoltaic (PV), wind, turbine, fuel cell, biomass, waste-to-energy and/or thermal capacity and/or other exemplary energy source, etc., to install for an exemplary building, given the exemplary applicable rate structure, exemplary real-time weather-predicted renewable energy production, and/or exemplary artificial intelligence (AI) predicted load profile of the exemplary building or exemplary entity, and/or also can further include, e.g., but not limited to, improvements by taking into consideration exemplary future energy efficiency improvements, exemplary user inputs on exemplary daily occupancy, exemplary event schedules for each exemplary day or other time period, and exemplary building and/or or other entity participation in exemplary utility services such as, e.g., but not limited to, demand response and/or frequency management, etc. Additionally, exemplary building load impact can also be simulated for exemplary dynamic EV loads based on the exemplary types of vehicles and/or exemplary frequency of charging at specific locations, etc., according to an exemplary embodiment.

Exemplary using an exemplary pre-determined daily schedule of exemplary battery charge/discharge and/or exemplary monitoring charge/discharge on an exemplary real-time basis and/or reducing exemplary building load as needed through exemplary real-time load-shedding, and/or the like. Or in the event the exemplary building load is lower than an exemplary expected demand load, further processing can be undertaken including, e.g., but not limited to, exemplary redistributing excess exemplary battery capacity based on an exemplary formula, according to an exemplary embodiment.

Exemplary turning off of an exemplary electric charging station when the grid load is high and the system determines that the battery charge demand goes beyond a predetermined exemplary established threshold for a given period of time, for example. Through exemplary predictive modeling of the exemplary building and/or entity load, the exemplary system can, e.g., but not limited to, preset an exemplary total amount that the exemplary battery and/or exemplary energy storage device can be discharged during each exemplary 15-minute interval and/or if that exemplary discharge is higher, the exemplary system can perform additional processing including e.g., but not limited to, load shedding—of e.g., but not limited to, EV charging and/or other load centers, etc., according to an exemplary embodiment. An exemplary controller can, e.g., but not limited to, monitor multiple areas of the building and/or load shed, as needed, according to an exemplary embodiment.

Figure 6:
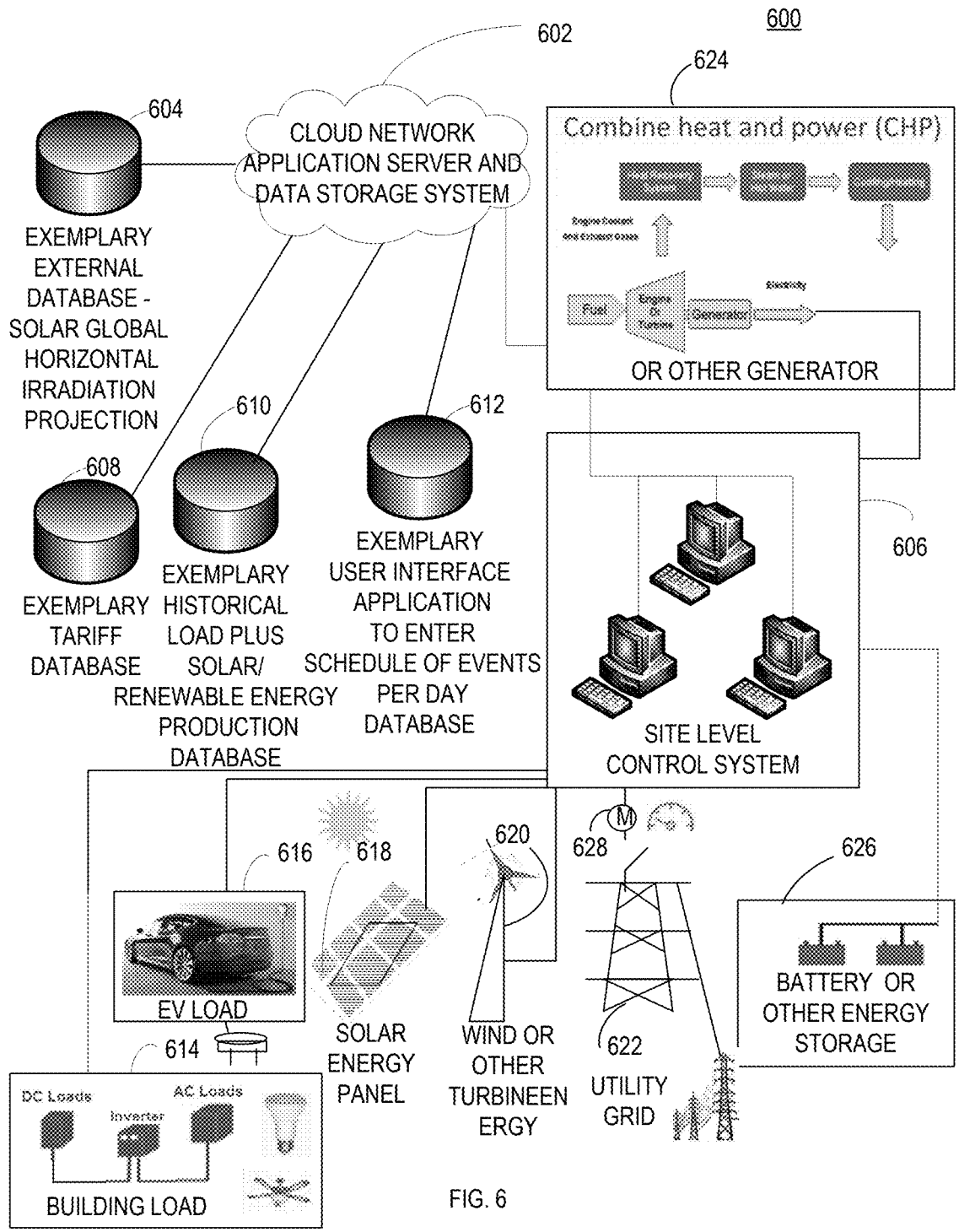

FIG. 6 illustrates an exemplary embodiment of an exemplary block diagram 600 illustrating an exemplary controller 602, 606, which can include, e.g., but not limited to, a cloud-based application server service provider 602, and/or a client controller 606, which can be onsite, in one embodiment, at an exemplary entity such as a home, a school, a university, a hotel, a hospital, an office, or other commercial and/or public and/or private business, according to an exemplary embodiment. The diagram 600 illustrates the controller 602 coupled to an exemplary database 604, which can include exemplary external database content such as, e.g., but not limited to, an exemplary solar global horizontal irradiation projection data, an exemplary tariff database 608, exemplary historical load plus solar production/demand reduction/load shedding preferences database 610, exemplary user interface application to enter a schedule of events for a given time period and the like database 612 including data such as, e.g., but not limited to, an exemplary daily schedule, exemplary utility grid 622 power supply via a meter 628, which can include an intelligent meter, according to an exemplary embodiment to reach energy generation from utility 622 over exemplary conventional powerlines, according to an exemplary embodiment. Controller 602, 606 can be configured to include access to control and/or provide energy to exemplary load devices 616 (exemplary electronic vehicle (EV) load), building entity load 614, exemplary solar panel generation 618, which can include DC based loads and/or AC based loads depending on controller features, according to an exemplary embodiment. Controller 602, 606 can be coupled to exemplary energy storage device 626, in an exemplary embodiment, the energy storage device 626 can be a battery, according to an exemplary embodiment, which can be used to shift energy demand to offpeak, by discharging the battery at peak tariff time periods, and recharging the battery offpeak or using alternative energy generation such as, e.g., but not limited to, solar energy 618 or wind turbine 620, generator 624, or other generator, or other alternative and/or renewable energy. Controller 702 can be further coupled to exemplary energy generation or production devices 714, 720, 724, in exemplary embodiments, the energy generation devices 714, 720, 724 can include, but are not limited to, an exemplary solar panel 618, a solar panel array 618, a turbine generator 620, a combine heat and power (CHP) generator 624 (which can include an exemplary fuel based engine to turn a turbine, which can in turn turn a generator to produce electricity, and its heat can be recovered and can be converted into steam, or hot water, or a turbo charger or supercharger can be provided), or another generator, or other energy generation device such as, e.g., a diesel generator, wind turbine 620, hydroelectric turbine, geothermal energy generator, hydrogen fuel cell, etc., according to an exemplary embodiment.

Using exemplary tariff database 608, the exemplary site controller 606 can receive demand reduction set points, e.g., but not limited to, at beginning of each day/billing period, and an exemplary schedule can be provided, e.g., upfront, an exemplary 1-3 days ahead, according to an exemplary embodiment.

Using exemplary historical load database 610, the exemplary, according to an exemplary embodiment.

Using exemplary historical load plus solar production/demand reduction database 612, the exemplary controller 602, 606 can check the exemplary building entity load and actual solar production of solar panel 618 and can discharge the exemplary battery energy storage device 626 to meet an exemplary demand reduction set point, according to an exemplary embodiment.

Using exemplary user interface application to enter schedule of exemplary events per exemplary day time period database 614, the exemplary controller 606 can continue to monitor battery 626, according to an exemplary embodiment.

Exemplary communication between exemplary site level control system 606 and cloud network and application server and data storage system 602 can be updated from time-to-time, such as, e.g., but not limited to, periodically such as, e.g., every 15 minutes, more frequently, or less frequently, and can send and receive exemplary actual performance data and can be stored in exemplary historical load plus solar/RE production database (DB) 612, according to an exemplary embodiment.

The exemplary cloud network and application server and data storage system 602 can perform various exemplary processing tasks including, e.g., but not limited to, in an exemplary high-level description of exemplary optimization program can include, exemplary program instructions, which can read exemplary historical site level data from database 610 (and/or data that can be simulated according to exemplary embodiments) and can in one exemplary embodiment, use an exemplary predictive analytics, and/or artificial intelligence, and/or machine learning (ML) algorithm and can use data from database 612, which can include exemplary user entered or received exemplary schedule of events data to, e.g., but not limited to, determine an exemplary projected load curve for the exemplary entity (e.g., building) for a given timer period (e.g., the day), according to an exemplary embodiment.

The exemplary high-level description of the exemplary optimization program can further include, exemplary program instructions, which can calculate exemplary projected solar production for the exemplary day time period using exemplary projected global horizontal irradiance (GHI), e.g., from database 604 projection, and/or other renewable energy (RE) generation for the day, according to an exemplary embodiment.

The exemplary high-level description of the exemplary optimization program can further include, exemplary program instructions, which can include using the above information from the prior instructions to, e.g., but not limited to, include, exemplary program instructions, which can calculate exemplary demand reduction (DR) target for the exemplary day time period using exemplary battery energy storage device 626, according to an exemplary embodiment.

The exemplary high-level description of the exemplary optimization program can further include, exemplary program instructions, which can adjust the exemplary demand reduction target on an exemplary time period or after a time duration of, e.g., but not limited to, every 15 minutes, or more, or less often, to, e.g., but not limited to, maximize exemplary demand savings, according to an exemplary embodiment.

According to an exemplary embodiment, the exemplary system 600 can be used to perform individual site level energy analysis for exemplary entities, such as, e.g., but not limited to, small commercial, hotel, and apartment REITs, according to an exemplary embodiment.

According to an exemplary embodiment, the exemplary system 600 can be used to properly size a combination of systems, including, e.g., but not limited to, solar (and/or any number of other energy generation technologies) and energy storage systems such as, e.g., but not limited to, battery systems, which can operate in an exemplary grid-connected or microgrid setting, to produce cost savings and to provide a maximized return on investment in energy system sizing and management to provide an optimal cost saving, energy system for exemplary customers.

According to an exemplary embodiment, the exemplary system 600 can be used to look at historical load and tariff/rate information and can right-size alternative energy generation technologies that can operate behind-the-meter (BTM) to reduce utility bills for customers.

According to an exemplary embodiment, the exemplary system 600 and methods according to the disclosure and claimed inventions can be used size and manage an optimal system, based on the tariff structure provided by the relevant utility, and energy technologies being used, and can also optimize to determine the right demand setpoints for each exemplary time-of-use period that would provide the highest reduction in demand charges over the course of a given period such as, e.g., but not limited to, a year period.

According to an exemplary embodiment, the exemplary system 600 can be used to provide optimal sizing of renewable energy (RE) assets and energy storage devices (i.e., e.g., but not limited to, battery(ies)) in an exemplary grid-connected and/or microgrid that can provide the greatest energy savings and/or lowest levelized cost of electricity (LCOE). According to an exemplary embodiment, the system and method can be arrived at by providing, e.g., but not limited to, exemplary generating of a load curve for each site by looking at exemplary data including, e.g., but not limited to, a historical load curve, any adjustments simulated for future energy efficiency improvements, exemplary electric vehicle (EV) charging profiles, taking into account any exemplary existing on-site energy generation technologies, and/or exemplary weighing impact of participation in any exemplary utility ancillary services programs such as, e.g., but not limited to, demand response (DR) program(s) and/or frequency regulation.

Advantageously, according to an exemplary embodiment, energy analysis is performed at a site level, not at a portfolio level, and is focused on a utility customer, and is optimized for saving utility customers as much cost as possible, and seeks to allow an entity to be able to take advantage of exemplary utility demand response programs, by which a utility will compensate a customer for reducing demand usage of energy services. According to exemplary embodiments, the systems and methods can allow a customer to maximize return on investment in renewable energy or alternative energy system and energy storage device investments, while decreasing peak demand resulting in savings on the customer's utility bills, according to an exemplary embodiment.

Figure 7:
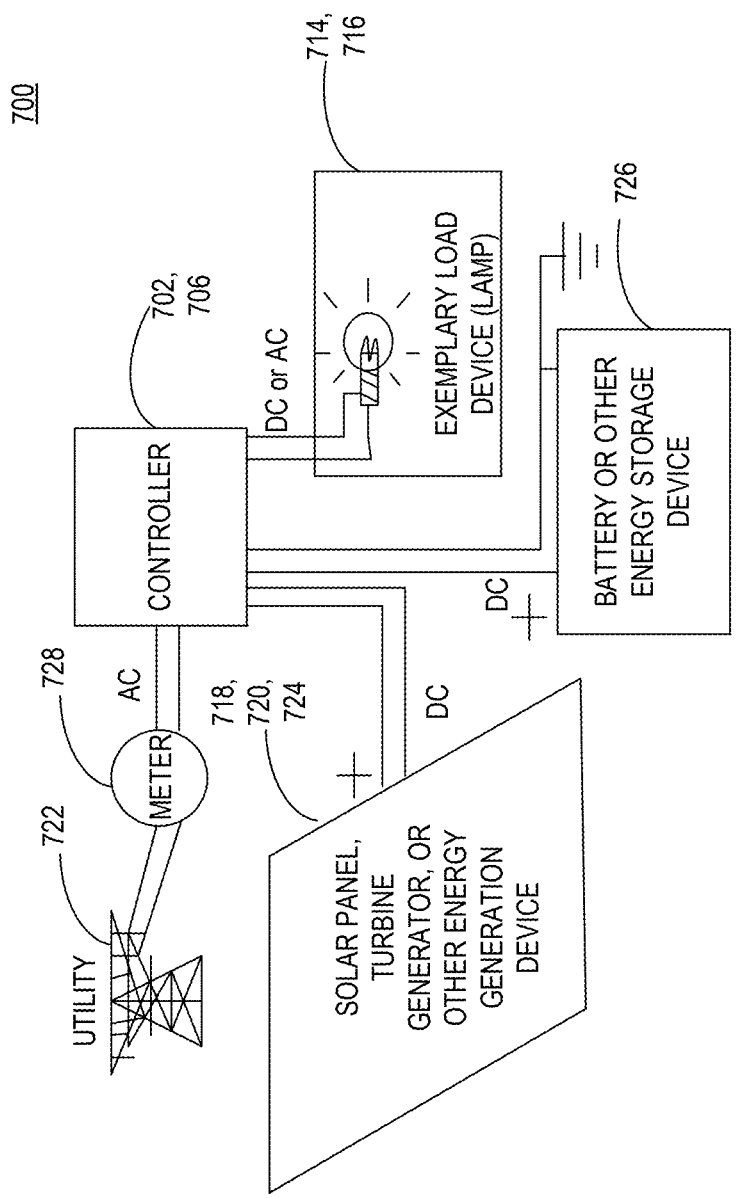

FIG. 7 illustrates a simplified embodiment of an exemplary block diagram 700 illustrating an exemplary controller 702, 706 which can include, e.g., but not limited to, a cloud-based controller 702, and/or an onsite controller 706, at an entity such as a home, an office, or other commercial business, according to an exemplary embodiment. The diagram 700 illustrates the controller 702 coupled to a utility power supply via a meter 728, which can include an intelligent meter, according to an exemplary embodiment to reach energy generation from utility 722 over conventional powerlines, according to an exemplary embodiment. Controller 702 can be configured to include access to control and/or provide energy to exemplary load devices 714, 716, which can include DC based loads and/or AC based loads depending on controller features, according to an exemplary embodiment. Controller 702 can be coupled to exemplary energy storage device 726, in an exemplary embodiment, the energy storage device 726 can be a battery, according to an exemplary embodiment. Controller 702 can be further coupled to exemplary energy generation or production devices 718, 720, 724, in exemplary embodiments, the energy generation devices 714, 720, 724 can include, but are not limited to, an exemplary solar panel, a solar panel array, a turbine generator, a generator, or other energy generation device such as, e.g., a diesel generator, wind turbine, hydroelectric turbine, geothermal energy generator, hydrogen fuel cell, etc., according to an exemplary embodiment.

Figure 2:
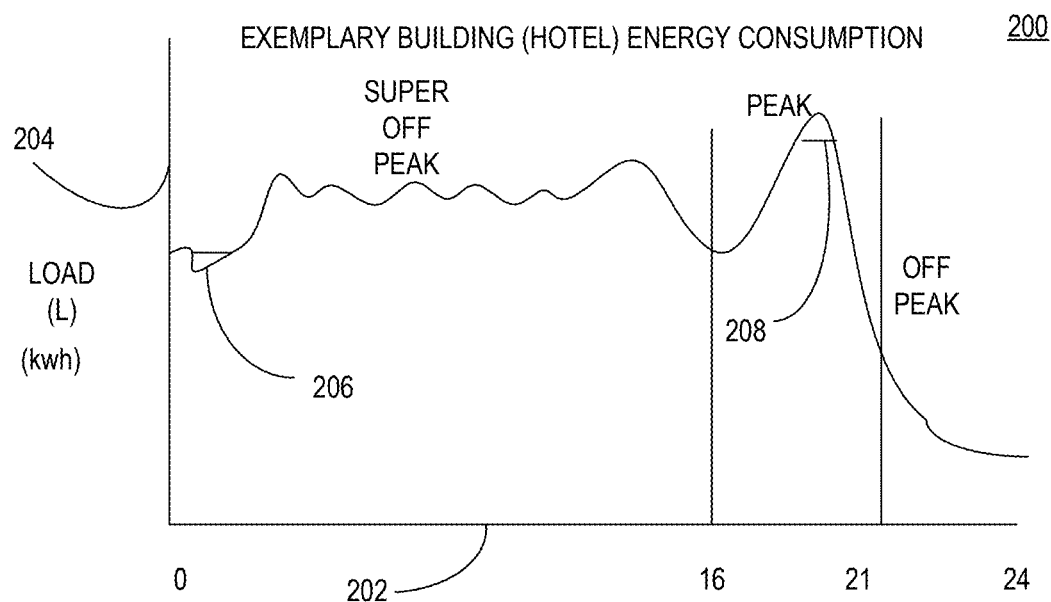
Figure 3:
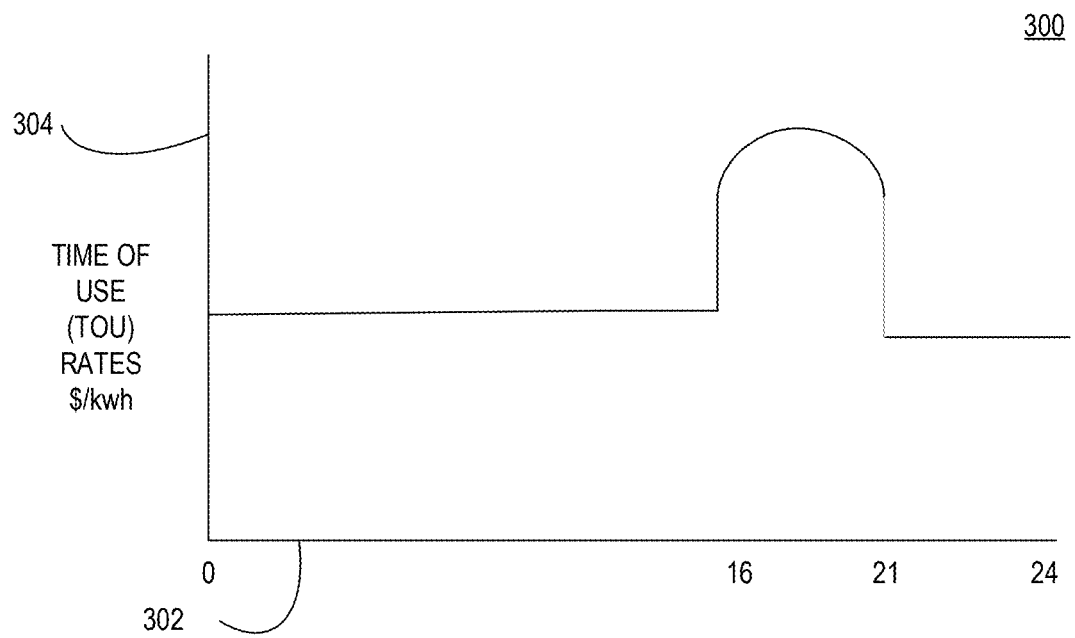

According to an exemplary embodiment, demand reduction target data can be captured and can be used in determining optimal battery sizing, according to an exemplary embodiment. Exemplary optimal energy storage device scaling, and charging and discharging scheduling can be determined, according to an exemplary embodiment. According to an exemplary embodiment, use of optimally sized energy storage devices can be used to avoid paying peak tariffs due to demand spikes, and can allow shifting of energy by discharging energy storage devices such as, e.g., but not limited to, batteries, as illustrated in FIG. 2, to avoid paying peak tariffs, and batteries can be charged offpeak via grid utility offpeak tariffed energy, or via exemplary solar energy during energy generation or production, according to an exemplary embodiment. Exemplary energy generation demand shifting via energy storage devices can be refined via realtime updated scheduling, such as, e.g., but not limited to, using predictive analytic techniques, artificial intelligence (AI) techniques, heuristics, machine learning (ML), neural networks and rules based expert systems, and the like, according to exemplary embodiments. Exemplary energy storage device (e.g., battery) charge/discharge scheduling, can be advantageously at a site-level, and can include continually updated, distributed schedules, distributed from the cloud to distributed site level controller(s), and can provide feedback back to the cloud, and can use an exemplary schedule with an exemplary time period, such as, e.g., but not limited to, an exemplary realtime tracking of battery usage and updating schedule in exemplary, but non-limiting, 15 minute increments, establishing an exemplary 1, 2, 3, 4, or more day, or exemplary preferable about 3-4 day schedule, which can include actual updates based on actual determined load vs. expected schedule, and can in one exemplary embodiment provide an exemplary update every exemplary 15 minute increment, according to one exemplary embodiment.

Figure 8:
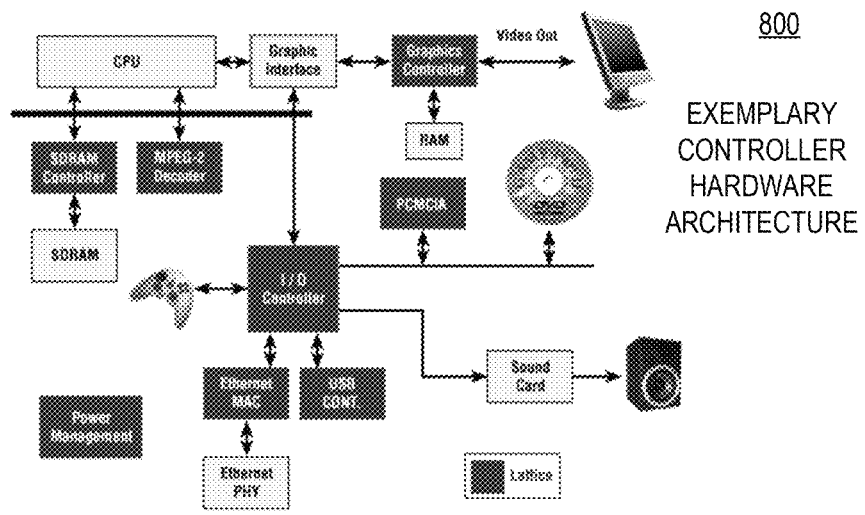
FIG. 8 depicts an exemplary block diagram of an exemplary controller hardware architecture, where the controller can be onsite at a building, according to one exemplary embodiment.

FIG. 8 depicts an exemplary block diagram 800 of an exemplary controller hardware architecture, where the controller can be onsite at a building, according an exemplary embodiment, and can be coupled by a communications facility and/or a network as illustrated and discussed further below with reference to FIG. 9, the exemplary block diagram 800 of an exemplary computer-implemented energy optimization energy storage device sizing and management hardware architecture can include various features, including, but not limited to those depicted according to one exemplary embodiment. FIG. 8, according to an exemplary embodiment can include, e.g., but not limited to, an exemplary CPU(s), coupled to an exemplary output devices such as, e.g., but not limited to, graphic interface to graphics controller, graphics memory and/or graphics I/O, and/or video output, audio output, HDMI, max, mini, etc., display connector, VGA, XGA, SVGA, UHD, 4K, 8K, 16K, 32K, 64K, etc., and/or a storage interface, cable, wired, wireless, a bus, exemplary memory SDRAM and memory controller SDRAM controller, and exemplary MPEG decoder, according to an exemplary embodiment. According to an exemplary embodiment, the exemplary graphic interface can be coupled to one or more I/O controllers for coupling to exemplary interactive elements such as, e.g., but not limited to, a controller input interface such as, e.g., but not limited to, a mouse, keyboard, joystick, stylus, console controller, a Playstation, Xbox, Nintendo Wii, or Switch controllers, and the like, etc., external data and/or plugin capable interfaces such as, e.g., but not limited to, a PCMCIA I, II, III, IV, V, etc. interface, removable or accessible storage devices such as, e.g., but not limited to, a CD-ROM, DVD-ROM/RW, BLURAY, UHD BLURAY, electronic, magnetic, optical, magneto-optical, FLASH SDRAM, DRAM, USB devices, memory card, ETC., memory and/or other storage media, etc., output devices such as, e.g., but not limited to, printer(s), display, display subsystems, sound card interface and/or speakers, headphones, SONOS, wireless audio, BLUETOOTH, WIFI Audio, and/or audio output systems, optical audio, etc., network interface cards (NICs) such as, e.g., but not limited to, Ethernet MAC, Token Ring, Fibre channel, optical fibre network interface, 10/100/and/or 1000, network interfaces, etc., physical interfaces including twisted pair, shielded twisted pair, CableTV, CATV, optical fibre, enhanced shielded ethernet cabling, IBM cabling system, optical fibre multiplexing, routers and/or switches, firewalls, security equipment, cable modems, WIFI modems, WIMAX modems, etc., various ports, parallel, serial, fibre, serial bus, universal serial bus (USB), A, B, C, 1.0, 2.0, 3.0, etc., advanced power management, battery and/or AC power supply, and/or voltage regulation and external alternative power AC, DC, etc., and/or or networking infrastructure, etc.

Figure 9:
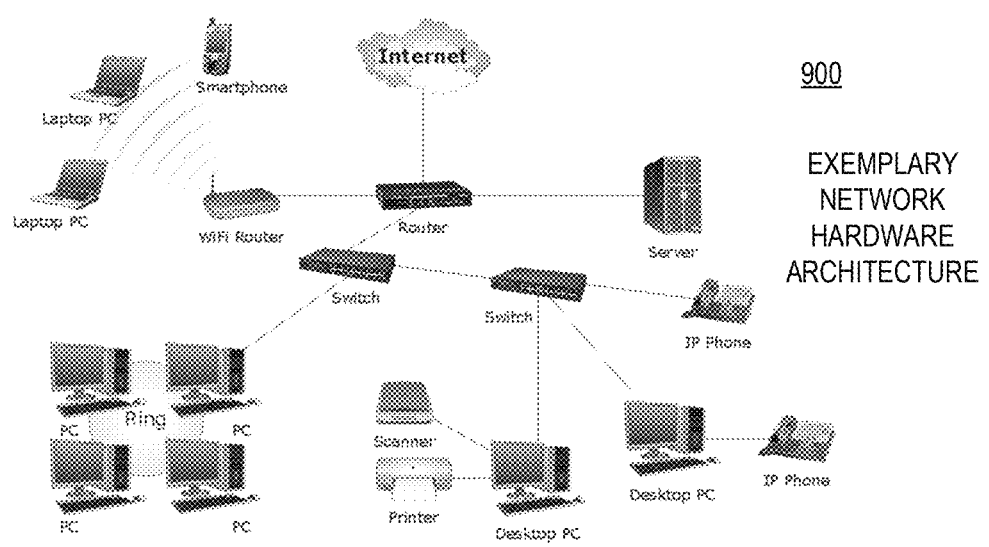
FIG. 9 depicts an exemplary block diagram of an exemplary system network hardware architecture, according to an exemplary embodiment.

FIG. 9 depicts an exemplary block diagram 800 of an exemplary system network hardware architecture, according to an exemplary embodiment. FIG. 9 depicts an exemplary embodiment of a block diagram 900 of an exemplary network hardware architecture, including various exemplary communications network technologies in an exemplary schematic block diagram illustrating exemplary controller systems as can be used in the onsite controller, and/or for coupling to exemplary cloud-based application server(s), and/or database(s), as can be executed on exemplary laptop and/or notebook, desktop, and/or server, computing devices and/or PC and/or mobile devices, wired, and/or wirelessly coupled to an exemplary but nonlimiting WIFI router or the like to an exemplary router for access to other router(s) and/or host(s) on the Internet, and/or servers, and/or clients, and/or peer based devices, and/or Internet of Things (IOT) based appliances, and the like, and/or network switch(es) and/or VoIP devices, and/or IP phones, and/or telephony devices, and/or desktop PCs, server PCs, handheld, laptop, notebook and/or mobile devices, and/or peripheral devices such as, e.g., but not limited to, scanner(s), camera(s), touchscreen(s), other sensors, input devices, mouse, stylus, keypad, keyboard, microphone, output devices, printers, televisions, smarty, monitors, flatscreen, touch-enabled, LCD, LED, OLED, UHD LED, QLED, etc., gateways, gateway switches between alternative network topologies, e.g., ring-based topologies, bus topology, CSMA/CD, packet based, token ring, fibre channel, Microwave, IR, RF, 3G, 4G, 5G, 6G, nG, etc., according to various exemplary embodiments.

Figure 11:
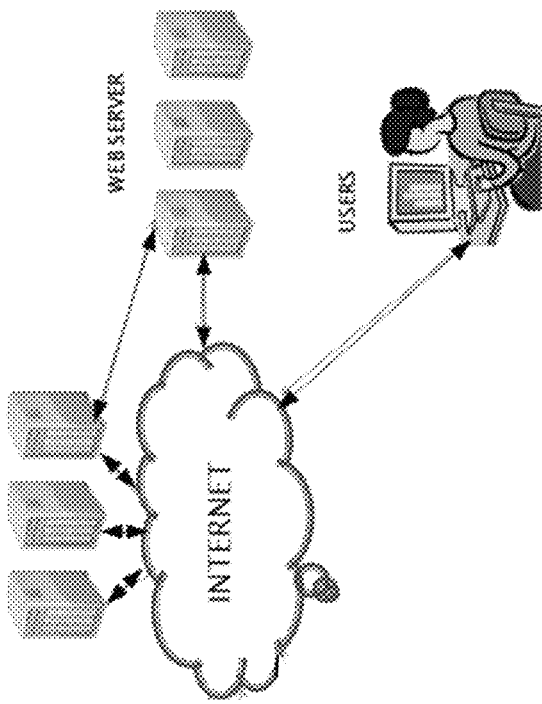
FIGS. 10 and 11 depict an exemplary embodiment of an exemplary cloud-hosted application server system, and an exemplary web browser-based application server exemplary system, respectively, with each providing embodiments of an exemplary computer-implemented energy optimization energy storage device sizing and management system, according to various exemplary embodiments.
Figure 10:
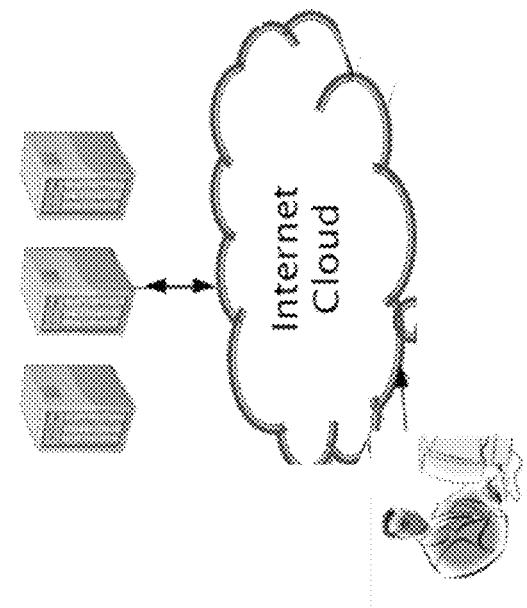

FIGS. 10 and 11 depict an exemplary embodiment of an exemplary cloud-hosted application server system 1000, and an exemplary web browser-based application server exemplary system 1100, respectively, with each providing embodiments of an exemplary computer-implemented energy optimization energy storage device sizing and management system, according to various exemplary embodiments.

Figure 12:
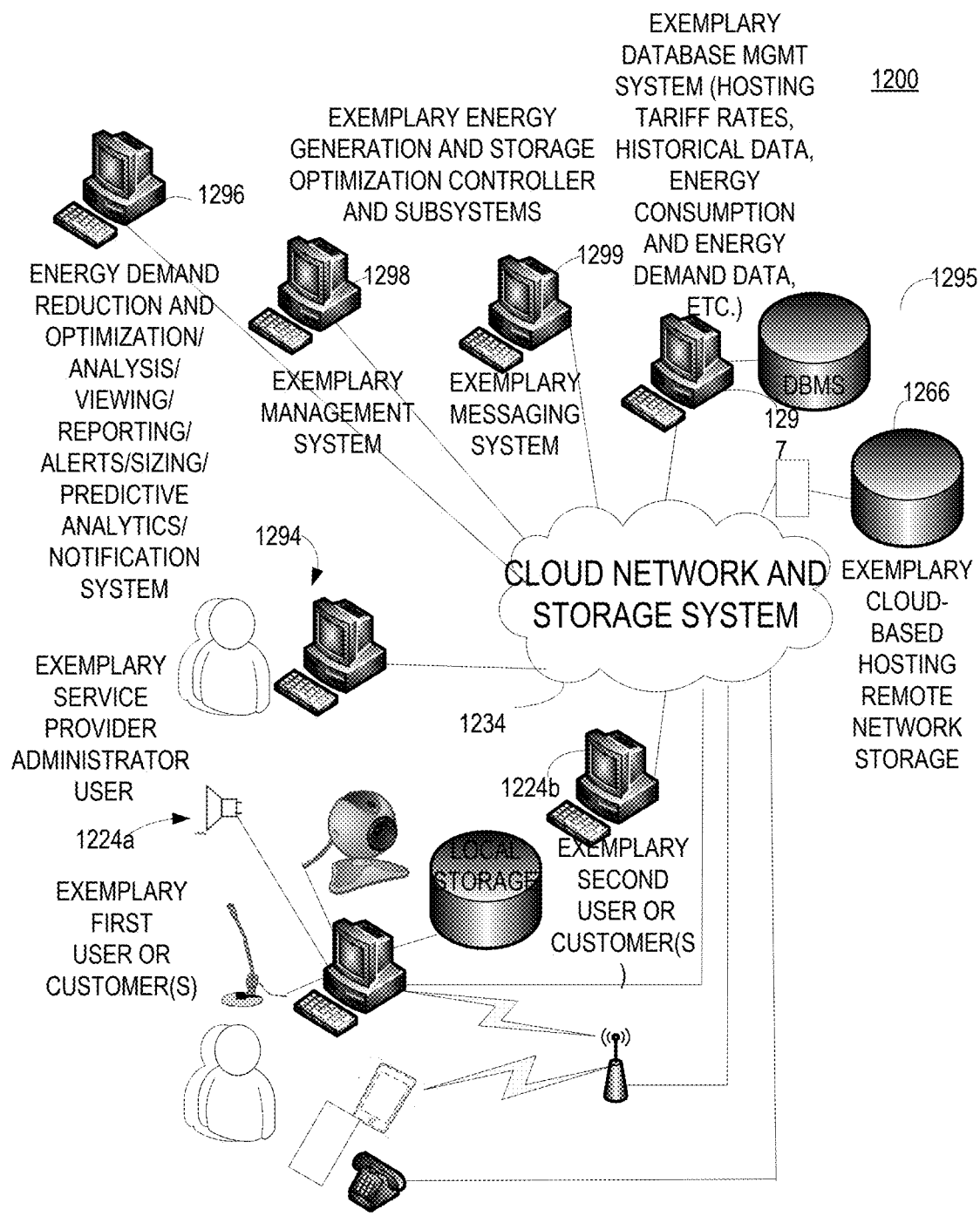
FIG. 12 depicts an exemplary embodiment of an exemplary software as a service (SAAS) based application server offering, providing an embodiment of an exemplary computer-implemented energy optimization energy storage device sizing and management system, according to one exemplary embodiment.

FIG. 12 depicts an exemplary embodiment of an exemplary software as a service (SAAS) based application server offering, providing an embodiment of an exemplary computer-implemented energy optimization energy storage device sizing and management system, and various subsystems of an exemplary service provider, whether cloud-based as illustrated, or otherwise, as will be apparent to those skilled in the art, including e.g., but not limited to, SAAS, client-server based architecture, standalone system, server based, client based, peer-to-peer device based, web-browser, or otherwise, according to one exemplary embodiment. Various users' devices 1224a, 1224b, 1294 coupled via an exemplary cloud network and storage system 1234, to devices 1296, 1298, 1299, 1295, 1297, and 1266.

FIG. 13 depicts an exemplary embodiment of a schematic diagram 1300 illustrating an exemplary computing and communications system 1300 for providing an exemplary mobile app, computer application, and/or console based, computer-implemented energy optimization energy storage device sizing and management system, computing and/or communications device, and/or client, and/or server, and/or service provider device system hardware architecture, according to one exemplary embodiment, where the exemplary block diagram 1300 can include, e.g., an illustration of an exemplary computer system as can be used in an exemplary personal computer application, controller-based console, web-browser based application, augmented reality system, and/or virtual reality based system, each providing exemplary embodiments of an exemplary computer-implemented energy optimization energy storage device sizing and management system according to an exemplary embodiment of the present invention.

Figure 4:
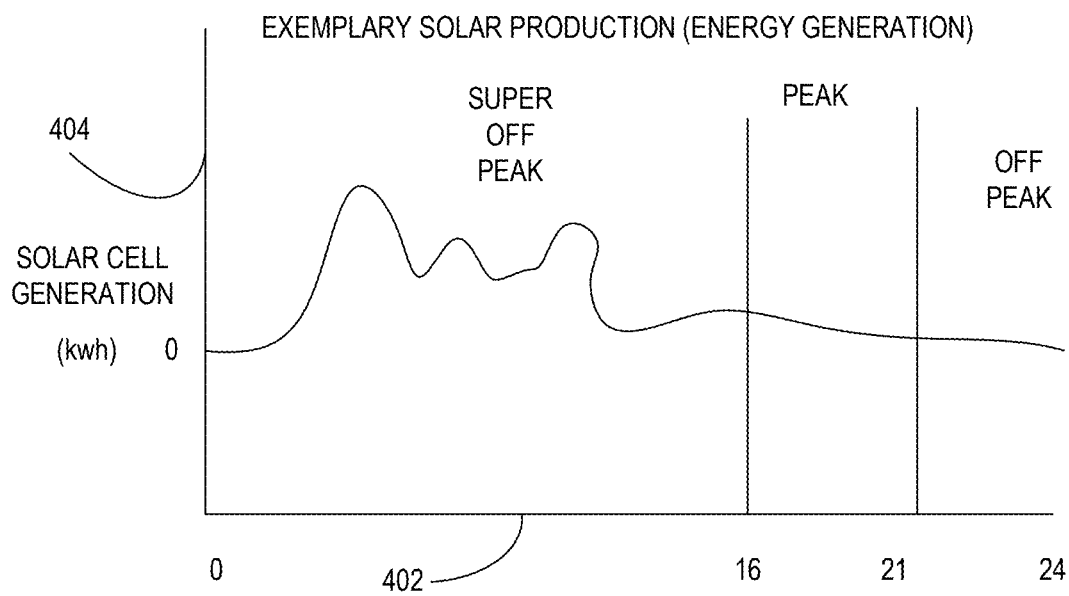
Figure 5:
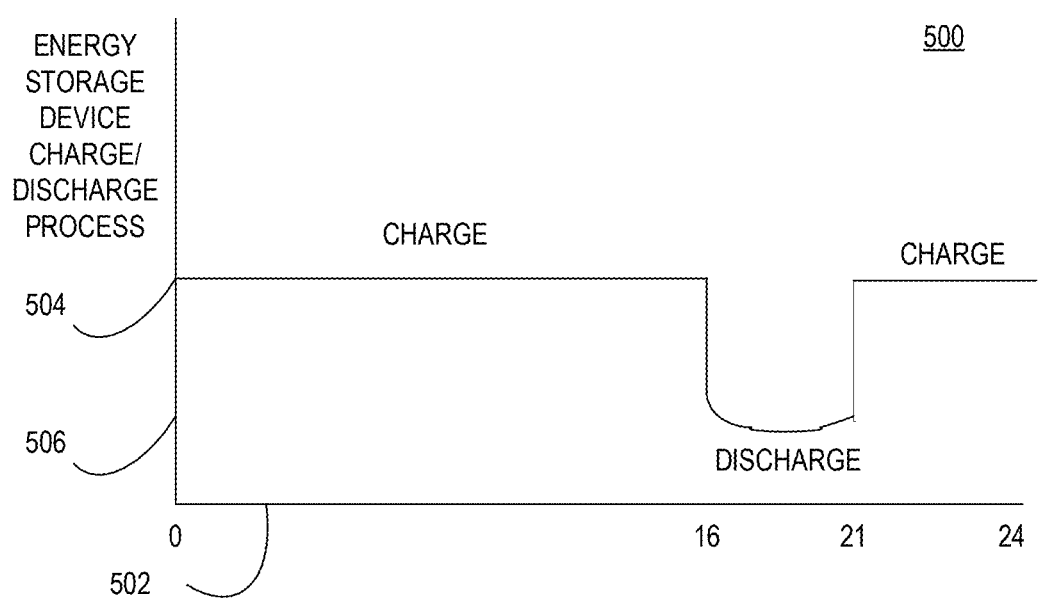

FIG. 13 depicts an exemplary embodiment of a block diagram 1300 illustrating an exemplary embodiment of a computer system 102, 106 that may be used in conjunction with any of the systems depicted in diagram 100 of FIG. 1 or hardware layer 202 of diagram 200 of FIG. 2. Further, computer system 102, 106 of block diagram 1300 may be used to execute any of various methods and/or processes such as, e.g., but not limited to, those discussed below with reference to FIGS. 4, 5, and 6. FIG. 13 depicts an exemplary embodiment of a computer system 102, 106 that may be used in computing devices such as, e.g., but not limited to, client 106 and/or server 102 computing devices according to an exemplary embodiment of the present invention. FIG. 13 depicts an exemplary embodiment of a computer system that may be used as client device 106, or a server device 102, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 1300 is shown in FIG. 13, depicting an exemplary embodiment of a block diagram of an exemplary computer system useful for implementing the present invention. Specifically, FIG. 13 illustrates an example computer 1300, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® 10/7/95/NT/98/2000/XP/CE/, etc. available from MICROSOFT® Corporation of Redmond, Wash., U.S.A., SOLARIS® from SUN® Microsystems, now Oracle Corporation, previously of Santa Clara, Calif., U.S.A., OS/2 from IBM® Corporation of Armonk, N.Y., U.S.A., Mac/OS, OSX, iOS from APPLE® Corporation of Cupertino, Calif., U.S.A., etc., ANDROID available from GOOGLE, a division of ALPHABET CORPORATION of Palo Alto, CA, USA, or any of various versions of UNIX® (a trademark of the Open Group of San Francisco, Calif., USA) including, e.g., LINUX®, UBUNTU, BSD UNIX, DEBIAN, HPUX®, IBM AIX®, Sun Solaris, GNU/Linux, MacOS X, Debian, Minix, V7 Unix, FreeBSD, Kernel, Android, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 1300 is shown in FIG. 13. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, augmented reality devices (AR), virtual reality (VR) devices, etc., may also be implemented using a computer such as that shown in FIG. 13.

The computer system 1300 may include one or more processors, such as, e.g., but not limited to, processor(s) 1302. The processor(s) 1302 may include, a microprocessor, nanoprocessor, quantum computer, any of various conventional digital architecture processors including, e.g., but not limited to, Pentium, CORE i7, i5, i3, i9, etc., ARM, CISC, RISC, POWER, multi-processor, and/or multi-core, quad-core, etc., field programmable gate array (FPGA), application specific integrated circuit (ASIC), cryptographic processor, cryptographic subsystem, a system on a chip (SOC), etc., may be coupled or connected to a communication infrastructure 1304 (e.g., but not limited to, a communications bus, a backplane, a mother board, a cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 1300 may include a display interface 1318 that may forward, e.g., but not limited to, graphics, text, and other data, etc., from the communication infrastructure 1304 (or from a frame buffer, etc., not shown) for display on the display unit 1320.

The computer system 1300 may also include, e.g., but may not be limited to, a main memory 1306, which may include, e.g., but not limited to, random access memory (RAM), volatile and nonvolatile, synchronous digital (SDRAM), flash memory, and/or a secondary memory 1308, etc. The secondary memory 1308 may include, for example, (but not limited to) a storage device 1310 such as, e.g., but not limited to, a hard disk drive and/or a removable storage drive 1312, representing, e.g., but not limited to, a floppy diskette drive, a magnetic tape drive, an optical disk drive, a compact disk (CD-ROM) device, write once read many (WORM), Read Write (RW), Read (R), a magneto-optical (MO) drive, a digital versatile disk (DVD) device, BLU-RAY, and/or other Digital Storage Disk, electronic, magnetic, optical, magneto-optical, and/or optical storage device, etc. The removable storage drive 1312 may, e.g., but not limited to, access, read from and/or write to a removable storage unit 1314 in a well known manner. Removable storage media unit 1314, may also be called a program storage device or a computer program product, and may represent, e.g., but not limited to, a floppy disk, magnetic tape, optical disk, CD-ROM disk, a MO media, a DVD disk, FLASH MEMORY, USB stick, SDRAM, memory device, etc. which may be accessed, read from, and/or written to by removable storage drive 1312. As will be appreciated, the removable storage unit 1314 may include, e.g., but not limited to, a computer usable storage medium having stored therein computer software and/or data.

In alternative exemplary embodiments, secondary memory 1308 may include other similar devices for allowing computer programs or other instructions to be loaded into computer system 1300. Such devices may include, for example, a removable storage unit 1314 and a storage subsystem interface adapter (not shown.) Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM), SDRAM, FLASH, and/or associated socket, and/or storage and/or processing and/or memory and/or integrated devices, and/or other removable storage units 1314 and interfaces, which may allow software and data to be transferred from the removable storage unit 1314 to computer system 1300.

Computer 1300 may also include, e.g., but not limited to, an input device 1316 such as, e.g., (but not limited to) a mouse or other pointing device such as a digitizer, and/or a keyboard or other data entry device (not separately labeled).

Computer 1300 may also include, e.g., but not limited to, output devices 1320, such as, e.g., (but not limited to) display, touchscreen, touch sensor, proximity sensory, printers, and output sub system display interface 1318.

Computer 1300 may also include, e.g., but not limited to, input/output (I/O) system 1322 such as, e.g., (but not limited to) a communications interface, a cable and communications path, (not separately shown) etc., as well as I/O devices 1324, 1326, 1328, for example. These devices 1324, 1326, 1328, may include, e.g., but not limited to, a network interface card, and modems (not separately labeled). The communications interface may allow software and data to be, e.g., transferred between computer system 1300 and external devices over a network 104, as shown. Examples of the communications interface may include, e.g., but may not be limited to, a modem, a network interface (such as, e.g., an Ethernet card), a communications port, a Personal Computer Memory Card International Association (PCMCIA) or PC-Card slot and card, etc. Software and data transferred via communications interface may be in the form of signals 1330 (not shown) which may be electronic, electromagnetic, optical or other signals capable of being received by communications interface. These signals 1330 may be provided to communications interface via, e.g., but not limited to, a communications path (e.g., but not limited to, a channel). This channel may carry signals, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 1314, a hard disk installed in storage device 1310, and signals 1330, etc. These computer program products may provide software to computer system 1300. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose 'device' selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others, when in a nonvolatile form.

Computer programs (also called computer control logic), may include object oriented computer programs, and may be stored in main memory 1306 and/or the secondary memory 1308 and/or removable storage media units 1314, also called computer program products. Such computer programs, when executed, may enable the computer system 1300 to perform the features of the present invention as discussed herein. In particular, the computer programs, when executed, may enable the processor 1302 to provide a method to resolve conflicts during data synchronization according to an exemplary embodiment of the present invention. Accordingly, such computer programs may represent controllers of the computer system 1300.

In another exemplary embodiment, the invention may be directed to a computer program product comprising a computer readable medium having control logic (computer software) stored therein. The control logic, when executed by the processor 1302, may cause the processor 1302 to perform the functions of the invention as described herein. In another exemplary embodiment where the invention may be implemented using software, the software may be stored in a computer program product and loaded into computer system 1300 using, e.g., but not limited to, removable storage drive 1312, storage device 1310 or communications interface, etc. The control logic (software), when executed by the processor 1302, may cause the processor 1302 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium May include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G, 4G, 5G, 6G, 7G, nG wireless, BLUETOOTH, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB), etc.

BLUETOOTH is an emerging wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11 a, b, d and g, (including, e.g., but not limited to IEEE 802.11g-2003, etc.), 802.16, Wi-Max, etc.

An exemplary computer-implemented energy optimization energy storage device sizing and management system service provider system can include computer-implemented method of electronically sizing, electronically managing, and electronically hosting exemplary computer-implemented energy optimization energy storage device sizing and management systems and of providing in one exemplary embodiment, and access to devices, via, e.g., an exemplary communications network to a plurality of electronic computing devices configured as set forth in the claims, and can include various inputs and/or outputs including any of various sensors including, e.g., but not limited to, touch screens, kiosks, instrument panels, tablet, Phablet, smart phone, a mobile device, smart television, LED screen, LCD screen, LED, LCD, touch sensors, pressure sensors, accelerometers, location sensors, energy based sensors, zygbee devices, intelligent devices, Internet of Things (iOT) devices, etc., data database collection sensor/gatherers, system service provider datasets, data sensors, utility pricing data, blockchain components, encrypted cryptographically protected user information and account user passwords, and/or other private data, distributed ledgers, etc. Specifically, FIG. 13 illustrates an example computer-implemented energy optimization energy storage device sizing and management system system service provider computer 1300, which in an exemplary embodiment may be, e.g., (but not limited to) a exemplary computer-implemented energy optimization energy storage device sizing and management system service provider personal computer (PC) system in one exemplary embodiment, running an operating system such as, e.g., (but not limited to) MICROSOFT® WINDOWS® 10/8.1/8/7NT/98/2000/XP/CE/ME/VISTA/Windows 10, etc. available from MICROSOFT® Corporation of Redmond, Wash., U.S.A. However, the invention may not be limited to these platforms. Instead, the invention may be implemented on any appropriate exemplary computer-implemented energy optimization energy storage device sizing and management system service provider computer system running any appropriate operating system such as, e.g., but not limited to, Mac OSX, a Mach system, Linux, Ubuntu, Debian UNIX, iOS, OSX+ any variant Debian, Ubuntu, Linux, Android (available from Alphabet, and/or Google), etc., and/or another programming environment such as, e.g., but not limited to, Java, C, C++, C #, Python, Javascript, Ruby on Rails, PHP, LAMP, NDK, HTML, HTML5, XML, ADOBE FLASH, or the like. In one exemplary embodiment, the present invention may be implemented on an exemplary computer-implemented energy optimization energy storage device sizing and management system service provider computer system, including a computer processor, and memory, with instructions stored in the memory configured to be executed on the computer processor, operating as discussed herein. An exemplary computer-implemented energy optimization energy storage device sizing and management system service provider computer system, exemplary computer-implemented energy optimization energy storage device sizing and management system service provider computer 1300 may be shown in FIG. 13.

Other components of the invention, such as, e.g., (but not limited to) exemplary computer-implemented energy optimization energy storage device sizing and management system service provider computing device, a communications device, mobile phone, a telephony device, a telephone, a personal digital assistant (PDA), a personal computer (PC), a handheld PC, an interactive television (iTV), a digital video recorder (DVD), a tablet computer, an iPad, an iPhone, an Android phone, a Phablet, a mobile device, a smartphone, a wearable device, a network appliance, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 13. Services may be provided on demand using, e.g., but not limited to, an interactive television (iTV), a video on demand system (VOD), and via a digital video recorder (DVR), or other on demand viewing system.

The exemplary computer-implemented energy optimization energy storage device sizing and management system service provider computer system 1300 may include one or more processors, such as, e.g., but not limited to, processor(s) 1304 such as, e.g., but not limited to, a CORE i7, or the like, Pentium, QuadCore, Multiprocessor, SOC, Microcontroller, Programmable Logic Controller (PLC), microprocessor, nanoprocessor, quantum computer, etc. The exemplary computer-implemented energy optimization energy storage device sizing and management system service provider processor(s) 1304 may be connected and/or coupled to a communication infrastructure 1306 (such as, e.g., but not limited to, a communications bus, cross-over bar, or network, etc.). Various exemplary software embodiments may be described in terms of this exemplary computer-implemented energy optimization energy storage device sizing and management system service provider computer system. After reading this description, it may become apparent to a person skilled in the relevant art(s) how to implement the invention using other exemplary computer-implemented energy optimization energy storage device sizing and management system service provider computer systems and/or architectures. According to an exemplary embodiment, the system can include an exemplary computer-implemented energy optimization energy storage device sizing and management system service provider and data transformer 1334. In an exemplary embodiment, a cryptographic controller 1330 can be included, in an exemplary embodiment, and can be used to, e.g., but not limited to, authenticate a user device, and/or provide encryption and/or decryption processing, according to an exemplary embodiment.

Exemplary computer-implemented energy optimization energy storage device sizing and management system service provider computer system 1300 may include a display interface 1302 that may forward, e.g., but not limited to, graphics, text, and other data, etc., from the communication infrastructure 1306 (or from a frame buffer, etc., not shown) for display on the display unit 1320, or other output device 1318, 1334, 1320, 1334 (such as, e.g., but not limited to, a touchscreen, etc.).

The exemplary computer-implemented energy optimization energy storage device sizing and management system service provider computer system 1300 may also include, e.g., but may not be limited to, a main memory 1306, random access memory (RAM), and a secondary memory 1308, etc. The secondary memory 1308 may include, for example, (but not limited to) a hard disk drive 1310 and/or a removable storage drive 1312, representing a floppy diskette drive, a magnetic tape drive, an optical disk drive, a compact disk drive CD-ROM, etc. The removable storage drive 1312 may, e.g., but not limited to, read from and/or write to a removable storage unit 1312 in a well known manner. Removable storage unit 13122, 1314, also called a program storage device or a computer program product, may represent, e.g., but not limited to, a floppy disk, magnetic tape, solid state disc (SSD), SDRAM, Flash, a thumb device, a USB device, optical disk, compact disk, etc. which may be read from and written to by removable storage drive or media 1314. As may be appreciated, the removable storage unit 1312, 1314 may include a computer usable storage medium having stored therein computer software and/or data. In some embodiments, a "machine-accessible medium" may refer to any storage device used for storing data accessible by a computer. Examples of a machine-accessible medium may include, e.g., but not limited to: a magnetic hard disk; a floppy disk; an optical disk, like a compact disk read-only memory (CDROM) or a digital versatile disk (DVD); a magnetic tape; and/or a memory chip, etc. Communications networking subsystem can be coupled to an electronic network coupled to a data provider, various secure connections allowing electronic receipt of data, and transfer of data to partner systems.

In alternative exemplary embodiments, secondary memory 1308 may include other similar devices for allowing computer programs or other instructions to be loaded into computer system 1300. Such devices may include, for example, a removable storage unit 1314 and an interface 1320. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 1322 such as, e.g., but not limited to, SDRAM, Flash, a thumb device, a USB device, and interfaces 1320, which may allow software and data to be transferred from the removable storage unit 1322 to computer system 1300.

Exemplary computer-implemented energy optimization energy storage device sizing and management system service provider computer 1300 may also include an input device 1316, 1334 such as, e.g., (but not limited to) a mouse or other pointing device such as a digitizer, and a keyboard or other data entry device (not shown), or an input sensor device 1332, location sensor and/or other sensor 1332, such as, e.g., but not limited to, a touch screen, a pressure sensor, an accelerometer, and/or other sensor device such as, e.g., a pressure sensor, a rangefinder, a compass, a camera, accelerometer, gyro, ultrasonic, biometric, secure authentication system, etc.

Exemplary computer-implemented energy optimization energy storage device sizing and management system service provider computer 1300 may also include output devices, such as, e.g., (but not limited to) display 1330, and display interface 1302, or other output device 1340, 1320, Augmented Reality, Virtual Reality device 1334, touchscreen 1336. Exemplary computer-implemented energy optimization energy storage device sizing and management system service provider computer 1300 may include input/output (I/O) devices such as, e.g., (but not limited to) sensors, touch sensitive, pressure sensitive input systems, accelerometers, and/or communications interface 1324, cable 1328 and communications path 1326, etc. These communications networking devices may include, e.g., but not limited to, a network interface card, and modems (neither are labeled).

From a data model, which can automate the process of creating an exemplary computer-implemented energy optimization energy storage device sizing and management system service provider computer system 1354, can process incoming electronic data and can transform the data into exemplary computer-implemented energy optimization energy storage device sizing and management system pages, and/or related social media posts, and can then provide the transformed data, in the form of data indicative of the one or more exemplary computer-implemented energy optimization energy storage device sizing and management system, posts relating to exemplary computer-implemented energy optimization energy storage device sizing and management system posts, cumulative exemplary computer-implemented energy optimization energy storage device sizing and management system goals, exemplary computer-implemented energy optimization energy storage device sizing and management system amounts, electronic database, and electronic funds process and disbursement information, and processing to initiate electronic disbursement, and can be provided to an electronic decision support system (DSS) 1358, and/or computer database management system (DBMS) 1360 (which can be a relational database, and/or can use a graph database, an SQL database, a noSQL database, and/or other social networking and/or graph database, and/or electronic interactive, graphical user interface (GUI) system 1362 (not shown). Each of the exemplary DSS 1358, DBMS 1360 and/or EIGUI system 1362, can then, using e.g., but not limited to, a cryptographic processor and/or a crypto chip controller, or the like, can then encrypt the data using electronic encryptor 1364, which can make use of one or more cryptographic algorithm electronic logic 1366, which can include encryption code, a cryptographic combiner, etc., and may be stored in encrypted form, according to an exemplary embodiment, in a computer database storage facility, from computer database storage device 1368, and from there the process can continue with use of the cryptographic algorithm electronic logic 1370, and electronic decryptor 1372, which can decrypt and/or provide a process for decrypting encrypted data, and/or by providing such data to the DSS 1358, the DBMS 1360, or the EIGUI 1362, if authorized (not shown). By using encryption/decryption, certain algorithms can be used, as described above, including, e.g., but not limited to, AES encryption, RSA, PKI, TLS, FTPS, SFTP, etc. and/or other cryptographic algorithms and/or protocols.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An exemplary computer-implemented energy optimization energy storage device sizing and management system service provider processing can include algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it may be appreciated that throughout the specification discussions utilizing terms such as, e.g., but not limited to, "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term exemplary computer-implemented energy optimization energy storage device sizing and management system service provider "system" or "processor" "system on a chip" "microcontroller" "multi-core" may refer to any device or portion of a device that processes electronic data from registers and/or memory to transform that electronic data into other electronic data that may be stored in registers and/or memory. An exemplary computer-implemented energy optimization energy storage device sizing and management system service provider "computing platform" may comprise one or more processors.

Embodiments of the present invention may include exemplary computer-implemented energy optimization energy storage device sizing and management system service provider apparatuses for performing the operations herein. An apparatus may be specially constructed for the desired purposes, selectively activated or reconfigured by an exemplary computer-implemented energy optimization energy storage device sizing and management system service provider program stored in the device in coordination with one or more special purpose data sensors.

In yet another exemplary embodiment, the invention may be implemented using a combination of any of, e.g., but not limited to, hardware, firmware and software, etc.

In one or more embodiments, the present embodiments are embodied in machine-executable instructions. The instructions can be used to cause exemplary computer-implemented energy optimization energy storage device sizing and management system service provider processing device, for example a special-purpose exemplary computer-implemented energy optimization energy storage device sizing and management system service provider processor, which is programmed with the exemplary computer-implemented energy optimization energy storage device sizing and management system service provider instructions, to perform the steps of the present invention. Alternatively, the steps of the present invention can be performed by specific exemplary computer-implemented energy optimization energy storage device sizing and management system service provider hardware components that contain hardwired logic for performing the steps, or by any combination of programmed computer components and custom hardware components. For example, the present invention can be provided as exemplary computer-implemented energy optimization energy storage device sizing and management system service provider computer program product, as outlined above. In this environment, the embodiments can include a machine-readable medium having exemplary computer-implemented energy optimization energy storage device sizing and management system service provider instructions stored on it. The exemplary computer-implemented energy optimization energy storage device sizing and management system service provider can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

Exemplary wireless protocols and technologies used by a communications network may include BLUETOOTH, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

The embodiments may be employed across different generations of exemplary special purpose index construction wireless devices. This includes 1G-5G according to present paradigms. 1G refers to the first generation wide area wireless (WWAN) communications systems, dated in the 1970s and 1980s. These devices are analog, designed for voice transfer and circuit-switched, and include AMPS, NMT and TACS. 2G refers to second generation communications, dated in the 1990s, characterized as digital, capable of voice and data transfer, and include HSCSD, GSM, CDMA IS-95-A and D-AMPS (TDMA/IS-136). 2.5G refers to the generation of communications between 2G and 3 G. 3G refers to third generation communications systems recently coming into existence, characterized, for example, by data rates of 144 Kbps to over 2 Mbps (high speed), being packet-switched, and permitting multimedia content, including GPRS, 1.times.RTT, EDGE, HDR, W-CDMA. 4G refers to fourth generation and provides an end-to-end IP solution where voice, data and streamed multimedia can be served to users on an "anytime, anywhere" basis at higher data rates than previous generations, and will likely include a fully IP-based and integration of systems and network of networks achieved after convergence of wired and wireless networks, including computer, consumer electronics and communications, for providing 100 Mbit/s and 1 Gbit/s communications, with end-to-end quality of service and high security, including providing services anytime, anywhere, at affordable cost and one billing. 5G refers to fifth generation and provides a complete version to enable the true World Wide Wireless Web (WWWW), i.e., either Semantic Web or Web 3.0, for example. Advanced technologies may include intelligent antenna, radio frequency agileness and flexible modulation are required to optimize ad-hoc wireless networks.

Furthermore, the exemplary computer-implemented energy optimization energy storage device sizing and management system service provider processes and processors need not be located at the same physical locations. In other words, each processor can be executed at one or more geographically distant processor, over for example, a LAN or WAN connection. A great range of possibilities for practicing the exemplary special purpose index construction embodiments may be employed, using different networking hardware and software configurations from the ones above mentioned. Although described with reference to an application server and/or a web-based browser-enabled environment, such as, e.g., but not limited to, a JAVA environment, the application could also be implemented in a client server architecture, or as a mobile based app running on iOS or Android, or the like, and can interact with a server of exemplary computer-implemented energy optimization energy storage device sizing and management system service provider via communication network technology. Also, it is important to note that reference to an electronic network component, is not to require only electronic components, but could also integrate with other common networking equipment including, e.g, but not limited to, optical networking equipment, optical fiber, ATM, SONET, etc.

According to one exemplary embodiment, the exemplary computer-implemented energy optimization energy storage device sizing and management system service provider can be integrated with mobile devices which can run an exemplary an example graphical user interface (GUI) of an exemplary smartphone, and/or mobile phone, and/or computer application, and/or tablet application, and/or Phablet application, etc., application can transmit and/or receive data to and/or from an example mobile exemplary computer-implemented energy optimization energy storage device sizing and management system application device and/or server, in various embodiments. Various exemplary GUI elements can be provided, including icons and/or buttons, which can provide certain functionality relating to the exemplary computer-implemented energy optimization energy storage device sizing and management system, according to an exemplary embodiment. Various exemplary GUI elements can include exemplary scroll bars for scrolling through exemplary lists of exemplary computer-implemented energy optimization energy storage device sizing and management system features, and/or lists of particular GUI element options, according to an exemplary embodiment. Various exemplary embodiments of the system may include, e.g., but not limited to, enhanced interactive features such as, e.g., but not limited to, Web 2.0, social networking posts and/or friend authentication and sharing features, enhanced security offer and acceptance of authorized user(s), ability to interact with other users in social media posts, enhanced demographically and/or psychographically targeted advertisements and/or content, a graph database based scaleable back office system for managing a large scaleable database of users, and/or social media posts, social media profiles for each user, ability to provide ratings and/or emoji and/or other interaction between users, and/or rating of users, comment posting, sharing, and/or electronically enabled micro-fundraising, and/or donations and/or tracking of funds raised using real currency, and/or foreign currency equivalents, including, e.g., but not limited to, cryptocurrencies, real currencies, electronic ledgers, blockchain ledgers, foreign currencies, mobile currencies, VENMO, PAYPAL, WEPAY, etc., according to various exemplary embodiments.

FIG. 14 depicts an exemplary embodiment of a block diagram 1400 of an exemplary computer-implemented energy optimization energy storage device sizing and management system GOOGLE machine learning (ML) software architecture, according to an exemplary embodiment.

FIG. 15 depicts an exemplary embodiment of a block diagram 1500 illustrating an exemplary Google cloud artificial intelligence (AI) technology stack, exemplary computer-implemented energy optimization energy storage device sizing and management system and/or software architecture as can be used in one embodiment, to perform exemplary predictive analytics processing, according to one exemplary embodiment.

FIG. 16 depicts an exemplary embodiment of a block diagram 1600 illustrating an entity with an exemplary alternating current (AC) switch coupled to a solar panel via an exemplary DC to AC inverter, AC building load devices, and a batter via an exemplary multi-mode inverter, which in an exemplary embodiment can include a bi-directional inverter/charger for charging a DC battery, the multimode inverter can be coupled to a meter to access the utility grid via AC, and the battery as shown can be further coupled to a controller device coupling the battery by DC current to an exemplary solar power panel array, the exemplary multi-mode inverter or switch can include intelligence and/or program logic of a controller, according to one exemplary embodiment.

FIG. 17 depicts an exemplary embodiment of a block diagram 1700 illustrating an entity with an exemplary direct current (DC) alternating current (AC) inverter coupled by DC to a plurality of batteries and coupled to by DC to a controller for a DC exemplary solar power panel array such as, e.g., but not limited to a photovoltaic (PV), the DC/AC inverter can be coupled to building AC loads by AC, and can be coupled to a meter to access AC utility grid energy resources, the inverter can include intelligence and/or program logic of a controller, according to one exemplary embodiment.

FIG. 18 depicts an exemplary flow diagram 1800 illustrating an exemplary process flow for an exemplary method, according to one exemplary embodiment. According to an exemplary embodiment, the flow diagram 1800 can begin with 1802 and can continue immediately with an exemplary method, which can include, e.g., but not limited to, in 1804, reducing, by at least one computer processor, energy and demand costs through management of an entity load by using at least one energy storage system device; can include, e.g., but not limited to, in 1806, simulating, by the at least one computer processor, an entity load comprising at least one or more of: using, by the at least one computer processor, predictive analytics; or receiving, by the at least one computer processor, user inputs of an event schedule that impacts entity load; can include, e.g., but not limited to, in 1808 performing, by the at least one computer processor, optimization at the start of the billing cycle comprising establishing, by the at least one computer processor, a demand reduction target achievable with the energy storage system device implemented; can include, e.g., but not limited to, in 1810 setting, by the at least one computer processor, a periodic schedule for the energy storage system device discharge and allocate a portion of energy storage capacity to a reserve to be used in the event of volatility in entity load; can include, e.g., but not limited to, in 1812 determining, by the at least one computer processor, whether there is unused capacity of the energy storage system device at an end of a period, and responsive to the determining, redistributing, by the at least one computer processor, any of the unused capacity to a remaining period of the schedule; and can include, e.g., but not limited to, in 1814 resetting, by the at least one computer processor, the demand reduction target for each time-of-use period to what was achieved the previous period for the same billing period, and can continue with 1816, where method of process 1800 can immediately end, according to an exemplary embodiment. Various exemplary embodiments can include further features including both optional features and others as claimed in the various independent and dependent claims set forth below.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

The disclosure relates generally to, and provides enhancements and additional example features to U.S. patent application Ser. No. 16/735,488, filed Jan. 6, 2020, entitled "APPARATUS, SYSTEM, METHOD, AND COMPUTER PROGRAM PRODUCT FOR SCALING AND MANAGING ELECTRIC POWER SYSTEMS," of common assignee to the claimed inventions, the contents of all of which is incorporated herein by reference in its entirety.

According to an example embodiment, unique combinations of monitoring, data processing/conversion and display of the Vybe energy monitoring platform available from Vybe Energy, LLC of Falls Church, VA USA may be provided, according one embodiment.

The energy and performance dashboard, according to an example embodiment, is meant to provide clients and operators with visual and data demonstration of empirical performance, relative performance and financial performance at a portfolio and site level. Within portfolios, sum of data from sites designated in the portfolio as well as relative performance within the portfolio displayed, according to an example embodiment. Any data or graphics displayed can be user adjusted by timeframe, according to an example embodiment.

1. Empirical performance—collect and display data on building loads, generation output, expected performance, and control functions (e.g., minimum import and curtailment, charge/discharge of battery storage where applicable), according to an example embodiment. Include capability to show data at portfolio, site, and array levels, according to an example embodiment.

2. Relative performance—include control functions for curtailment or other asset control features as required, visual and data comparisons between expected output of generation assets in kW, kWh, and monetary terms, comparison of utility/purchased energy to generated, as well as alert and alarm management/routing functions for system components (e. g., inverters, battery blocks), actual vs expected output, and system "health," according to an example embodiment. The ability to view device or meter level data is provided for remote performance diagnostics, according to an example embodiment.

3. Financial performance—translate energy/utility information into dollars based on site specific utility rates, show financial contribution at different time windows, cost avoidance and revenue generation from energy systems, according to an example embodiment. Rolling accumulation of financial benefit for life of project at site and portfolio levels, according to an example embodiment. Ability to input project financials—capital, incentives, O&M assumptions, and projected output from generation assets in dollars over time—to show a continuous ROI in real and relative terms, according to an example embodiment.

The monitoring platform or dashboard, according to an example embodiment, provides near real time data collection from individual site installations, systems and/or equipment, primarily energy producing, conversion, or using systems/subsystems, in one embodiment. There are many applications in the marketplace that provide this basic functionality however the Vybe Energy platform, according to an example embodiment, available from Vybe Energy LLC, of Falls Church, VA USA, is unique in the combinations of data represented and value for differing groups of users. Generally speaking, other monitoring systems tend to be focused on directly reporting measured data with limited or no context and rarely combine physical data with monetization of that data. Note that solar PV projects are used as an example for illustrative purposes but the concepts represented span all energy technologies, according to an example embodiment.

Current performance visualization and monetization—in addition to monitoring and displaying current production from PV solar installations (as a generating system example), the Vybe Energy platform, according to an example embodiment, also displays and monetizes expected production based on monitoring and converting the production output control variable. In the case of solar PV, sunlight at the site of the installation or irradiance is the controlling variable translating to expected output of the installation, according to an example embodiment. Irradiance at the site, according to an example embodiment, is converted to expected output of the specific solar PV installation, and displayed "weather normalized" or expected output in kW as well as monetized. This data is displayed graphically, according to an example embodiment, with options to contrast with actual production and can be downloaded as data for subsequent analysis and reporting. In addition, at adjustable thresholds of actual vs. expected performance color coding is used in the monitoring system, according to an example embodiment, to indicate sites currently not performing as expected for immediate prioritization of investigation and possible remedial action to enhance or maintain financial performance of the system over time. Automated alerts, according to an example embodiment, can be generated for user selected performance levels, e. g., current output at X % of in situ expected performance based on primary variable. Alerts can be communicated via multiple electronic means, according to an example embodiment, and individual alerts for different levels of performance degradation can be established. Data, according to an example embodiment, is timestamped with the ability to select different calendar or interval denominations for ease of specific period or level of analysis, according to one example embodiment.

Planned performance visualization and monetization—in addition to monitoring and displaying current and "weather normalized" or in situ expected production from PV solar installations (as a generating system example), the Vybe Energy platform, according to an example embodiment, also displays and monetizes planned production based on planning and/or design data used in the development and financing phase of the project. This data can be displayed graphically, according to an example embodiment, in both kW and dollars with options to contrast with actual and in situ expected production and can be downloaded as data for subsequent analysis and reporting. This functionality, according to an example embodiment, allows analysis of financial performance variances for forecast revision or possible remedial action to enhance or maintain financial performance of the system over time. Data is timestamped, according to an example embodiment, with the ability to select different calendar or interval denominations for ease of specific period or level of analysis, according to one example embodiment.

Site and subsystem performance monitoring—many installations are comprised of more than a single subsystem, e. g., a solar PV installation or site that is comprised of several inverters and upstream subsystem components aggregated into a single installation or project phase, according to an example embodiment. See FIG. 19 for an illustration of a description of a generic installation layout for a solar PV installation, according to an example embodiment, comprised of multiple subsystems. Note that the example, according to an example embodiment, is specific to solar PV however applies across energy generating, storing, or using technologies. Individual subsystem performance, according to an example embodiment, can be monitored and displayed in terms of actual output and in situ expected performance based on primary variable. In the diagram illustrated in FIG. 19, according to an example embodiment, output at the inverter level can be shown vs expected performance allowing instant narrowing of troubleshooting overall site performance below expectations. Color coding for performance levels of subsystems, according to an example embodiment, is applied for varying levels of output below expectations as with the overall site performance described above. Further remote troubleshooting, according to an example embodiment, is enabled through communication with subsystem equipment or devices displaying performance parameters read directly from the device, according to one example embodiment.

Monetization/valuation combinations and options—the system, according to an example embodiment, goes beyond display of performance and data in physical and relative terms to incorporate monetization of energy and demand or energy flow rates individualized to the specifics of a project, phase or site, according to one example embodiment. The monetization can be applied to planned, actual and/or in situ expected performance, according to an example embodiment. The Vybe Energy platform, according to an example embodiment, incorporates monetization against energy and demand factors of specific tariffs, contracted offtake, incentive programs such as renewable energy credits or net energy metering type programs, and other valuations individually and as an aggregated value stack. The monetization, according to an example embodiment, can be displayed and is time stamped for calendar-based reporting across a range of denominating intervals, according to one example embodiment.

Portfolio management—individual sites, according to an example embodiment, can be aggregated to represent portfolios of installations with aggregated physical and monetary performance as described for individual sites above, according to one example embodiment. Single users may divide sites in a single or multiple portfolios to match organizational needs, according to an example embodiment. User account access, according to an example embodiment, can be established with differentiated access to individual sites, individual portfolios, or multiple portfolios, according to one example embodiment.

Map view with in situ performance—at a portfolio level, individual site locations are displayed on a map with the ability to scale the size of the site icon to the relative size of the site within the portfolio by power or financial factors, according to an example embodiment. Additionally, the icons are color coded to indicate actual performance versus in situ expected performance for immediate prioritization of investigation and performance improvement as described above, according to an example embodiment. The platform, according to an example embodiment, can be configured to allow the user to hover over individual site icons in the map view to prompt a pop up window with summary performance or installation information. Icons are linked to individual site pages, according to an example embodiment, for ease of access to more detailed information.

Additional parameter monitoring and system/sub-system control—the Vybe Energy platform, according to an example embodiment, allows for display of parameters not directly related to the energy system(s) for any data stream, according to one example embodiment. Common examples, according to an example embodiment, include related data such as site irradiance, utility provided and metered energy, or processed data such as facility total load profile combining solar PV and utility data, according to one example embodiment. The platform, according to an example embodiment, can also be used in control functions enabling user commands at a site or device level initiating pre-programmed control sequences, according to one example embodiment. Examples include, according to an example embodiment, enabling or disabling systems or features, limiting or curtailing performance limits, or resetting control variables, according to one example embodiment.

Vybe Energy's platform, according to an example embodiment, also has robust reporting capabilities that can generate PDFs that consolidate energy production data comparing actual to predicted for a set time period and financial performance—showing expected IRRs calculated during design phase to actual IRRs up to the current time period, according to one example embodiment.

| Energy Data Presentation and Visualization Exemplary Novel Aspects that Vybe is adding, according to an example embodiment | Conventional Aspects in Some Other Dashboards (that Vybe also has, according to an example embodiment) |
|---|---|
| Energy Production color coding showing actual, weather normalized, and predicted (during design) | Ability to directly report financial information |
| Performance color coding based on comparison of expected to actual production | Ability to relay through API monetization of SRECs |

| Energy Data Presentation and VisualizationExemplary Novel Aspects that Vybe is adding, according to an example embodiment | Conventional Aspects in Some Other Dashboards (that Vybe also has, according to an example embodiment) |
|---|---|
| Monetization of black line, blue line, green line | Ability at sub-system level to see actual performance vs expectations and send alerts |
| Incorporation of multiple revenue streams | Ability to do data queries for delineated timeframes |
| Comparison on data between different years | |
| AI enabled data showing anticipated production/consumption data | |

According to one example embodiment, an energy data presentation and visualization system, method and computer program product may provide energy performance and diagnostic data and economic impact of all monitored energy consuming and production assets, according to one example embodiment.

Other related references relevant to the area of the disclosure include US Patent Publication Numbers US 20070203860 A1, and US 20070203860 A1, the contents of both of which are incorporated herein by reference in their entireties.

Vybe Dashboard

FIG. 20 depicts an illustration of an example screenshot 2000 of a graphical user interface (GUI) interface of an example landing page, according to an example embodiment, which displays a list of all the portfolios of properties under a client. The client can click on a desired portfolio, according to an example embodiment, to see all the included sites within the desired portfolio. The navigation pane on the left, according to an example embodiment, can be hidden or shown by clicking on the top left (e.g., but not limited to, GUI user-selectable element three horizontal lines).

FIG. 21 depicts an illustration of an example screenshot 2100 of a graphical user interface (GUI) interface of an example map interface, providing a graphical information system (GIS) interface depicting one or more color-coded pins, according to one embodiment, along with an example color coded legend along a left hand column, according to an example embodiment. For color-blind users, other user interface notations will illustrate differences between color-coded elements, including, e.g., customizable colors, cross-hatching, shading, etc., according to example embodiments. When user clicks on portfolio, the user is taken to the map view, see FIG. 21, that also lists the sites on the left, according to an example embodiment. The green, according to an example embodiment, indicates that the actual real time solar production to weather normalized production is >97% (meaning that the production is as expected), yellow indicates that the real-time solar production to the weather normalized is between 93 and 97% (these numbers are all notional—they can be changed and so it's the concept that's being patented), orange indicates that the real-time solar production to weather normalized is below 93%, according to an example embodiment. The pins on the map, according to an example embodiment, also change color real time as the situation indicates.

FIG. 22 depicts an illustration of an example screenshot 2200 of a GUI interface of an example Alarms page, according to an example embodiment, shows the active alarm and alarms can be set up on any point value or calculation. The alarm, according to one embodiment, can be sent as, e.g., but not limited to, an email or a phone alert, etc.

FIG. 23 depicts an illustration of an example screenshot 2300 of a graphical user interface (GUI) interface of an example, illustrating when the user clicks on "Dashboard" on the menu bar, according to an example embodiment, the dashboard shows the user all the relevant information totaled up for that portfolio, according to one example embodiment.

FIG. 24 depicts an illustration of an example screenshot 2400 of a graphical user interface (GUI) interface of an example illustrating how the user can click on an example specific site the user wants to explore and the dashboard will take the user to the example specific site, according to one embodiment.

FIG. 24 depicts an illustration of an example screenshot 2400 of a graphical user interface (GUI) interface of an example Dashboard page, according to one example embodiment.

FIG. 25 depicts an illustration of an example screenshot 2500 of a graphical user interface (GUI) interface of an example of a next page on the menu illustrating custom graphing where the user can look at any type of data including, e.g., but not limited to, actual production, weather normalized production, predicted, as well as inverter level data, etc., and this data can be accessed at any level of granularity or time period, according to an example embodiment.

FIG. 26 depicts an illustration of an example screenshot 2600 of a graphical user interface (GUI) interface of an example financials page, which can be viewed to show both the kW and kWh savings as well as show the overall economic impact of the project to include not only utility bill savings but also revenues from incentives, according to one example embodiment. The savings, incentives, etc., can also be displayed to show not only actual, but also weather normalized and predicted savings, according to an example embodiment.

FIG. 27 depicts an illustration of an example screenshot 2700 of a graphical user interface (GUI) interface of an example environmental page showing an example of the total lifetime CO2 savings as well as equivalencies, according to one example embodiment.

FIG. 28 depicts an illustration of an example screenshot 2800 of a graphical user interface (GUI) interface of an example Devices page shows, according to one example embodiment, the example current status of all of the devices being monitored and can include, e.g., but not limited to, as many devices, etc., as needed to include, e.g., but not limited to, not only solar, but other renewables, batteries/storage, building automation system points, EV charging, etc.

FIG. 29 depicts an illustration of an example screenshot 2900 of a graphical user interface (GUI) interface of an example illustration of an example result of receiving a user selection of a click, or other indication of a request of on any device (such as, e.g., but not limited to, Inverters, etc.) and may takes the user to another page that has more points and data as well a graph that shows actual versus weather normalized production which can be very helpful in diagnosing problems, according to one embodiment.

FIG. 30 depicts an illustration of an example screenshot 3000 of a graphical user interface (GUI) interface of an example, reached from the main site page, the example Other Data page can also display an example heat map over any time period on any data point. In this case we are showing hourly solar production, according to one example embodiment.

FIG. 31 depicts an illustration of an example screenshot 3100 of a graphical user interface (GUI) interface of an example reports, which can be requested, and/or customized and/or provided, set up to automatically send data on a period or on-demand basis, according to one example embodiment. They can be set up on any point being read by the monitoring system, on any time range and at any granularity, according to one example embodiment. Reports can be saved so that they can be run without repeated set-up, according to one example embodiment.

Additionally, reports, according to one example embodiment, can also be sent from the dashboard (with the click of a button—to be developed) on a periodic or on-demand basis to produce more detailed financial results beyond what is displayed on the dashboard, to include comparisons between actual and predicted savings as well as graphs and tables on the overall economic impact of the project. These reports, according to one example embodiment, are typically preferred by C-level executives who need information to put into their powerpoints etc., according to one example embodiment. According to example embodiments, a decision support system, an executive information system, may be provided with familiar, user friendly, intuitive GUI elements enabling interaction by the user to obtain various data via an interactive, interface.

FIG. 32 depicts an illustration of an example screenshot 3200 of a graphical user interface (GUI) interface of an example color coding of mapped pins, and site location legend information and pins, with color indicating status of actual performance vs. expected—example dashboard screens, according to one example embodiment.

FIG. 33 depicts an illustration of an example screenshot 3300 of a graphical user interface (GUI) interface of an example color coding of zoomed out mapped pins, and site location legend information and pins, with color indicating status of actual performance vs. expected—example dashboard screens, according to one example embodiment.

According to one example embodiment, an example rating sensor display dashboard output graphical user interface, may be displayed, and may provide user with an example graphical chart based GUI-elements, which may be interacted with through a touch-based, and/or mouse based or other pointing device interface, and may allow selection of, e.g., but not limited to various data fields, options, etc., including temporal range, multiple tracked indicators relating to the building automation system monitored energy production performance, actual vs. expected, vs. weather normalized (taking into account and removing weather related affects) average, etc., according to one example embodiment.

Status ratio of actual production vs. expected production, may be displayed, according to one example embodiment.

For example, but not limited to, a user may find the system displays, 97%+green, 93%-97% yellow, <93% orange, according to one example embodiment.

According to one example embodiment, one may be prompted to check, e.g., but not limited to, look at inverters, is one down? What is status ratio over a given time period (e.g., day/week/month/ytd/annual, all time, etc.)? A user may ask, based on interactive review with the dashboard, "Do I need to change, troubleshoot, replace components, customize components?" according to one example embodiment.

A user may get further information by, e.g., user selection of clicking on an example GUI arrow element to view with additional information, according to one example embodiment.

FIG. 34 depicts an illustration of an example screenshot 3400 of a graphical user interface (GUI) interface of an example single site view, color coding regarding status indicator of performance ratio rating/grade, according to one example embodiment.

Textual data and graphical charting indication elements, summaries of production, dollar savings, kWh losses, etc., weather tracking, capturing temporal-based history of data and allowing graphing over time ranges, according to one example embodiment.

FIG. 35 depicts an illustration of an example screenshot 3500 of a graphical user interface (GUI) interface of an example Week view, according to one example embodiment.

FIG. 36 depicts an illustration of an example screenshot 3600 of a graphical user interface (GUI) interface of an example Financial page, according to one example embodiment.

FIG. 37 depicts an illustration of an example screenshot 3700 of a graphical user interface (GUI) interface of an example devices at a given site, subperformance of exemplary components (e.g., inverter(s), panels, etc.), according to one example embodiment.

According to one embodiment, a user can drill down into a specific site device and/or components, e.g., inverter(s), and FIG. 20 depicts, according to one example embodiment, an illustration of an example screenshot 2000 of a graphical user interface (GUI) interface of an example FIG. 38 may depict an illustration of an example screenshot 3800 of a graphical user interface (GUI) interface of an example may review, displayed, and check performance measures and actual vs. expected performance, according to embodiments.

FIG. 39 depicts an illustration of an example screenshot 3900 of a graphical user interface (GUI) interface of an example view multiple detailed component status comparisons page, according to one example embodiment.

FIG. 40 depicts an illustration of an example screenshot 4000 of a graphical user interface (GUI) interface of an example weekly dashboard for a given site, indicating, e.g., but not limited to, daily performance measures, production, monthly impact measures, curtailment of solar, weather indications, savings, breakdown of savings, geographic map of site location, etc., according to one example embodiment.

FIG. 41 depicts an illustration of an example screenshot 4100 of a graphical user interface (GUI) interface of an example environmental impact display, according to one example embodiment.

FIG. 42 depicts an illustration of an example screenshot 4200 of a graphical user interface (GUI) interface of an example heat map, according to one embodiment.

FIG. 43 depicts an illustration of an example screenshot 4300 of a graphical user interface (GUI) interface of an example reports generation page may be provided, where users may request a report, such reports, according to example embodiments may be fully customizable, whether by, e.g., but not limited to, a timeframe, etc., according to one example embodiment.

Monthly, weekly, annual, site based, entity based, color coding, customization, charting over time, according to one example embodiment Custom reporting, according to one example embodiment Custom Week, time format, according to one example embodiment Custom report generation may be provided, which may enable users to fully, and robustly customize example reports, to generate, e.g., but not limited to, specific reports with user-selected criteria, ranges, for interactive review, viewing, storage of results, and reports, etc., including, e.g., but not limited to, steps to—1) choose Date source, 2) data selection, 3) time range selection, 4) settings customization, 5) results generation, viewing, storing, outputting, sharing, editing, according to one example embodiment.

FIG. 44 depicts an illustration of an example screenshot 4400 of a graphical user interface (GUI) interface of an example of how a user can add additional data points/lines over time, based on other exemplary building automation system (BAS) inputs, such as, e.g., but not limited to, solar, battery, EV charging, meters, hvac controls, lighting, inverters, sensors, other building generation, other building loads/usage/sensor measurement, etc., according to an example embodiment.

FIG. 45 depicts an illustration of an example screenshot 4500 of a graphical user interface (GUI) interface of an example supervisory control and data acquisition (SCADA) illustrating curtailment of energy usage and savings, according to one example embodiment.

FIG. 46 depicts an illustration of an example screenshot 4600 of a graphical user interface (GUI) interface of an example site based financial analysis summary, according to one example embodiment.

FIG. 47 depicts an illustration of an example screenshot 4700 of a graphical user interface (GUI) interface of an example Financial Savings dashboard, showing types of savings, breakdown (money saved, kwh, renewable energy credits, etc.), according to one example embodiment.

An example color bar is illustrated at top (e.g., orange re status ratio of production rating at that site, according to one example embodiment.

While various embodiments of the present invention have been described above, it should be understood that they have been presented by way of example only, and not limitation. Thus, the breadth and scope of the present invention should not be limited by any of the above-described exemplary embodiments but should instead be defined only in accordance with the following claims and their equivalents.

What is claimed is:

1. A whole building or campus entity, energy management and energy control optimization, data presentation and visualization dashboard system comprising a computer processor service provider system, wherein the computer processor service provider system comprises a cloud-based computer processor service provider system comprising:
    at least one application server comprising:
        the whole building or campus entity, energy management and energy control optimization system executing in the cloud-based computer processor service provider system; and
        wherein the cloud-based computer processor is configured to:
            electronically display output interactively via an electronic dashboard graphical user interface (GUI) comprising:
                at least one GUI element configured to:
                    electronically enable interactive user receipt of input, and
                    electronically provide output relating to at least one or more of the following:
                        a GUI element heat map;
                        a GUI element financial energy savings calculation;
                        a GUI element of energy production depicting at least one or more of:
                            actual energy production,
                            weather normalized energy production, or
                            predicted energy production; or
                        a GUI element of energy usage performance based upon an automatically calculated comparison of expected energy production to actual energy production;
                        a GUI element of monetization comprising at least one or more of:
                            GUI element lines on a graphically displayed chart metaphor GUI element; or
                            GUI element multiple revenue streams;
                            GUI element visual comparison of data between different time periods; or
                            GUI element artificial intelligence (AI)-enabled data showing at least one or more of:
                                anticipated production data, or
                                anticipated consumption data,
    wherein said electronic dashboard graphical user interface GUI is configured to electronically integrate with at least one or more of:
        an accounting system; or
        a customer relationship management system (CRM), and
    wherein integration of said electronic dashboard GUI with said at least one or more of said accounting system, or said CRM obtains an end-to-end energy optimization solution for at least one or more of an energy developer or contractor.

2. The system according to claim 1, further comprising:
    an onsite energy controller coupled to the cloud-based computer processor service provider system by an electronic communications network;
    wherein said onsite energy controller comprises:
        at least one electronic computer processor; and
        at least one electronic computer memory coupled to said at least one electronic computer processor;
    wherein said at least one electronic computer processor of said onsite energy controller is configured to:
        electronically reduce energy and demand costs through whole building or campus entity energy management of a building or campus entity load including by being configured to at least one or more of:
            electronically optimize energy usage;
            electronically optimize energy generation;
            electronically maximize demand reduction and utility savings through
                electronic optimal control of:
                    the energy usage, and
                    the energy generation, or
            electronically reduce energy costs; and
            electronically use of at least one energy storage system device;

electronically simulate said building or campus entity load by use of at least one or more of: electronically predictive analytics; or
electronically receive user inputs of an event electronically schedule that impacts said building or campus entity load;
electronically perform optimization at the start of the billing cycle to establish a demand reduction target achievable with the at least one energy storage system device implemented;
electronically set a periodic schedule for discharge of the at least one energy storage system device and allocate a portion of energy storage capacity to a reserve to be used in the event of volatility in said building or campus entity load;
electronically determine whether there is unused capacity of the at least one energy storage system device at an end of a period, and responsive to the determination, redistribute any of the unused capacity to a remaining period of the periodic schedule; or
electronically reset the demand reduction target for each time-of-use period to what was achieved in the previous period for the same billing period.

3. The system according to claim 1, wherein said different time periods of said GUI element visual comparison comprise at least one or more of:
a year;
a month;
a week;
a day;
a multi-day period;
a multi-week period;
a multi-month period; or
a multi-year period.

4. The system according to claim 1, wherein said GUI element comprises at least one or more of:
a datum;
at least one data;
a plurality of data;
historical data;
at least one historical data;
a plurality of historical data;
a timeframe;
at least one timeframe;
a plurality of timeframes;
a delineated timeframe;
normalized data;
weather data;
normalized weather data;
granularity data;
time period data;
predicted data;
comparison data;
monetization data;
revenue stream data;
performance data;
diagnostic data;
financial data;
an alert;
at least one alert;
a plurality of alerts;
an alarm;
at least one alarm;
a plurality of alarms;
a point;
at least one point;
a plurality of points;
a data point;
at least one data point;
a plurality of data points;
a set point;
at least one set point;
a plurality of set points;
a point value;
at least one point value;
a plurality of point values;
a line;
at least one line;
a plurality of lines;
a graph;
at least one graph;
a plurality of graphs;
a report;
at least one report;
a plurality of reports;
a status indicator;
performance measure;
actual performance measure;
expected performance measure;
component status;
environmental impact display;
financial savings dashboard;
a curve;
at least one curve; or
a plurality of curves.

5. The system according to claim 1, wherein predictive analytics are used to obtain an electronically computed prediction of at least one or more of: a) said building or campus entity load, b) the energy generation comprising solar production, or c) electric vehicle (EV) charging; and further comprising:
wherein said at least one electronic computer processor of said onsite energy controller is configured to:
electronically determine how to reduce said building or campus entity load, by at least one or more of:
wherein said at least one electronic computer processor of said onsite energy controller is configured to at least one of:
electronically use said at least one energy storage system device;
electronically use load shedding, or
electronically reducing other building loads comprising at least one or more of:
electronically reducing lighting building loads,
electronically reducing at least one or more of heating or cooling, or
electronically reducing hot water.

6. The system according to claim 1, wherein said electronic dashboard graphical user interface (GUI) is configured to electronically display at least one of:
a scheduled deployment strategy based upon at least one or more of the energy usage, the energy generation sources; and actual energy optimization output.

7. The system according to claim 1, wherein said CRM system comprises at least one or more of:
a SALESFORCE CRM.

8. The system according to claim 1, wherein said integration occurs automatically, electronically, upon at least one or more of:
   a new client is electronically entered into said CRM, or
   at least one project of the at least one or more of the energy developer is electronically entered or commissioned.

9. The system according to claim 1, wherein said electronic dashboard at least one or more of:
   electronically seamlessly integrates with a customer relationship management (CRM) system to monitor production; or
   electronically seamlessly integrates with an accounting system to monitor returns or savings.

10. The system according to claim 1, wherein said system comprises at least one or more of:
   a flat screen panel;
   a digital television;
   a flat television;
   a touchscreen;
   a touch-enabled display;
   a touch-based display;
   a touch sensitive interface;
   a user interface displaying device;
   a kiosk;
   a mobile device;
   a smartphone;
   a tablet; or
   a phablet.

11. The system according to claim 1, wherein the whole building or campus entity, energy management and energy control optimization system comprises:
   a portfolio of a plurality of buildings or campuses, and wherein the portfolio is displayed in at least one or more of:
      a map metaphor; or
      a list.

12. The system according to claim 1, wherein said at least one GUI element comprises electronically providing at least one or more of:
   at least one GUI element depicts a portfolio-level status comprising ability to drill down into specific sub elements of the portfolio, and wherein the specific sub elements of the portfolio comprises wherein the GUI element depicts at least one or more of:
      a performance status;
      an actual production vs. weather-normalized production performance status;
      a real-time performance status; or
      at least one portfolio level statistic, comprising at least one or more of:
         lifetime solar production,
         last month solar production,
         current month production,
         lifetime utility savings,
         lifetime SREC or other incentive savings,
         lifetime metric tons of CO2 avoided,
         equipment point data,
         utility meter point data,
         inverter point data,
         a solar point data,
         a battery point data,
         an EV charging point data,
         a meter point data,
         a lighting point data,
         a sensor point data,
         an alternative energy generation source point data,
         a solar energy generation source point data,
         a turbine-based energy generation source point data,
         a wind turbine energy generation source point data,
         a renewable energy generation source point data,
         a direct current (DC) based energy generation source point data,
         an alternating current (AC) based energy generation source point data,
         a hybrid energy generation source point data,
         a diesel generator energy generation source point data,
         a hydrogen fuel cell energy generation source point data,
         a nuclear energy generation source point data,
         a heat based energy generation source point data,
         a combined heat and power (CHP) energy generation source point data,
         a generator energy generation source point data,
         a solar panel energy generation source point data,
         an electronic vehicle solar energy generation source point data,
         a water based turbine energy generation source point data,
         a turbocharged energy generation source point data,
         a supercharged energy generation source point data,
         an other building generation point data,
         an other building load measurement point data,
         an other building usage measurement point data,
         an other building sensor measurement point data,
         a fuel cell point data,
         a heating ventilation air conditioning (HVAC) point data,
         an HVAC control point data,
         a communication data, or
         a protocol data.

13. A computer-implemented whole building or campus entity, energy management and energy control optimization, data presentation and visualization dashboard method comprising providing an electronic computer processor service provider system wherein the electronic computer processor service provider system comprises an electronic cloud-based computer processor service provider system, the method comprising:
   electronically displaying, by at least one electronic computer processor, output interactively via an electronic dashboard graphical user interface (GUI) comprising at least one GUI element enabling interactive user receipt of inputting interactive selections, and
   electronically providing, by the at least one electronic computer processor, of output relating to said interactive selections comprising at least one or more of the following:
      a GUI element heat map;
      a GUI element financial energy savings calculation;
      a GUI element of energy production depicting at least one or more of:
         actual energy production,
         weather normalized energy production, or
         predicted energy production; or
      a GUI element of energy usage performance based upon an automatically calculated comparison of expected energy production to actual energy production;

a GUI element of monetization comprising at least one or more of:
  GUI element lines on a graphically displayed chart metaphor GUI element; or
  GUI element multiple revenue streams;
a GUI element visual comparison of data between different time periods; or
GUI element artificial intelligence (AI)-enabled data showing at least one or more of:
  anticipated production data, or
  anticipated consumption data,
wherein said electronic dashboard graphical user interface GUI is configured to electronically integrate with at least one or more of:
an accounting system; or
a customer relationship management system (CRM), and
wherein integration of said electronic dashboard GUI with said at least one or more of said accounting system, or said CRM obtains an end-to-end energy optimization solution for at least one or more of an energy developer or contractor.

14. A whole building or campus entity, energy management and energy control optimization nontransitory computer accessible media, embodying program instructions, which when executed on at least one electronic computer processor of the electronic cloud-based computer processor service provider system, perform a method according to claim 13.

15. The computer accessible media according to claim 14, wherein the whole building or campus entity, energy management and energy control optimization system comprises:
  a portfolio of a plurality of buildings or campuses, and wherein the portfolio is displayed in at least one or more of:
    a map metaphor; or
    a list.

16. The computer accessible media according to claim 14, wherein said at least one GUI element comprises electronically providing at least one or more of:
  at least one GUI element depicts a portfolio-level status comprising ability to drill down into specific sub elements of the portfolio, and wherein the specific sub elements of the portfolio comprises wherein the GUI element depicts at least one or more of:
    a performance status;
    an actual production vs. weather-normalized production performance status;
    a real-time performance status; or
    at least one portfolio level statistic, comprising at least one or more of:
      lifetime solar production,
      last month solar production,
      current month production,
      lifetime utility savings,
      lifetime SREC or other incentive savings,
      lifetime metric tons of CO2 avoided,
      equipment point data,
      utility meter point data,
      inverter point data,
      a solar point data,
      a battery point data,
      an EV charging point data,
      a meter point data,
      a lighting point data,
      a sensor point data,
      an alternative energy generation source point data,
      a solar energy generation source point data,
      a turbine-based energy generation source point data,
      a wind turbine energy generation source point data,
      a renewable energy generation source point data,
      a direct current (DC) based energy generation source point data,
      an alternating current (AC) based energy generation source point data,
      a hybrid energy generation source point data,
      a diesel generator energy generation source point data,
      a hydrogen fuel cell energy generation source point data,
      a nuclear energy generation source point data,
      a heat based energy generation source point data,
      a combined heat and power (CHP) energy generation source point data,
      a generator energy generation source point data,
      a solar panel energy generation source point data,
      an electronic vehicle solar energy generation source point data,
      a water based turbine energy generation source point data,
      a turbocharged energy generation source point data,
      a supercharged energy generation source point data,
      an other building generation point data,
      an other building load measurement point data,
      an other building usage measurement point data,
      an other building sensor measurement point data,
      a fuel cell point data,
      a heating ventilation air conditioning (HVAC) point data,
      an HVAC control point data,
      a communication data, or
      a protocol data.

17. The method according to claim 13, further comprising:
  electronically reducing, by at least one electronic computer processor of the cloud-based computer processor service provider system, energy and demand costs through whole building or campus entity energy management of a building or campus entity load by at least one or more of:
  electronically optimizing energy usage;
  electronically optimizing energy generation;
  electronically maximizing demand reduction and utility savings through
  electronically optimal control of:
  the energy usage, and
  the energy generation, or
  electronically reducing energy costs; and
  electronically using at least one energy storage system device;
  electronically simulating, by the at least one electronic computer processor, said building or campus entity load comprising at least one or more of:
  electronically using, by the at least one electronic computer processor, predictive analytics; or
  electronically receiving, by the at least one electronic computer processor, user inputs of an event schedule that impacts said building or campus entity load;
  electronically performing, by the at least one electronic computer processor, optimization at the start of the billing cycle comprising establishing, by the at least one computer processor, a demand reduction target achievable with the at least one energy storage system device implemented;

electronically setting, by the at least one electronic computer processor, a periodic schedule for discharge of the at least one energy storage system device discharge and allocate a portion of energy storage capacity to a reserve to be used in the event of volatility in said building or campus entity load;

electronically determining, by the at least one electronic computer processor, whether there is unused capacity of the at least one energy storage system device at an end of a period, and responsive to the determining, redistributing, by the at least one computer processor, any of the unused capacity to a remaining period of the periodic schedule; or electronically resetting, by the at least one electronic computer processor, the demand reduction target for each time-of-use period to what was achieved in the previous period for the same billing period.

18. The method according to claim 13, wherein the whole building or campus entity, energy management and energy control optimization system comprises:
a portfolio of a plurality of buildings or campuses, and wherein the portfolio is displayed in at least one or more of:
a map metaphor; or
a list.

19. The method according to claim 13, wherein said at least one GUI element comprises electronically providing at least one or more of:
at least one GUI element depicts a portfolio-level status comprising ability to drill down into specific sub elements of the portfolio, and wherein the specific sub elements of the portfolio comprises wherein the GUI element depicts at least one or more of:
a performance status;
an actual production vs. weather-normalized production performance status;
a real-time performance status; or
at least one portfolio level statistic, comprising at least one or more of:
lifetime solar production,
last month solar production,
current month production,
lifetime utility savings,
lifetime SREC or other incentive savings,
lifetime metric tons of CO2 avoided,
equipment point data,
utility meter point data,
inverter point data,
a solar point data,
a battery point data,
an EV charging point data,
a meter point data,
a lighting point data,
a sensor point data,
an alternative energy generation source point data,
a solar energy generation source point data,
a turbine-based energy generation source point data,
a wind turbine energy generation source point data,
a renewable energy generation source point data,
a direct current (DC) based energy generation source point data,
an alternating current (AC) based energy generation source point data,
a hybrid energy generation source point data,
a diesel generator energy generation source point data,
a hydrogen fuel cell energy generation source point data,
a nuclear energy generation source point data,
a heat based energy generation source point data,
a combined heat and power (CHP) energy generation source point data,
a generator energy generation source point data,
a solar panel energy generation source point data,
an electronic vehicle solar energy generation source point data,
a water based turbine energy generation source point data,
a turbocharged energy generation source point data,
a supercharged energy generation source point data,
an other building generation point data,
an other building load measurement point data,
an other building usage measurement point data,
an other building sensor measurement point data,
a fuel cell point data,
a heating ventilation air conditioning (HVAC) point data,
an HVAC control point data,
a communication data, or
a protocol data.

* * * * *